3,813,394
PURINE DERIVATIVES HAVING HYPOCHOLES-
TEROLEMIC ACTIVITY
Akira Tensho, Tokorozawa, Takashi Kamiya and
Yoshihisa Saito, Suita, Masashi Hashimoto, Toyonaka,
and Hideo Seki, Takatsuki, Japan, assignors to
Fujisawa Pharmaceutical Co., Ltd., Osaka, Japan
Continuation-in-part of application Ser. No. 851,057,
Aug. 18, 1969, which is a continuation-in-part of Ser.
No. 861,808, Sept. 29, 1969, both now abandoned.
This application Mar. 24, 1970, Ser. No. 22,361
Int. Cl. C07d 57/38
U.S. Cl. 260—252                         16 Claims

ABSTRACT OF THE DISCLOSURE

Purine derivatives of the formula:

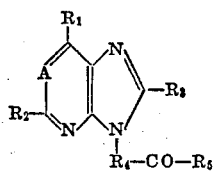

Figure 1:
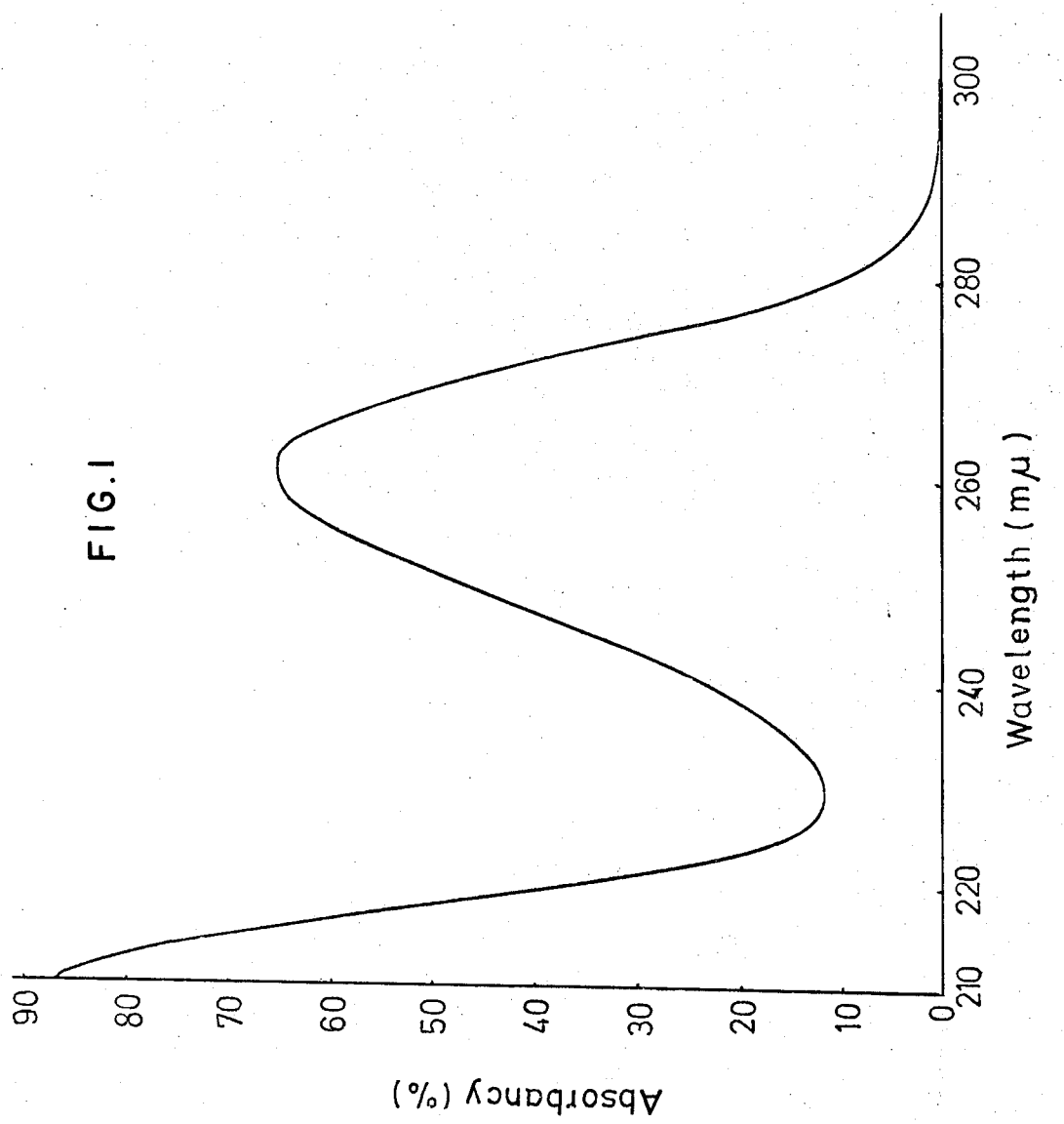

wherein A is N or N→O, $R_1$ is hydrogen, halogen, hydroxyl, mercapto, lower alkoxy, ar(lower)alkoxy, lower alkylthio, amino, lower alkylamino, di(lower)alkylamino, ar(lower)alkylamino, acylamino, hydroxyamino, lower alkoxyamino, ar(lower)alkoxyamino or aryloxyamino, $R_2$ and $R_3$ are each hydrogen, halogen, hydroxyl, mercapto, amino, lower alkyl, aryl, lower alkoxy, ar(lower)alkoxy or lower alkylthio, $R_4$ is lower alkylene substituted with one or more hydroxyls (but no hydroxyl group being present at the carbon atom adjacent to the ring nitrogen atom) which may be protected with acyl, lower alkyl, ar(lower)alkyl or, when a pair of hydroxyls exist on the alkylene group, with lower alkylidene or ar(lower)alkylidene and $R_5$ is hydroxyl, lower or higher alkoxy, amino, lower alkylamino or di(lower)alkylamino, and their salts, which exhibit marked hypocholesterolemic acivity with extremely low toxicity.

This application is a continuation-in-part of copending application Ser. No. 861,808, filed Sept. 29, 1969, now abandoned which is a continuation-in-part of copending application Ser. No. 851,057, filed Aug. 18, 1969 now abandoned.

The present invention relates to purine derivatives, and their production and use.

In the specification, the term "lower" used in connection wtih the moieties derived from alkanes such as alkyl or alkylene is intended to mean the one having 1 to 8 carbon atoms unless otherwise indicated.

The purine derivatives of the present invention include those representable by the formula:

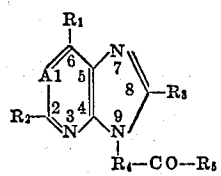

wherein A is N or N→O, $R_1$ is hydrogen, halogen (e.g. chlorine, bromine, iodine, fluorine), hydroxyl, mercapto, lower alkoxy (e.g. methoxy, ethoxy, propoxy, isopropoxy), ar(lower)alkoxy such as phenyl(lower) alkoxy (e.g. benzyloxy, phenethyloxy), lower alkylthio (e.g. methylthio, ethylthio, propylthio), amino, lower alkylamino (e.g. methylamino, ethylamino, propylamino), di(lower) alkylamino (e.g. dimethylamino, diethylamino, methylethylamino), ar(lower)alkylamino such as phenyl(lower)alkylamino (e.g. benzylamino, phenethylamino), acylamino such as lower alkanoylamino (e.g. acetylamino, propionylamino, octanoylamino) or benzoylamino, hydroxyamino, lower alkoxyamino (e.g. methoxyamino, ethoxyamino, propoxyamino), ar(lower)alkoxyamino such as phenyl (lower)alkoxyamino (e.g. benzyloxyamino, phenethyloxyamino) or aryloxyamino such as phenoxyamino; $R_2$ and $R_3$ are each hydrogen, halogen (e.g. chlorine, bromine, iodine, fluorine), hydroxyl, mercapto, amino, lower alkyl (e.g. methyl, ethyl, propyl, isopropyl), aryl such as phenyl, lower alkoxy (e.g. methoxy, ethoxy, propoxy, isopropoxy), ar(lower)alkoxy such as phenyl(lower)alkoxy (e.g. benzyloxy, phenethyloxy) or lower alkylthio (e.g. methylthio, ethylthio, propylthio); $R_4$ is lower alkylene preferably having 2 to 6 carbon atoms (e.g. ethylene, trimethylene, propylene) substituted with one or more hydroxyls (but no hydroxyl group being present at the carbon atom adjacent to the ring nitrogen atom) which may be protected with acyl such as lower alkanoyl (e.g. acetyl, propionyl) or benzoyl, lower alkyl (e.g. methyl, ethyl, propyl, isopropyl), ar(lower)alkyl such as phenyl(lower) alkyl (e.g. benzyl, phenethyl) or, when a pair of hydroxyls exist on the alkylene group, with lower alkylidene (e.g. ethylidene, propylidene, isopropylidene) or ar(lower)alkylidene such as phenyl(lower)alkylidene (e.g. benzylidene); and $R_5$ is hydroxyl, lower or higher alkoxy (e.g. methoxy, ethoxy, propoxy, isopropoxy, octyloxy, decyloxy, heptadecyloxy), amino, lower alkylamino (e.g. methylamino, ethylamino, propylamino) or di(lower)alkylamino (e.g. dimethylamino, diethylamino, methylethylamino). There are also included their salts such as metal salts (e.g. sodium salt, potassium salt, calcium salt), ammonium salt, amine salts (e.g. dimethylamine salt, trimethylamine salt) and acid-addition salts, i.e. organic and inorganic acid-addition salts (e.g. hydrochloride, hydrobromide, sulfate, nitrate, phosphate, tartrate, citrate).

Specific examples of the purine compounds [I] are as follows:

4-(purin-9-yl)-4-deoxy-D-erythronic acid,
4-(2-aminopurin-9-yl)-4-deoxy-D-erythronic acid,
4-(8-aminopurin-9-yl)-4-deoxy-D-erythronic acid,
4-(6-aminopurin-9-yl)-4-deoxy-D-erythronic acid,
lower alkyl 4-(6-aminopurin-9-yl)-4-deoxy-D-erythronate (e.g. methyl 4-(6-aminopurin-9-yl)-4-deoxy-D-erythronate,
ethyl 4-(6-aminopurin-9-yl)-4-deoxy-D-erythronate,
propyl 4-(6-aminopurin-9-yl)-4-deoxy-D-erythronate,
butyl 4-(6-aminopurin-9-yl)-4-deoxy-D-erythronate),
4-(6-aminopurin-9-yl)-4-deoxy-D-erythronamide,
N-lower alkyl - 4 - (6-aminopurin-9-yl)-4-deoxy-D-erythronamide (e.g. N-ethyl-4-(6-aminopurin-9-yl)-4-deoxy-D-erythronamide),
N,N-di(lower)alkyl-4-(6-aminopurin-9-yl)-4-deoxy-D-erythronamide (e.g. N,N-diethyl-4-(6-aminopurin-9-yl)-4-D-erythronamide),
4-(6-aminopurin-9-yl)-4-deoxy-2,3-O-lower alkylidene-D-erythronic acid (e.g. 4-(6-aminopurin-9-yl)-4-deoxy-2,3-O-ethylidene-D-erythronic acid,
4-(6-aminopurin-9-yl)-4-deoxy-2,3-O-isopropylidene-D-erythronic acid),
4-(6-aminopurin-9-yl)-4-deoxy-2,3-O-ar(lower)alkylidene-D-erythronic acid (e.g. 4-(6-aminopurin-9-yl)-4-deoxy-2,3-O-benzylidene-D-erythronic acid),
lower alkyl 4-(6-aminopurin-9-yl)-4-deoxy-2,3-O-lower alkylidene-D-erythronate (e.g. methyl 4-(6-aminopurin-9-yl)-4-deoxy-2,3-O-isopropylidene-D-erythronate, ethyl 4-(6-aminopurin-9-yl)-4-deoxy-2,3-O-isopropylidene-D-erythronate),
N-lower alkyl -4-(6-aminopurin-9-yl)-4-deoxy-2,3-O-lower alkylidene-D-erythronamide (e.g. N-ethyl-4-(6-aminopurin-9-yl)-4-deoxy-2,3-O-isopropylidene-D-erythronamide)
4-(6-aminopurin-9-yl)-4-deoxy-2,3-O-di(lower)-alkanoyl-D-erythronic acid (e.g. 4-(6-aminopurin-9-yl)-4-deoxy-2,3-O-diacetyl-D-erythronic acid,
4-(6-aminopurin-9-yl)-4-deoxy-2,3-O-dipropionyl-D-erythronic acid),
lower alkyl 4-(6-aminopurin-9-yl)-4-deoxy-2,3-O-di(lower)alkanoyl-D-erythronate (e.g. methyl 4-(6-aminopurin-9-yl)-4-deoxy-2,3-O-diacetyl-D-erythronate),
4-(6-amino-8-lower alkylpurin-9-yl)-4-deoxy-D-erythronic acid (e.g. 4-(6-amino-8-methylpurin-9-yl)-4-deoxy-D-erythronic acid,
4-(6-amino-8-ethylpurin-9-yl)-4-deoxy-D-erythronic acid),
4-6-amino-8-lower alkylpurin-9-yl)-4-deoxy-2,3-O-lower alkylidene-D-erythronic acid (e.g. 4-(6-amino-8-methylpurin-9-yl)-4-deoxy-2,3-O-isopropylidene-D-erythronic acid,
4-(6-amino-8-ethylpurin-9-yl)-4-deoxy-2,3-O-isopropylidene-D-erythronic acid),
4-(6-amino-8-mercaptopurin-9-yl)-4-deoxy-D-erythronic acid,
4-(6-amino-8-mercaptopurin-9-yl)-4-deoxy-2,3-O-lower alkylidene-D-erythronic acid (e.g. 4-(6-amino-8-mercaptopurin-9-yl)-4-deoxy-2,3-O-isopropylidene-D-erythronic acid),
4-(6,8-diaminopurin-9-yl)-4-deoxy-D-erythronic acid,
4-(6-amino-8-hydroxypurin-9-yl)-4-deoxy-D-erythonic acid,
4-(2-lower alkylthio-6-aminopurin-9-yl)-4-deoxy-D-erythronic acid (e.g. 4-(2-methylthio-6-aminopurin-9-yl)-4-deoxy-D-erythronic acid,
4-(2-ethylthio-6-aminopurin-9-yl)-4-deoxy-D-erythronic acid),
4-(2-lower alkyl-6-aminopurin-9-yl)-4-deoxy-D-erythronic acid (e.g. 4-(2-methyl-6-aminopurin-9-yl)-4-deoxy-D-erythronic acid),
4-(2,6-diaminopurin-9-yl)-4-deoxy-D-erythronic acid,
4-(2-hydroxy-6-aminopurin-9-yl)-4-deoxy-D-erythronic acid,
4-(6-lower alkylaminopurin-9-yl)-4-deoxy-D-erythronic acid (e.g. 4-methylaminopurin-9-yl)-4-deoxy-D-erythronic acid,
4-ethylaminopurin-9-yl)-4-deoxy-D-erythronic acid,
4-(6-butylaminopurin-9-yl)-4-deoxy-D-erythronic acid),
4-(6-lower alkylaminopurin-9-yl)-4-deoxy-2,3-O-lower alkylidene-D-erythronic acid (e.g. 4-(ethylaminopurin-9-yl)-4-deoxy-2,3-O-isopropylidene-D-erythronic acid),
4-(6-di-(lower)alkylaminopurin-9-yl)-4-deoxy-D-erythronic acid (e.g. 4-(6-dimethylaminopurin-9-yl)-4-deoxy-D-erythronic acid,
4-(6-diethylaminopurin-9-yl)-4-deoxy-D-erythronic acid),
4-(6-hydroxyaminopurin-9-yl)-4-deoxy-D-erythronic acid,
4-[6-phenyl(lower)alkylaminopurin-9-yl]-4-deoxy-D-erythronic acid (e.g. 4-(6-benzylaminopurin-9-yl)-4-deoxy-D-erythronic acid,
4-(6-phenethylaminopurin-9-yl)-4-deoxy-D-erythronic acid),
4-(6-benzoylaminopurin-9-yl)-4-deoxy-D-erythronic acid,
4-(6-hydroxypurin-9-yl)-4-deoxy-D-erythronic acid,
lower alkyl 4-(6-hydroxypurin-9-yl)-4-deoxy-D-erythronate (e.g. methyl 4-(6-hydroxypurin-9-yl)-4-deoxy-D-erythronate,
ethyl 4-(6-hydroxypurin-9-yl)-4-deoxy-D-erythronate),
4-(6-hydroxypurin-9-yl)-4-deoxy-D-erythronamide,
lower alkyl 4-(6-hydroxypurin-9-yl)-4-deoxy-2,3-O-di(lower)alkanoyl-D-erythronate (e.g. methyl 4-(6-hydroxypurin-9-yl)-4-deoxy-2,3-O-diacetyl-D-erythronate,
ethyl 4-(6-hydroxypurin-9-yl)-4-deoxy-2,3-O-diacetyl-D-erythronate),
4-(6,8-dihydroxypurin-9-yl)-4-deoxy-D-erythronic acid,
4-(2,6-dihydroxypurin-9-yl)-4-deoxy-D-erythronic acid,
4-(2-amino-6-hydroxypurin-9-yl)-4-deoxy-D-erythronic acid,
4-(6-halopurin-9-yl)-4-deoxy-D-erythronic acid (e.g. 4-(6-chloropurin-9-yl)-4-deoxy-D-erythronic acid,
4-(6-bromopurin-9-yl)-4-deoxy-D-erythronic acid),
4-(6-halopurin-9-yl)-4-deoxy-2,3-O-lower alkylidene-D-erythronic acid (e.g. 4-(6-chloropurin-9-yl)-4-deoxy-2,3-O-isopropylidene-D-erythronic acid,
4-(6-bromopurin-9-yl)-4-deoxy-2,3-O-isopropylidene-D-erythronic acid),
4-(6-mercaptopurin-9-yl)-4-deoxy-D-erythronic acid,
4-(6-lower alkylthiopurin-9-yl)-4-deoxy-D-erythronic acid (e.g. 4-(6-methylthiopurin-9-yl)-4-deoxy-D-erythronic acid,
4-(6-ethylthiopurin-9-yl)-4-deoxy-D-erythronic acid),
4-(6-lower alkoxypurin-9-yl)-4-deoxy-D-erythronic acid (e.g. 4-(6-methoxypurin-9-yl)-4-deoxy-D-erythronic acid),
4-(6-lower alkanoylaminopurin-9-yl)-4-deoxy-D-erythronic acid (e.g. 4-(6-acetylaminopurin-9-yl)-4-deoxy-D-erythronic acid,
4-(6-butylaminopurin-9-yl)-4-deoxy-D-erythronic acid),
3-(6-aminopurin-9-yl-2-hydroxy-3-hydroxymethylpropionic acid,
6-amino-9-(3-carboxy-2,3-dihydroxypropyl)-purin-1-oxide,
6-amino-9-(3-carboxy-2,3-isopropylideneoxypropyl)-purin-1-oxide,
4-(6-aminopurin-9-yl)-4-deoxy-L-threonic acid, etc.

In the course of the study on the pharmacologically active components in Lentinus edodes, there has been isolated a hypocholesterolemic substance. The subsequent study has revealed that the chemical structure of this substance corresponds to the following formula:

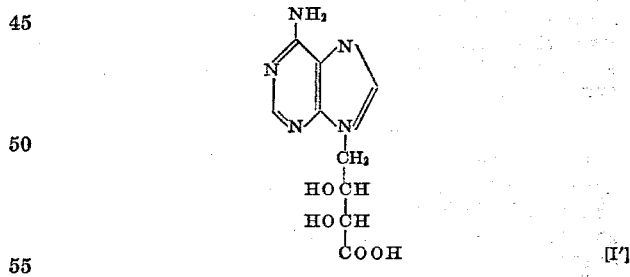

4-(6-Aminopurin-9-yl)-4-deoxy-D-erythronic acid

The correctness of the structure has been evidenced by identification of a specimen of 4-(6-aminopurin-9-yl)-4-deoxy-D-erythronic acid synthesized artificially. Developing from this finding, there have been synthesized a number of chemical compounds having the formula [I], and the possession of marked hypocholesterolemic activity by them has been confirmed.

Accordingly, a basic object of the present invention is to embody the hypocholesterolemic substance. Another object of this invention is to embody the artificial purine compounds [I] having hypocholesterolemic activity. A further object of the invention is to embody a method for preparing the hypocholesterolemic substance from Lentinus edodes. A still further object of the invention is to embody a method for synthesis of the novel purine compounds [I]. These and other objects will be apparent to those conversant with the art to which the present invention pertains from the subsequent descriptions.

According to the present invention, the hypocholesterolemic substance is obtained by a method which comprises extracting Lentinus edodes with water or aqueous alcohol, passing the extract through an acidic or a basic ion-exchange resin to adsorb the active component thereon, eluting the ion-exchange resin with an acidic or a basic solution, passing the eluate through an adsorbent to adsorb the active substance thereon, eluting the adsorbent with a solvent, collecting the fractions showing an adsorption around 260 mμ in the ultraviolet absorption spectrum and removing the solvent from the collected fractions.

Lentinus edodes is first extracted with water or aqueous alcohol. The starting plant may be fresh, dried or crumbled ones. The water to be used as the extraction solvent may be water itself or water acidified with an acid or alkalified with an alkali. Examples of the acid are mineral acids (e.g. hydrochloric acid, sulfuric acid), perchloric acid, acetic acid, trichloroacetic acid, etc. Examples of the alkali are ammonium hydroxide, sodium hydroxide, potassium hydroxide, etc. The acid or alkali may be also used in the form of a buffer solution. The alcohol to be employed as the extraction solvent may be, for instance, methanol, ethanol, isopropanol or the like. When Lentinus edodes is the fresh one, the use of absolute alcohol is substantially same as that of aqueous alcohol and fallen within the scope of the present invention.

The resulting extract is passed through an acidic or a basic ion-exchange resin with or without previous concentration to adsorb the active component thereon. Prior to the passing, the said extract may be treated with a suitable solvent such as ether to extract impure materials. As the acidic or basic ion-exchange resin, there may be exemplified strongly acidic ones having sulfonic groups, weakly acidic ones having carboxyl groups, strongly basic ones having quaternary ammonium groups or weakly basic ones having primary to tertiary amino groups, among which the use of the strongly acidic or basic one is preferred.

The acidic or basic ion-exchange resin is then eluted with an acidic or a basic solution. As the acidic or basic solution, there may be employed aqueous hydrochloric acid, aqueous ammonia, pyridine-acetic acid buffer, etc.

Then, the eluate is passed through an adsorbent with or without concentrating and dissolving water previously to adsorb the active substance thereon. Examples of the adsorbent are ion-exchange resin, silica gel, alumina, diatomaceous earth, cellulose powder, magnesium silicate, calcium sulfate, Cephadex, active carbon, etc.

The adsorbent is then eluted with an organic or inorganic solvent. Examples of the solvent are aqueous ammonia, aqueous hydrochloric acid, acidic aqueous alcohol, pyridine-acetic acid buffer, etc. For eluting the active substance effectively, there may be preferably adopted a gradient elution procedure where the concentrations of the elution solvent are gradiently changed.

Among the thus obtained eluates, the fractions showing an absorption around 260 mμ in the ultraviolet absorption spectrum are collected and concentrated, preferably under reduced pressure, to dryness.

The thus obtained crude product may be crystallized from water, if necessary, with previous repetition of the above adsorption and elution operations to give the pure active substance.

The crystalline active substance has the following physico-chemical properties:

(1) Elementary analysis (for crystals after drying at 80 to 90° C. for 2 hours): C, 42.83%; H, 4.41%; N, 26.96%; O, 25.32%.

(2) Molecular weight:

The methyl ester (M.P. 231° C. (decomp.)) obtained by methylating the active substance: 276 (determined by mass spectrum).

The diacetate methyl ester (M.P. 225° C. (decomp.)) obtained by acetylating and methylating the active substance: 351 (determined by mass spectrum).

(3) Melting point: 279° C. (decomp.).

(4) Specific rotation: $[\alpha]_D^{26} +31°$ (c.=0.46, in dimethylsulfoxide). ]

(5) Ultraviolet absorption spectrum:

$\lambda_{max.}^{H_2O}$ 261 mμ ($\epsilon$=14,300) (cf. Fig. 1 in the attached drawings).

Figure 2:
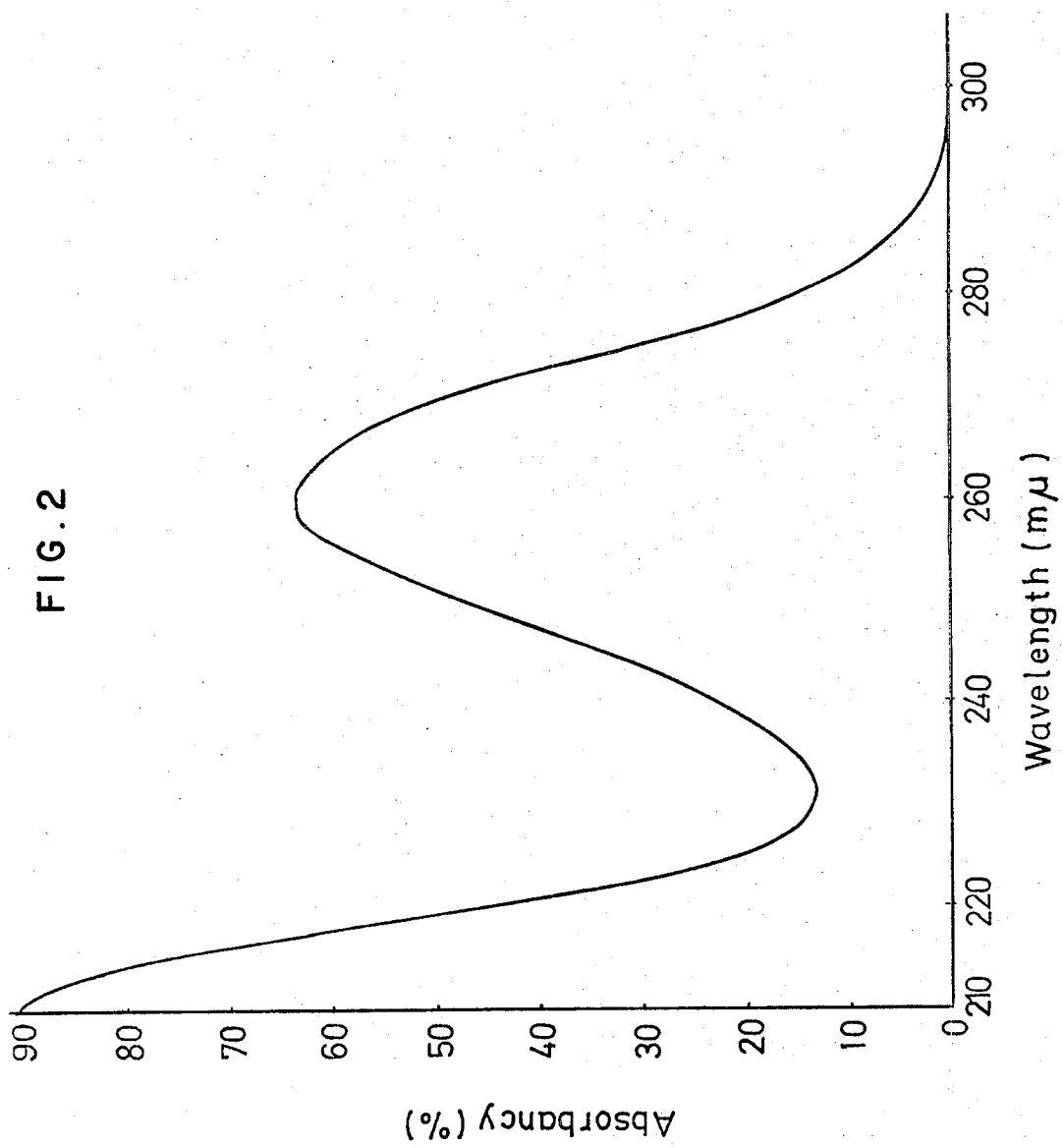

$\lambda_{max.}^{0.5N\ HCl}$ 260 mμ ($\epsilon$=14,000) (cf. Fig. 2 in the attached drawings).

Figure 3:
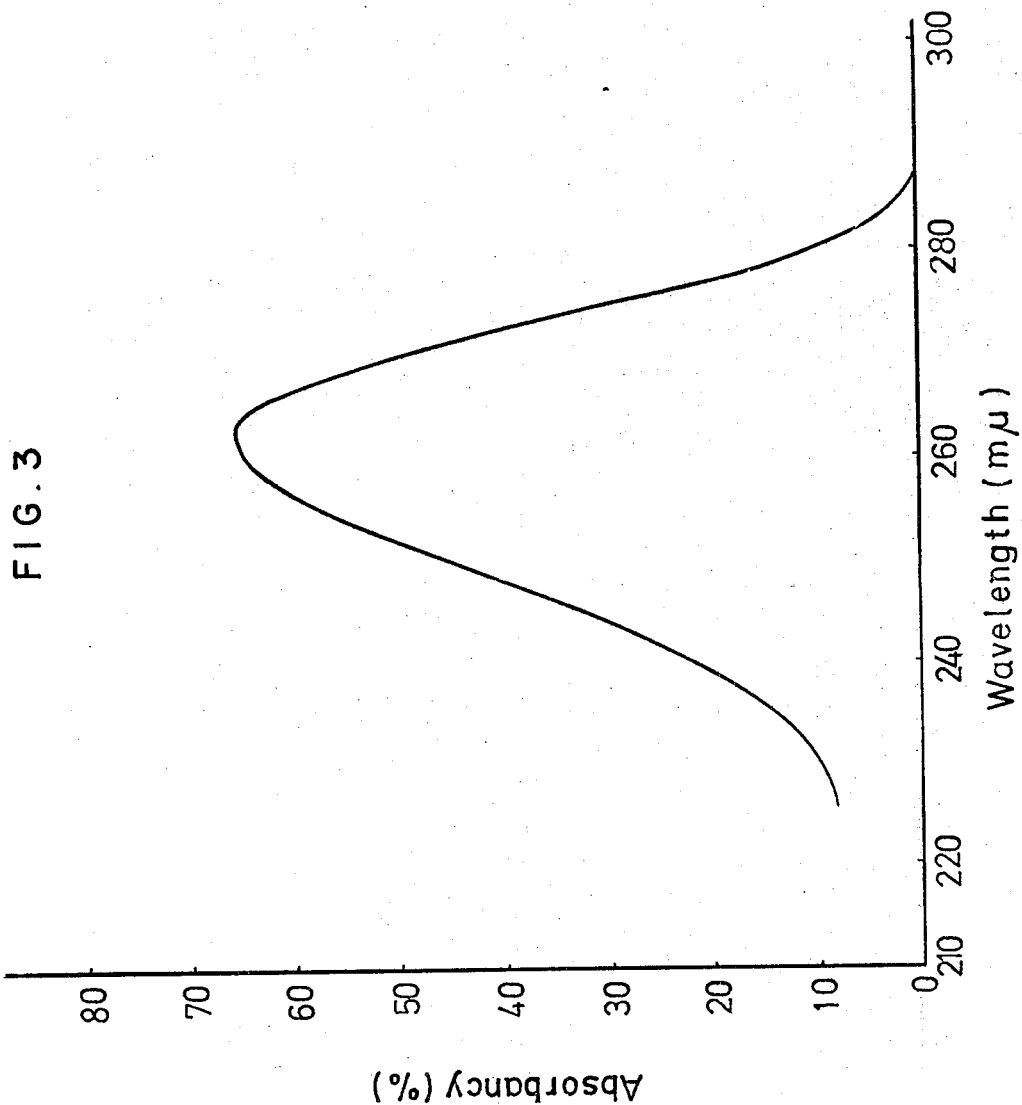

$\lambda_{max.}^{0.5N\ NaOH}$ 261 mμ ($\epsilon$=14,300) (cf. Fig. 3 in the attached drawings).

Figure 4:
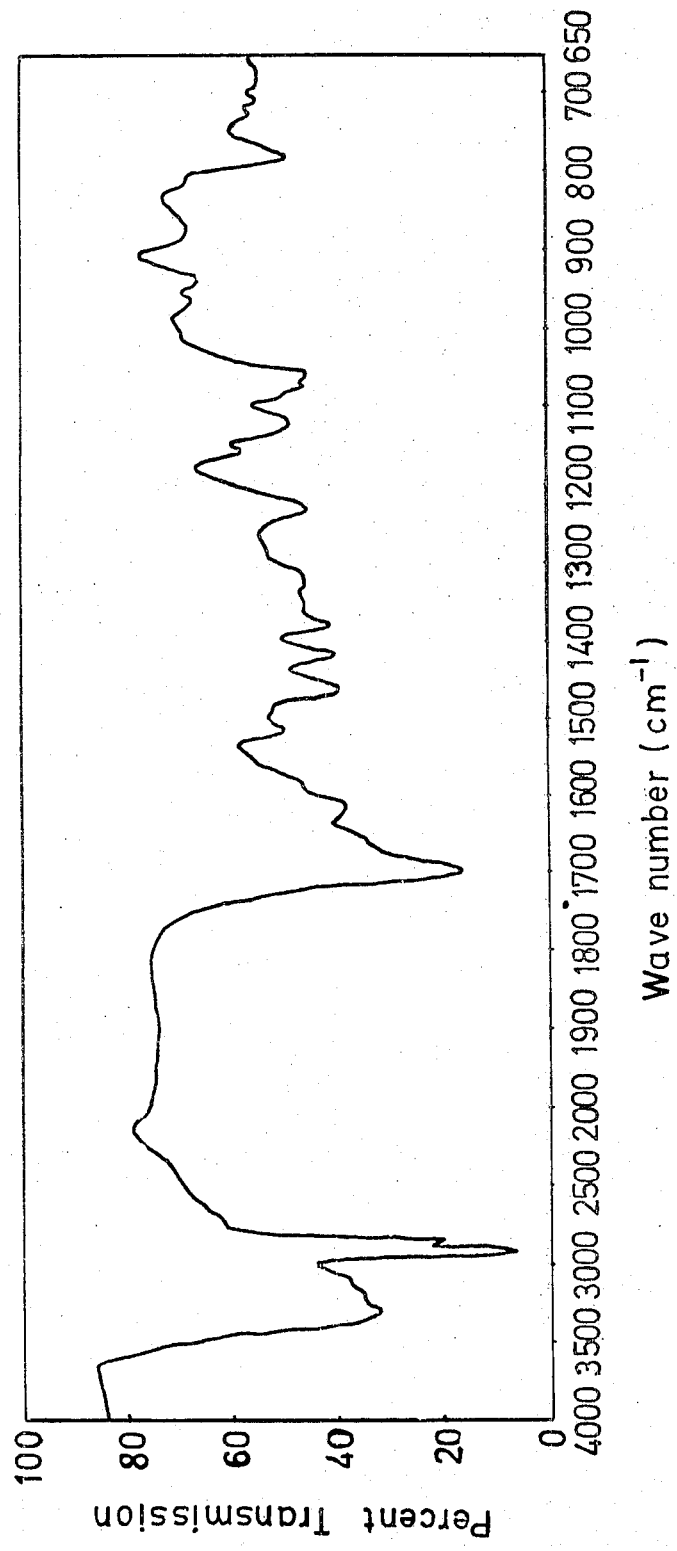

(6) Infrared absorption spectrum:

In a Nujol mull, the active substance affords a characteristic band at 1690 cm.$^{-1}$ (cf. FIG. 4 in the attached drawings).

(7) Solubility: insoluble in methanol and ethanol; sparingly soluble in water but fairly soluble in acidic and basic water.

(8) Coloring reaction: negative in Molisch reaction, orcinol test and ammonium molybdate test; positive in periodic acid-benzidine test.

In addition, the active substance affords singlets at 8.01 p.p.m. ($\delta$) and 8.15 p.p.m. ($\delta$) and a wide singlet at 7.12 p.p.m. ($\delta$) for two hydrogen atoms which can be exchanged with heavy water in the nuclear magnetic resonance. Further, it is methylated with diazomethane and also is diacetylated with acetic anhydride and pyridine, from which the presence of a carboxyl group and two hydroxyl groups may be presumed.

On the basis of these and other physico-chemical properties, the chemical structure of the crystalline active substance has been determined as represented by the said formula [I′], i.e. 4-(6-aminopurin - 9 - yl) - 4 - deoxy-D-erythronic acid.

For synthesis of the purine compounds [I], there may be adopted various methods, most of which are fallen in the following classification:

(1) Construction of the fundamental structure (purine nucleus+9-side chain)
  (1-1) Ring closure
    (1-1-1) From pyrimidine nucleus
    (1-1-2) From imidazole nucleus
  (1-2) N-Substitution (2) Conversion on the fundamental structure
  (2-1) Hydrolysis
  (2-2) Reduction
  (2-3) Amination
  (2-4) Esterification
  (2-5) Amidation
  (2-6)-Acylation
  (2-7) Acetalation
  (2-8) Other conversions Some typical procedures in each class will be hereinafter illustrated in detail.

(1-1-1) RING CLOSURE FROM PYRIMIDINE NUCLEUS

One of the procedures fallen in this category is representable by the following formulae:

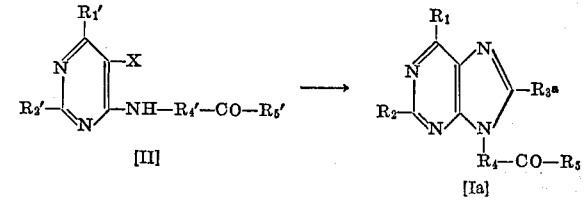

wherein $R_1'$ is hydrogen, halogen (e.g. chlorine, bromine, iodine, fluorine), hydroxyl, mercapto, lower alkoxy (e.g. methoxy, ethoxy, propoxy, isopropoxy), ar(lower)alkoxy such as phenyl(lower)alkoxy (e.g. benzyloxy, phenethyloxy), lower alkylthio (e.g. methylthio, ethylthio, propylthio), amino, lower alkylamino (e.g. methylamino, ethylamino, propylamino), di(lower)alkylamino (e.g. dimethylamino, diethylamino, methylethylamino), ar(lower)alkylamino such as phenyl(lower)alkylamino (e.g. benzylamino, phenethylamino), hydroxyamino, lower alkoxyamino (e.g. methoxyamino, ethoxyamino, propoxyamino), ar(lower)alkoxyamino such as phenyl(lower)alkoxyamino (e.g. benzyloxyamino, phenethyloxyamino) or aryloxyamino such as phenoxyamino; $R_2'$ is hydrogen, halogen (e.g. chlorine, bromine, iodine, fluorine), hydroxyl, mercapto, amino, lower alkyl (e.g. methyl, ethyl, propyl, isopropyl), aryl such as phenyl, lower alkoxy (e.g. methoxy, ethoxy, propoxy, isopropoxy), ar(lower)alkoxy such as phenyl(lower)alkoxy (e.g. benzyloxy, phenethyloxy) or lower alkylthio (e.g. methylthio, ethylthio, propylthio); $R_3^a$ is hydrogen, hydroxyl, mercapto, amino, lower alkyl (e.g. methyl, ethyl, propyl, isopropyl) or aryl such as phenyl; $R_4'$ is lower alkylene preferably having 2 to 6 carbon atoms (e.g. ethylene, trimethylene, propylene) substituted with one or more hydroxyls (but no hydroxyl group being present at the carbon atom adjacent to the ring nitrogen atom) which may be provided with acyl such as lower alkanoyl (e.g. acetyl, propionyl) or benzoyl, lower alkyl (e.g. methyl, ethyl, isopropyl), ar(lower)alkyl such as phenyl(lower)alkyl (e.g. benzyl, phenethyl) or, when a pair of hydroxyls exist on the alkylene group, with lower alkylidene (e.g. propylidene, isopropylidene) or ar(lower)alkylidene such as phenyl(lower)alkylidene (e.g. benzylidene); $R_5'$ is hydroxyl, lower or higher alkoxy (e.g. methoxy, ethoxy, propoxy, isopropoxy, octyloxy, decyloxy, heptadecyloxy), amino, lower alkylamino (e.g. methylamino, ethylamino, propylamino) or di(lower)alkylamino (e.g. dimethylamino, diethylamino, methylethylamino); X is amino, nitro, nitroso, aryldiazo such as phenyldiazo or acylamino such as formylamino or lower alkanoylamino (e.g. acetylamino, propionylamino, butyrylamino) and $R_1$, $R_2$, $R_4$ and $R_5$ are each as defined above.

The pyrimidine compound [II] is subjected to a chemical treatment suitably selected on the kind of the symbol X in the former to give the purine compound [Ia].

For instance, the pyrimidine compound [II: X=amino] is reacted with formic acid or its functional derivative such as formamide, lower alkyl formate, N,N-di(lower)-alkylformamide, lower alkyl orthoformate, lower alkyl formimidate, sodium dithioformate or formamidine, if necessary, followed by heating or treatment with a base. The main reaction is usually carried out at a temperature from room temperature to the boiling temperature of the reaction medium, if necessary, in a solvent such as water, methanol or ethanol. When desired, there may be used a condensing agent such as hydrochloric acid, acetic anhydride, sodium alkoxide or phosphorus oxychloride depending on the kind of the reagent. The subsequent treatment with a base such as alkali metal hydroxide (e.g. sodium hydroxide, potassium hydroxide), alkaline earth metal hydroxide (e.g. calcium hydroxide, magnesium hydroxide), alkali metal alkoxide (e.g. sodium methoxide, potassium methoxide, sodium ethoxide) or tertiary amine (e.g. trimethylamine, triethylamine, N-methylpiperazine, pyridine) is ordinarily effected in a solvent such as water or aqueous alcohol.

Further, for instance, the pyrimidine compound [II: X=amino] is reacted with a thiocarbonic acid derivative such as thiophosgene, thiourea, sodium xanthogenate, potassium xanthogenate, carbon disulfide, dimethyl thiocarbonate, diethyl thiocarbonate or 1,1'-(thiocarbonic acid) diimidazole. The reaction is normally performed in a solvent such as water, methanol, ethanol or propanol at a temperature from room temperature to the boiling temperature of the reaction medium, if necessary, in the presence of a condensing agent such as alkali metal alkoxide (e.g. sodium methoxide, sodium ethoxide, potassium ethoxide) or tertiary amine (e.g. triethylamine pyridine).

Further, for instance, the pyrimidine compound [II: X=nitro, nitroso or aryldiazo] is reduced in the presence of formic acid, if necessary, followed by heating or treatment with a base. For the reduction, there may be adopted the combination of a metal (e.g. iron, tin, zinc) with an acid (e.g. hydrochloric acid, acetic acid), the combination of a metal (e.g. sodium, amalgamated sodium, amalgamated aluminum, zinc, iron) with water or an alkanol (e.g. methanol, ethanol), a sulfide (e.g. ammonium sulfide, ammonium hydrosulfide, sodium sulfide, sodium polysulfide, sodium hydrosulfide, hydrogen sulfide), sodium dithionite or sodium bisulfite, phenylhydrazine or hydrazine, the combination of titanium trichloride with hydrochloric acid, the combination of hydroiodic acid with hypophosphorous acid, electrolytic reduction or the like. Particularly preferred is catalytic reduction using a catalyst such as platinum, platinum oxide, palladium, palladium oxide, palladium-carbon, palladium-barium sulfate, palladium-barium carbonate, palladium-silica gel, rhodium, iridium, ruthenium, nickel oxide, Raney nickel, Raney cobalt, reductive iron, Raney iron, reductive copper, Raney copper, Ullmann copper or zinc. The reduction is usually effected in a solvent suitably selected depending on the kinds of the reducing agent and the catalyst. As the base for the subsequent treatment, there may be used alkali metal hydroxide (e.g. sodium hydroxide, potassium hydroxide), alkaline earth metal hydroxide (e.g. calcium hydroxide, magnesium hydroxide), alkali metal alkoxide (e.g. sodium methoxide, sodium ethoxide, potassium ethoxide), tertiary amine (e.g. trimethylamino, triethylamine, N-methylpiperazine, pyridine) or the like. In the case, the treatment is normally effected in a solvent such as water or aqueous alcohol.

Furthermore, for instance, the pyrimidine compound [II: X=acylamino] is heated or treated with a base. The heating is usually carried out in a solvent (e.g. formamide, dimethylformamide, dimethylsulfoxide), preferably in the presence of a dehydrating agent (e.g. acetic anhydride). As the base, there may be exemplified alkali metal hydroxide (e.g. sodium hydroxide, potassium hydroxide), alkaline earth metal hydroxide (e.g. calcium hydroxide, magnesium hydroxide), alkali metal alkoxide (e.g. sodium methoxide, sodium ethoxide, potassium ethoxide), tertiary amine (e.g. trimethylamine, triethylamine, N-methylpiperazine), ammonia, etc. The treatment with the base is normally executed in a solvent such as water, alcohol or aqueous alcohol.

In the course of the said various processes, one or more of the substituents represented by the symbols $R_1'$, $R_2'$, $R_4'$ and $R_5'$ may be influenced. Some examples of such influence are as follows: conversion of the halogen atom represented by $R_1'$ or $R_2'$ into hydroxyl, lower alkoxy or mercapto, conversion of the acylated or etherified hydroxyl group in $R_4'$ into free hydroxyl, conversion of the lower alkoxy or amino group represented by $R_5'$ into free hydroxyl, etc.

The starting pyrimidine compounds [II] can be produced by various methods, some of which are shown in the following scheme:

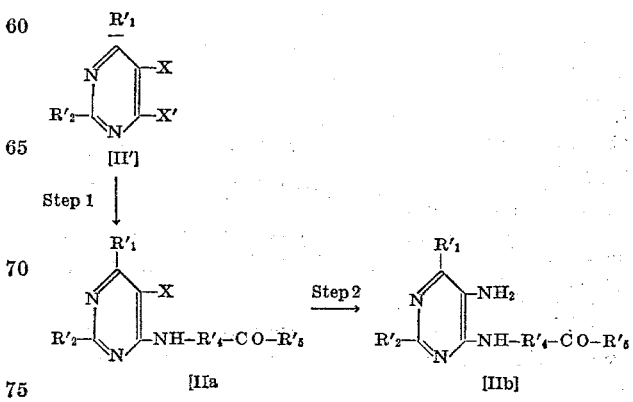

Step 3

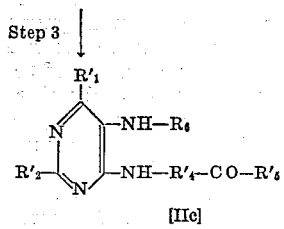

[IIc]

wherein $R_1'$, $R_2'$, $R_4'$, $R_5'$ and X are each as defined above, $R_6$ is acyl such as formyl or lower alkanoyl (e.g. acetyl, propionyl, butyryl) and X' is halogen (e.g. chlorine, bromine).

The reaction in the step 1 is carried out by treating the compound [II'] with a reagent of the formula:

$$H_2N—R_4'—CO—R_5'$$

[II'] wherein $R_4'$ and $R_5'$ are each as defined above.

The reaction is applicable to any of the compounds [II'] irrespective of the meaning of X.

Specific examples of the compound [II'] as the starting material are 2,6-dihydro-4-chloro-5-nitropyrimidine,
6-amino-5-nitro-4-chloropyrimidine,
6-hydroxy-5-nitro-4-chloropyrimidine,
2-amino-6-hydroxy-5-nitro-4-chloropyrimidine,
6-mercapto-5-nitro-4-chloropyrimidine,
2-butyl-4,6-dichloro-5-nitropyrimidine,
2-butyl-4,6-dichloro-5nitropyrimidine,
6-hydroxyamino-5-nitro-4-chloropyrimidine,
2-methyl-4,6-dichloro-5-nitropyrimidine,
2,4-dichloro-5-nitropyrimidine,
2,4,6-trichloro-5-nitropyrimidine,
2-butyl-4-chloro-5-nitro-6-aminopyrimidine,
6-methoxyamino-5-nitro-4-chloropyrimidine,
2-methyl-4-chloro-5-nitro-6-aminopyrimidine,
2,4-dichloro-5-nitro-6-aminopyrimidine,
4-chloro-5-nitro-6-dimethylaminopyrimidine,
4-chloro-5-nitro-6-methylaminopyrimidine,
2-methyl-4-chloro-5-nitro-6-ethoxypyrimidine,
4-chloro-5-nitro-6-methoxypyrimidine,
4-chloro-5-nitropyrimidine,
4-chloro-5-nitro-6-ethoxypyrimidine,
2-methoxy-4,6-dichloro-5-nitro-pyrimidine,
4-chloro-5-nitro-6-diethylaminopyrimidine,
2,6-dimethylthio-4-chloro-5-nitropyrimidine,
2-methylthio-4,6-dichloro-5-nitropyrimidine,
2-methylthio-4-chloro-5-nitro-6-aminopyrimidine,
2,4-dichloro-5-nitro-6-diethylaminopyrimidine,
4-chloro-5-nitro-6-benzyloxypyrimidine,
2,6-diamino-4-chloro-5-nitropyrimidine,
4-chloro-5-nitro-6-benzylamino-pyrimidine,
4,-6-dichloro-5-nitropyrimidine, etc.

The compounds as mentioned above but substituted hydrogen, nitroso, aryldiazo, amino or acylamino for the nitro group at the 5-postion may be also employed.

Examples of the reagent [II"] are the carboxylic acids bearing an amino group at the ω-position, and their amides and alkyl esters. As the said carboxylic acids, there may be exemplified, 2-hydroxybutyric acid, 3-hydroxybutyric acid, 3 - hydroxyvaleric acid, 4-hydroxyvaleric acid, 4-hydroxycaproic acid, 5-hydroxycaproic acid, 4,5-dihydroxycaproic acid, 5 - hydroxyenantic acid, 3,5 - dihydroxycaprylic acid, erythronic acid, threonic acid, and the like.

The reaction is usually effected in a solvent (e.g. water, methanol, ethanol, dioxane). The reaction temperature is not limitative, and the reaction may be carried out at room temperature or while heating. If desired, there may be employed an acid-eliminating agent such as tertiary amine (e.g. triethylamine, pyridine), alkali metal carbonate, alkali metal hydroxide or alkali alkoxide.

The reaction in the step 2 is carried out by subjecting the compound [IIa] to reduction.

The reaction is particularly applicable to the compound [IIa] wherein X is nitro, nitroso or aryldiazo.

Examples of the reduction procedure to be adopted are reduction with the combination of a metal (e.g. iron, zinc, tin) and an acid (e.g. hydrochloric acid, formic acid), reduction with the combination of a metal (e.g. sodium, sodium amalgam, aluminum amalgam, zinc, iron) and water or an alcohol, reduction with a sulfide (e.g. ammonium sulfide, ammonium hydrosulfide, sodium sulfide, sodium polysulfide, sodium hydrosulfide, sodium sulfide, sodium polysulfide, sodium hydrosulfide, hydrogen sulfide), reduction with sodium dithionite, sodium hydrogensulfite or potassium hydrogensulfite, reduction with phenylhydrazine or hydrazine, reduction with the combination of titanium trichloride and hydrochloric acid, reduction with the combination of hydroiodic acid and hypophosphorous acid, electrolytic reduction and catalytic reduction. Of these, the last one is the most preferred.

For the catalytic reduction, the following catalyst may be used: e.g. platinum wire, platinum plate, platinum sponge, platinum black, platinum oxide, colloidal platinum, palladium sponge, palladium black, palladium oxide, colloidal palladium, palladium-barium sulfate, palladium carbon, palladium-barium carbonate, palladium-silica gel, rhodium, iridium, colloidal rhodium, colloidal iridium, reduced nickel, oxidized nickel, Raney nickel, Urushibara nickel, nickel catalyst resulting from pyrolysis of nickel formate, reduced cobalt, Raney cobalt, Urushibara cobalt, reduced iron, Raney iron, reduced copper, Raney copper, Ullmann copper, etc. The reduction is ordinarily effected in a solvent (e.g. water, formic acid, methanol, ethanol). During the reduction, the hydroxyamino, lower alkoxyamino, ar(lower)alkoxyamino or aryloxyamino group represented by $R_1'$ in the compound [IIa] may be simultaneously reduced to amino.

The reaction in the step 3 is concerned with the conversion of X (the compound [Ia]) into NH—$R_6$ (the compound [Ic]). This reaction is particularly applicable to the compound [Ia] wherein X is amino, nitro, nitroso or aryldiazo. The reaction is carried out by treating the compound [Ia] with an acylating agent, when X is not amino, while reduction.

When the starting material in this step is the compound [Ia] wherein X is amino, the treatment is effected by reacting the same with an acylating agent, usually in a solvent (e.g. water, methanol, ethanol, formic acid, formamide) at room temperature or while heating. Examples of the acylating agent are formic acid and reactive derivatives of lower alkanoic acid at its carboxyl group such as acid halide (e.g. acid chloride), acid anhydride, amide, azide and ester (e.g. methyl ester, ethyl ester). Examples of lower alkanoic acid are acetic acid, propionic acid, butyric acid, valeric acid, isovaleric acid and the like.

When the starting material in this step is the compound [Ia] wherein X is nitro, nitroso or aryldiazo, the reaction is effected by reducing the same in the presence of an acylating agent usually in a solvent (e.g. water, aqueous alcohol) at room temperature or while heating.

As the reduction procedure, there may be adopted a variety of conventional procedures as mentioned in connection with the step 2. Particularly preferred is the catalytic reduction. Examples of the acylating agent are as defined above. Preferred is formic acid or anhydride of lower alkanoic acid.

In the course of the reaction in this step, the alkylthio, alkoxy or aralkoxy group or the halogen atom represented by $R_1'$ and the alkoxy or aralkoxy group or the halogen atom represented by $R_2'$ may be converted into hydroxyl. When the hydroxyl groups in the hydroxylated alkylene group represented by $R_4'$ are protected as alkylidene or aralkylidene, such protective group may be eliminated. Further, the free hydroxyl group in the hydroxylated alkylene group represented by $R_4'$ may be acylated to lower alkanoyloxy. Furthermore, the hydroxyamino, lower alkoxyamino, ar(lower)alkoxyamino or aryloxyamino group represented by $R_1'$ may be reduced to amino. All these side reactions are, however, within the scope of this invention, insofar as those do not block the preceding of the main reaction in this step.

In addition to the said reactions, various and numerous optional reactions may be applied to the products in the steps 1 to 3.

One of such optional reactions is esterification, which may be carried out by treating the products wherein the group represented by $R_5'$ is hydroxyl with an acylating agent in a conventional manner. Another of such optional reactions is amidation, which may be effected by treating the products wherein the group represented by $R_5'$ is hydroxyl or its functional derivative at the carboxyl group with an amine in a conventional manner. Further one of such optional reactions is hydrolysis which may be carried out by treating the products bearing one or more hydrolyzable groups such as acylated hydroxyl, esterified carboxyl or carbamoyl with an acidic or basic substance in a conventional manner so that the said hydrolyzable group is converted into the corresponding free group such as free hydroxyl, free amino or free carboxyl.

The pyrimidine compounds [II] obtained as above may be converted into their salts such as metal salts (e.g. sodium salt, potassium salt, calcium salt), ammonium salt, amine salts (e.g. dimethylamine salt, trimethylamine salt, dicyclohexylamine salt) and acid-addition salts, i.e. organic and inorganic acid-addition salts (e.g. hydrochloride, hydrobromide, sulfate, nitrate, phosphate, tartrate, citrate), by per se conventional procedures.

The pyrimidine compounds [II] and their non-toxic salts are per se useful as hypocholesterolemic agents in addition to their utility as the starting materials for production of purine compounds [Ia].

(1–1–2) RING CLOSURE FROM IMIDAZOLE NUCLEUS

One of the procedures fallen in this category is representable by the following formulae:

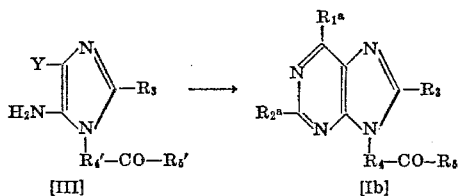

wherein $R_1^a$ is amino or hydroxyl, $R_2^a$ is hydrogen, amino, lower alkyl (e.g. methyl, ethyl, propyl), aryl such as phenyl or ar(lower)alkyl such as phenyl(lower)alkyl (e.g. benzyl, phenethyl); Y is cyano, carbamoyl, amidino or $-C(=NH)(O-lower\ alkyl)$; and $R_3$, $R_4$, $R_5$, $R_4'$ and $R_5'$ are each as defined above.

The imidazole compound [III] is reacted with an imidic acid derivative of the formula:

wherein $R_6$ is hydrogen, lower alkyl (e.g. methyl, ethyl, propyl), aryl such as phenyl or ar(lower)alkyl such as phenyl(lower)alkyl (e.g. benzyl, phenethyl) and $R_7$ is amino or lower alkoxy (e.g. methoxy, ethoxy, propoxy) or with an orthocarboxylic acid ester of the formula:

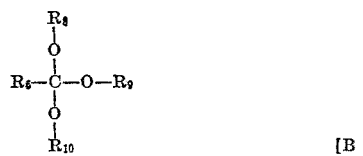

wherein $R_8$ is lower alkanoyl (e.g. acetyl, propionyl, butyryl) or lower alkyl (e.g. methyl, ethyl, propyl), $R_9$ and $R_{10}$ are each lower alkyl (e.g. methyl, ethyl, propyl) and $R_6$ is as defined above and ammonia to give the purine compound [Ib]. The reaction is usually carried out in a solvent such as water, methanol or ethanol, in case of the reagent [B], preferably in the presence of an acid such as hydrochloric acid, sulfuric acid, acetic anhydride, p-toluenesulfonic acid or the like. When the starting compound is the imidazole compound [III: Y=carbamoyl], there is obtained as the product the purine compound [Ib: $R_1^a$=hydroxyl]. In other cases, the product is the purine compound [Ib: $R_1^a$=amino].

In the course of the said process, one or more of the substituents represented by the symbols $R_4'$ and $R_5'$ may be influenced. Some examples of such influence are as follows: conversion of the acylated or etherified hydroxyl group represented by $R_4'$ into free hydroxyl, conversion of the hydroxyl or lower alkoxy group represented by $R_5'$ into amino, etc.

The starting imidazole compound [III] may be produced by various methods. For instance, 4-(4-cyano-5-amino-1-imidazolyl)-4-deoxy-D-erythronic acid is prepared by reacting ethyl N-(dicyanomethyl)-formimidate with 4-amino-4-deoxy-D-erythronic acid. Other starting compounds can be produced in the similar manner.

(1–2) N-SUBSTITUTION

The procedure represented by the following formulae comes in this category:

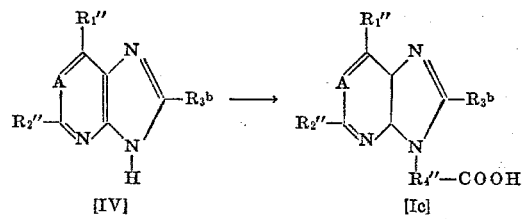

wherein $R_1''$ is hydrogen, lower alkoxy (e.g. methoxy, ethoxy, propoxy), amino, lower alkylamino (e.g. methylamino, ethylamino, propylamino), di(lower)alkylamino (e.g. dimethylamino, diethylamino), ar(lower)alkylamino such as phenyl(lower)alkylamino (e.g. benzylamino, phenethylamino) or acylamino such as lower alkanoylamino (e.g. acetylamino, propionylamino, butyrylamino, octanoylamino) or benzoylamino; $R_2''$ is hydrogen, amino, lower alkyl (e.g. methyl, ethyl, propyl) or aryl such as phenyl, $R_3^b$ is hydrogen, amino, lower alkyl (e.g. methyl, ethyl, propyl) or aryl such as phenyl; $R_4''$ is lower alkylene preferably having 2 to 6 carbon atoms (e.g. ethylene, trimethylene, propylene) substituted with one or more hydroxyls (but no hydroxyl group being present at the carbon atom adjacent to the ring nitrogen atom) which are protected with lower alkyl (e.g. methyl, ethyl, propyl, isopropyl), ar(lower)alkyl such as phenyl(lower)alkyl (e.g. benzyl, phenethyl) or, when a pair of hydroxyls exist on the alkylene group, with lower alkylidene (e.g. ethylidene, propylidene, isopropylidene) or ar(lower)alkylidene such as phenyl(lower)alkylidene (e.g. benzylidene); and A is as defined above.

The purine compound [IV] is reacted with a lactone of the formula:

wherein $R_4''$ is as defined above to give the purine compound [Ic].

The reaction is executed ordinarily in a solvent (e.g. dimethylformamide, dimethylsulfoxide, xylene) in the presence of a condensing agent such as alkali metal (e.g. lithium, sodium, potassium), alkali metal hydride (e.g. lithium hydride, sodium hydride, potassium hydride), alkaline earth metal hydride (e.g. calcium hydride, barium hydride), alkali metal carbonate (e.g. sodium carbonate, potassium carbonate), alkaline earth metal carbonate (e.g.

calcium carbonate, magnesium carbonate), alkali metal bicarbonate (e.g. sodium bicarbonate, potassium bicarbonate), alkaline earth metal bicarbonate (e.g. calcium bicarbonate, magnesium bicarbonate), alkali metal hydroxide (e.g. sodium hydroxide, potassium hydroxide), alkaline earth metal hydroxide (e.g. calcium hydroxide, magnesium hydroxide), alkali metal fluoride (e.g. cesium fluoride, potassium fluoride, lithium fluoride) or alkali metal alkoxide (e.g. sodium ethoxide, potassium t-butoxide) at a temperature from room temperature to the boiling temperature of the reaction medium.

The starting purine compound [IV] is known or may be produced by various conventional methods.

(2-1) HYDROLYSIS

In this category, the procedure represented by the following formulae is fallen:

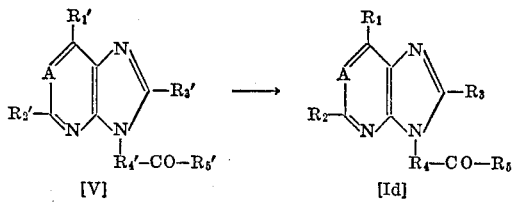

wherein $R_3'$ is hydrogen, halogen (e.g. chlorine, bromine, iodine, fluorine), hydroxyl, mercapto, amino, lower alkyl (e.g. methyl, ethyl, propyl, isopropyl), aryl such as phenyl, lower alkoxy (e.g. methoxy, ethoxy, propoxy, isopropoxy), ar(lower)alkoxy such as phenyl(lower)alkoxy (e.g. benzyloxy, phenethyloxy) or lower alkylthio (e.g. methylthio, ethylthio, propylthio); and A, $R_1$, $R_2$, $R_3$, $R_4$, $R_5$, $R_1'$, $R_2'$, $R_4'$ and $R_5'$ are each as defined above.

The starting purine compound [V] wherein one or more hydrolyzable groups such as acylated hydroxyl, etherified hydroxyl, acylated amino, esterified carboxyl or carbamoyl are present is treated with an acidic or basic substance in an aqueous medium so as to obtain the objective purine compound [Id] in which at least one of the hydrolyzable groups present in the starting compound is hydrolyzed to make a free group such as free hydroxyl, free amino or free carboxyl.

As the acidic substances, there may be employed hydrochloric acid, sulfuric acid, formic acid, acetic acid, benzoic acid or the like. Examples of the basic substance are sodium hydroxide, potassium hydroxide, sodium carbonate, potassium carbonate, sodium methoxide, sodium ethoxide, potassium ethoxide, etc. There may be also used an acidic or basic ion-exchange resin. The reaction is ordinarily effected at a temperature from room temperature to the boiling temperature of the reaction medium.

In general, the hydrolysis proceeds equally by the use of an acidic or basic substance. For conversion of the etherified hydroxyl group in $R_4'$ into free hydroxyl, the use of an acidic substance is essential.

As stated above, the said process is concerned with the hydrolysis of one or more of the hydrolyzable substituents present on the purine nucleus or in the side chain. In the course of the process, however, any other substituent may be influenced. Examples of such influence is as follows: conversion of the halogen atom, mercapto or lower alkylthio group represented by $R_1'$, $R_2'$ or $R_3'$ into hydroxyl or lower alkoxy, etc.

(2-2) REDUCTION

The conversion representable by the following formulae is fallen in this category:

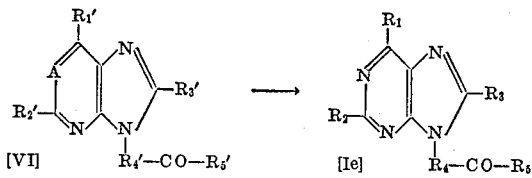

wherein A, $R_1$, $R_2$, $R_3$, $R_4$, $R_5$, $R_1'$, $R_2'$, $R_3'$, $R_4'$ and $R_5'$ are each as defined above.

Thus, the purine compound [VI] wherein one or more reducible groups (including such groups convertible to hydrogen) are present is subjected to reduction to give the purine compound [Ie] in which at least one of the reducible groups present in the starting compound is reduced.

For accomplishing the reduction, there may be adopted reduction with a reducing agent, catalytic reduction, electrolytic reduction or the like. Examples of the reducing agent are the combination of a metal (e.g. iron, tin, zinc) with an acid (e.g. hydrochloric acid, acetic acid), the combination of a metal (e.g. sodium, amalgamated sodium, amalgamated aluminum, zinc, iron) with water or an alkanol (e.g. methanol, ethanol), a sulfide (e.g. ammonium sulfide, ammonium hydrosulfide, sodium sulfide, sodium polysulfide, sodium hydrosulfide, hydrogen sulfide), sodium dithionite or sodium bisulfite, phenylhydrazine or hydrazine, the combination of titanium trichloride with hydrazine, the combination of hydroiodic acid with hypophosphorous acid, etc. As the catalyst for catalytic reduction, there may be exemplified platinum, platinum oxide, palladium, palladium oxide, palladium-carbon, palladium-barium sulfate, palladium-barium carbonate, palladium-silica gel, rhodium, iridium, ruthenium, nickel oxide, Raney nickel, Raney cobalt, reductive iron, Raney iron, reductive copper, Raney copper, Ullmann copper or zinc. The reaction is ordinarily executed in a solvent suitably selected depending on the kind of the reducing agent or the catalyst, and examples of the solvent are water, acetic acid, methanol, ethanol and like.

(2-3) AMINATION

One of the procedures in the category is representable by the following formulae:

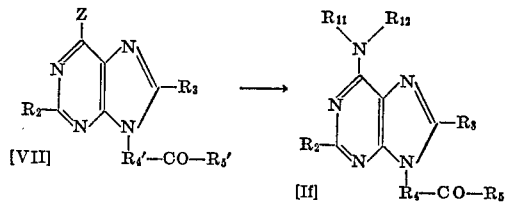

wherein $R_{11}$ and $R_{12}$ are each hydrogen, lower alkyl (e.g. methyl, ethyl, propyl, isopropyl), ar(lower)alkyl such as phenyl(lower)alkyl (e.g. benzyl, phenethyl), acyl such as lower alkanoyl (e.g. acetyl, propionyl, butyryl), phenyl(lower)alkanoyl (e.g. phenacetyl) or benzoyl, hydroxyl, lower alkoxy (e.g. methoxy, ethoxy, propoxy), ar(lower)alkoxy such as phenyl(lower)alkoxy (e.g. benzyloxy, phenethyloxy) or aryloxy such as phenoxy; Z is halogen (e.g. chlorine, bromine), mercapto, lower alkylthio (e.g. methylthio, ethylthio, propylthio), lower alkenylthio (e.g. allylthio), lower alkylsulfonyl (e.g. methanesulfonyl, ethanesulfonyl), arylsulfonyl such as benzenesulfonyl or toluenesufonyl, ar(lower)alkylsulfonyl such as phenyl(lower)alkylsulfonyl (e.g. phenylmethanesulfonyl, phenylethanesulfonyl) or lower alkenylsulfonyl (e.g. allylsulfonyl); and $R_2$, $R_3$, $R_4$, $R_5$, $R_4'$ and $R_5'$ are each as defined above.

The reaction is carried out by treatment of the purine compound [VII] with an amine of the formula:

wherein $R_{11}$ and $R_{12}$ are each as defined above, usually in a solvent (e.g. water, methanol, ethanol) while heating. The use of the amine [D] in excess to the purine compound [VII] is preferred. When the hydroxyl group(s) in the hydroxylated alkylene group represented by the symbol $R_4'$ is acylated, the acylated hydroxyl group(s) may be converted into hydroxyl simultaneously with the proceeding of the amination under a strong reaction condition.

When the symbol $R_5'$ is lower alkoxy, it may be replaced by the group of the formula:

in the course of the reaction.

(2-4) ESTERIFICATION

A typical procedure fallen in this category is substantially representable by the following formulae:

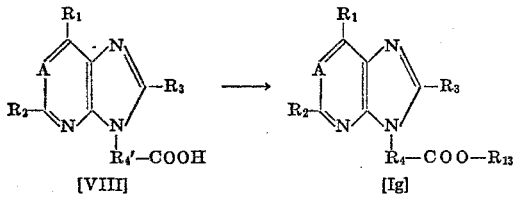

wherein $R_{13}$ is lower or higher alkyl (e.g. methyl, ethyl, propyl, isopropyl, octyl, decyl, heptadecyl); and A, $R_1$, $R_2$, $R_3$, $R_4$ and $R_4'$ are each as defined above.

The reaction is effected by treating the purine compound [VIII] or its functional derivative at the carboxyl group with a reagent of the formula:

$$R_{13}-X' \qquad [E]$$

wherein X' is halogen (e.g. chlorine, bromine), hydroxyl, hydroxysulfonyloxy or lower alkoxysulfonyloxy (e.g. methoxysulfonyloxy, ethoxysulfonyloxy) and $R_{13}$ is as defined above or a reagent of the formula:

$$R'_{13}=N_2 \qquad [F]$$

wherein

is lower alkylene (e.g. methylene, ethylene) in a solvent (e.g. methanol, ethanol, benzene, toluene, dimethylformamide, acetone, ether, tetrahydrofuran) at a temperature from room temperature to the boiling temperature of the reaction medium.

As the functional derivative of the purine compound [VIII], there may be exemplified acid halide, acid azide, acid anhydride, amide and the like.

Depending on the kind of the reagent [E] or [F], there may be used an acidic or basic catalyst or condensing agent, of which examples are as follows: hydrochloric acid, sulfuric acid, boron trifluoride, benzenesulfonic acid, p-toluene-sulfonic acid, hydrobromic acid, ferric chloride, aluminum chloride, zinc chloride, N,N'-dicyclohexylcarbodiimide,
N-cyclohexyl-N'-morpholinoethylcarbodiimide,
N-cyclohexyl-N'-(4-diethylaminocyclohexyl)carbodiimide,
N,N'-diethylcarbodiimide,
N,N'-diisopropylcarbodiimide,
N-ethyl-N'-(3-dimethylaminopropyl)carbodiimide,
N,N'-carbonyldiimidazole,
N,N'-carbonyldi(2-methylimidazole),
N,N'-carbonyldipyrazole,
pentamethyleneketene-N-cyclohexylimine,
diphenyl-ketene-N-cyclohexylimine,
alkoxyacetylene,
1-alkoxy-1-chloroethylene,
tetraaalkyl phosphite,
2-ethyl-5-(N-sulfophenyl)isoxazolium hydroxide,
2-ethyl-7-hydroxybenzisoxazolium salt, ethyl polyphosphate, isopropyl polyphosphate, phosphorus oxychloride, phosphorus trichloride, thionyl chloride, oxalyl chloride, strongly acidic ion exchange resin, molecular sieve, alkali metal hydroxide, alkaline earth metal hydroxide, alkali metal carbonate, alkaline earth metal carbonate, etc.

In the course of the above process, the acylated or etherified hydroxyl group(s) in the symbol $R_4'$ may be converted into hydroxyl.

(2-5) ADMIDATION

In this category, there is included the procedure represented by the following formulae:

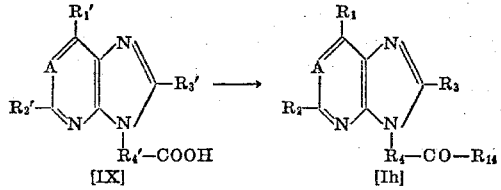

wherein $R_{14}$ is lower alkylamino (e.g. methylamino, ethylamino) or di(lower)alkylamino (e.g. dimethylamino, diethylamino, methylethylamino); and A, $R_1$, $R_2$, $R_3$, $R_4$, $R_1'$, $R_2'$, $R_3'$ and $R_4'$ are each as defined above.

The reaction is carried out by treating the purine compound [IX] or its functional derivatives at the carboxyl group with an amine of the formula:

$$R_{14}-H \qquad [G]$$

wherein $R_{14}$ is as defined above, usually in a solvent (e.g. water, methanol, ethanol, benzene, actone, dioxane, acetonitrile, chloroform, ethylene chloride, tetrahydrofuran, ethyl acetate, formic acid, pyridine) at a temperature from room temperature to the boiling temperature of the reaction medium.

Examples of the functional derivatives of the purine compound [IX] are acid halide, acid anhydride, azide, ester and the like. Particularly preferred are acid chloride, acid azide, alkylphosphoric acid mixed anhydride, benzylphosphoric acid mixed anhydride, halogenated phosphoric acid mixed anhydride, alkylcarbonic acid mixed anhydride, methyl ester, ethyl ester, cyanomethyl ester, p-nitrophenyl ester, pentachlorophenyl ester, propargyl ester, carboxymethyl thioester, pyranyl ester, methoxymethyl ester, phenyl thioester, etc.

The amine may be used in free form or salt form such as hydrochloride or sulfate. In the latter case, the presence of a base in the reaction system is preferred. When desired, there may be used a condensing agent such as N,N'-dicyclohexylcarbodiimide,
N-cyclohexyl-N'-morpholinoethylcarbodiimide,
N-cyclohexyl-N'-(4-diethylaminocyclohexyl)carbodiimide,
N,N'-diethylcarbodiimide,
N,N'-diisopropylcarbodiimide,
N-ethyl-N'-(3-dimethylaminopropyl)carbodiimide,
N,N'-carbonyldiimidazole,
N,N'-carbonyldi(2-methylimidazole),
pentamethyleneketene-N-cyclohexylimine,
diphenylketene-N-cyclohexylimine,
alkoxyacetylene,
polyphosphoric acid isopropyl ester,
oxalyl chloride,
triphenylphosphate or the like.

In the course of the reaction, the halogen atom, mercapto or lower alkylthio group represented by the symbols $R_1'$, $R_2'$ or $R_3'$ may be replaced by the moiety $R_{14}$ in the employed amine [G]. Further, the acylated hydroxyl group in the symbol $R_4'$ may be converted into hydroxyl.

(2-6) ACYLATION

The procedure of the following formulae comes in the category:

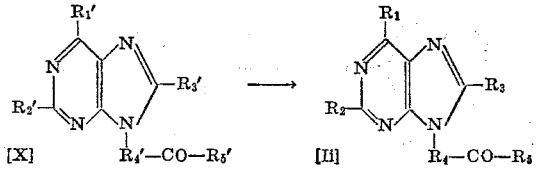

wherein $R_1$, $R_2$, $R_3$, $R_4$, $R_5$, $R_1'$, $R_2'$, $R_3'$, $R_4'$ and $R_5'$ are each as defined above.

In the above process, one or more substituents to be acylated are acylated. That is, the amino group(s) represented by the symbols $R_1'$, $R_2'$ and $R_3'$ may be converted into acylamino and also the hydroxyl group(s) in the symbol $R_4'$ changed to acyloxy.

The reaction is carried out by treating the purine compound [X] with an acylating agent such as aliphatic carboxylic acid (e.g. acetic acid, propionic acid, butanoic acid, pentanoic acid, isopentanoic acid, pyvalic acid, 2-ethylbutanoic acid), aromatic carboxylic acid (e.g. benzoic acid, p-bromobenzoic acid, p-nitrobenzoic acid, phenylacetic acid, cinnamic acid) and heterocyclic carboxylic acid (e.g. nicotiinc acid, isonicotinic acid) and their functional derivatives at the carboxyl group such as their acid halide (e.g. acid chloride), acid anhydride, amide, azide and ester (e.g. methyl ester, ethyl ester, cyanomethyl ester, p-nitrophenyl ester, pentachlorophenyl ester, 2,4,5-trichlorophenyl ester, propargyl ester, carboxymethyl thioester, pyranyl ester, methoxymethyl ester, phenyl thioester, N-hydroxysuccinimide), usually in a solvent (e.g. ether, acetone, dioxane, acetonitrile, chloroform, ethylene chloride, tetrahydrofuran, ethyl acetate, pyridine) while cooling, at room temperature or under heating. If necessary, there may be used a condensing agent such as N,N'-dicyclohexylcarbodiimide,
N-cyclohexyl-N'-morpholinoethylcarbodiimide,
N-cyclohexyl-N'-(4-diethylaminocyclohexyl)carbodiimide,
N,N'-diethylcarbodiimide,
N,N'-diisopropylcarbodiimide,
N-ethyl-N'-(3-dimethylaminopropyl)carbodiimide,
N,N'-carbonyldiimidazole,
N,N'-carbonydipyrazole,
N,N'-carbonyldi(2-methylimidazole),
pentamethyleneketene-N-cyclohexylamine,
diphenylketene-N-cyclohexylimine,
alkoxyacetylene,
1-alkoxy-1-chloroethylene,
2-ethyl-7-hydroxybenzisoxazolium salt,
2-ethyl-5-(m-sulfophenyl)isoxazolium hydroxide or the like. There may be also added a base such as alkali metal carbonate, trialkylamine or pyridine.

By selecting suitably the reaction conditions, it is possible to accomplish optionally either one or both of the acylations of the hydroxyl group and of the amino group.

(2-7) ETHERIFICATION

The procedure representable by the following formulae is under this category:

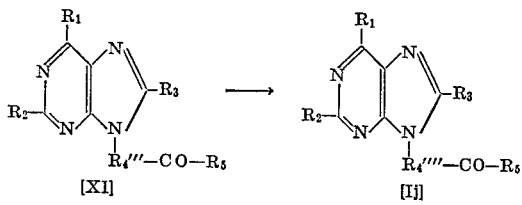

wherein $R_4'''$ is lower alkylene preferably 2 to 6 carbon atom (e.g. ethylene, trimethylene, propylene) substituted with one or more hydroxyls (but no hydroxyl group being present at the carbon atom adjacent to the ring nitrogen atom); $R_4''''$ is lower alkylene preferably having 2 to 6 carbon atoms (e.g. ethylene, trimethyl, propylene) substituted with one or more hydroxyls (but no hydroxyl group being present at the carbon atom adjacent to the ring nitrogen atom) of which at least one is protected with lower alkyl or ar(lower)alkyl or, when a pair of hydroxyls exist on the alkylene group, with lower alkylidene or ar(lower)alkylidene; and $R_1$, $R_2$, $R_3$ and $R_5$ are each as defined above.

The reaction is carried out by reacting the purine compound [XI] with a reagent of the formula:

wherein $R_{15}$ is hydrogen or lower alkyl (e.g. methyl, ethyl, propyl, isopropyl), $R_{16}$ is hydrogen, lower alkyl (e.g. methyl, ethyl, propyl, isopropyl), ar(lower)alkyl such as phenyl(lower)alkyl (e.g. benzyl, phenethyl) or aryl such as phenyl, and $Y'$ and $Y''$ are each lower alkoxy (e.g. methoxy, ethoxy, propoxy, isopropoxy) or both represent an oxo group or with a reagent of the formula:

wherein $R_{17}$ is lower alkyl (e.g. methyl, ethyl, propyl, isopropyl) or ar(lower)alkyl such as phenyl(lower)alkyl (e.g. benzyl, phenethyl) and $Y'''$ is hydroxyl or halogen (e.g. chlorine, bromine) in a solvent, usually at a temperature from room temperature to the boiling temperature of the reaction medium. In case of using the reagent [H], the addition of Lewis acid (e.g. hydrogen chloride, hydrogen bromide, perchloric acid, zinc chloride, toluenesulfonic acid, di-p-nitrophenyl phosphate, phosphorus oxychloride, H-type ion exchange resin) to the reaction medium is preferred. When the reagent [J] is employed, the incorporation of a condensing agent such as sulfuric acid, toluenesulfonic acid, sodium hydrogen sulfite or silver oxide is recommended.

(2-8) OTHER CONVERSIONS

In addition to the procedures as above illustrated, there may be adopted a variety of other conventional procedures for conversion of any substituent(s) present in the purine nucleus. For instance, the chlorine atom(s) present at the 2, 6 and/or 8-positions are converted into hydroxyl by heating with formic acid in an aqueous medium. The chlorine atom(s) present at the 2, 6 and/or 8-positions are converted into mercapto by reacting with thiourea in a solvent, followed by treatment with an alkali. The chlorine atom(s) at the 2, 6 and/or 8-positions can be converted to hydroxyamino by reacting with hydroxylamine. The chlorine atom(s) at the 2, 6 and/or 8-positions are converted into lower alkoxy by reacting with alkali metal lower alkoxide (e.g. sodium methoxide, sodium ethoxide, potassium ethoxide). The mercapto group(s) at the 2, 6 and/or 8-positions may be changed to lower alkylthio by reacting with lower alkyl halide (e.g. methyl chloride, methyl iodide, ethyl chloride) in the presence of a base. The amino group(s) at the 2, 6 and/or 8-positions may be converted into hydroxyl by reacting with nitrous acid.

The purine compounds [I] obtained as above may be converted into their salts such as metal salts, ammonium salts, amine salts and acid-addition salts by per se conventional procedures.

The purine compounds [I] and their salts generally exhibit marked hypocholesterolemic activity. The test results on the standard compound, i.e. 4-(6-aminopurin-9-yl)-4-deoxy-D-erythronic acid, are shown below.

1. TEST METHOD

Groups of Wistar strain rats (body weight: 74 g. in average) of 5 weeks old, each group consisting of 10 animals, were raised for 3 days using a fat feed comprising cholesterol (2%), cholic acid (1%), hardened oil (12%), fish extract (8%) and some other materials with simultaneous administration of the test compound once a day, starved overnight and sacrificed in the next morning. The serum cholesterol concentration was measured according to the Zak-Henly method. The test compound was administered in an aqueous solution acidified with hydrochloric acid or an aqueous suspension with carboxymethyl cellulose. As the positive control, thyroxin was orally administered at a dose of 0.05 mg. per animal.

2. TEST RESULTS

| Administration route | Dose (mg./rat) | Serum cholesterol, mg./dl.±S.E. | Percent inhibition |
|---|---|---|---|
| Intraperitoneal | 0.5 | 337±48.8 | 37.4 |
| Do | 0.2 | 338±24.9 | 37.2 |
| Oral | 0.5 | 249±26.6 | 53.7 |
| Do | 0.2 | 271±28.0 | 49.6 |
| Thyroxin | 0.05 | 284±28.4 | 47.2 |
| Control | | 538±48.1 | |

Other compounds
(e.g. methyl 4-(6-aminopurin-9-yl)-4-deoxy-D-erythronate,
ethyl 4-(6-aminopurin-9-yl)-4-deoxy-D-erythronate,
4-(6-aminopurin-9-yl)-4-deoxy-D-erythronamide,
4-(6-benzoylaminopurin-9-yl)-4-deoxy-D-erythronic acid,
4-(6-amino-8-methylpurin-9-yl)-4deoxy-D-erythronic acid,
4-(2-amino-6-hydroxypurin-9-yl)-4-deoxy-D-erythronic acid,
4-(6-ethylaminopurin-9-yl)-4-deoxy-D-erythronic acid,
4-(6-hydroxypurin-9-yl)-4-deoxy-D-erythronic acid,
6-amino-9-(3-carboxy-2,3-dihydroxypropyl)-purine-1-oxide)
and their salts have the similar activity.

Moreover, the toxicity of the purine compounds [I] and their salts is extremely low. For instance, the acute toxicity of 4-(6-aminopurin-9-yl)-4-deoxy-D-erythronic acid in rats and mice is as follows:

| Animal | Administration route | LD$_{50}$(mg./kg.) |
|---|---|---|
| Mouse | Subcutaneous | 2,700 |
| Rat | Intraperitoneal | 1,000-2,000 |
| Do | Oral | 4,000 |

Thus, the purine compounds [I] and their non-toxic salts are useful as the therepeutic agents in the treatment of atherosclerosis. The pyrimidine compounds [II] and their non-toxic salts exhibit the similar activity and can be subjected to the same use.

The purine compounds [I] and the pyrimidine compounds [II], and their non-toxic salts are stable to heat and light, and they can be administered by the conventional methods, the conventional types of unit dosages or with the conventional pharmaceutical carriers to produce a hypocholesterolemic activity in human beings. Thus, they can be used in the form of pharmaceutical preparation, which contain them in admixture with a pharmaceutical organic or inorganic carrier material suitable for enteral or parenteral applicaitons. Oral administration by the use of tablets, capsules or in liquid form such as suspensions, solutions or emulsions, or injectional application is particularly advantageous. When formed into tablets, the conventional binding and disintegrating agents used in therapeutic unit dosages can be employed. Illustrative of binding agents there can be mentioned glucose, lactose, gum acacia, gelatin, mannitol, starch paste, magnesium trisilicate and talc. Illustrative of disintegrating agents there can be mentioned corn starch, keratin, colloidal silica and potato starch. When administered as liquids the conventional liquid carriers can be used.

The dosage or therapeutically effective quantity of the purine compounds [I] and the pyrimidine compounds [II], and their salts for human beings can vary over wide limits such as that of about 10 to 1000 milligrams/day for adult. The upper limit is limited only by the degree of effect desired and economic considerations. For oral administration it is to employ from about 5 to 30 milligrams of the therapeutic agent per unit dosage. For injectional use, the active ingredient may be employed from 1 to 10 mg. per unit dosage. Of course, the dosage of the particular therapeutic agent used can vary considerably, such as the age of the patient and the degree of therapeutic effect desired. By the term pharmaceutical carrier it is intended to include non-therapeutic materials which are conventionally used with unit dosage and includes fillers, diluents, binders lubricants, disintegrating agents and solvents. Of course, it is possible to administer the novel therapeutics, i.e. the pure compounds, without the use of a pharmaceutical carrier.

Practical and presently-preferred embodiments of this invention are illustratively shown in the following Examples.

Example 1

Fresh Lentinus edodes (10 kg.) was triturated, and 80% aqueous methanol (20 l.) was added thereto. The mixture was subjected to extraction of the active component under reflux for 3 hours. The above operation was repeated twice. The extracts were combined together, concentrated under reduced pressure to 6 l. and shaken with ether. The water layer was separated, diluted with water (20 l.) and passed through a strongly acidic ion-exchange resin [H-type Amberlite IR–120 (trade name)]. The resin was washed with water and then eluted with 2% ammonia water. The eluate was concentrated under reduced pressure and lyophilized to obtain brown powder (60 g.). The powder was dissolved in water (400 ml.) and, after elimination of insoluble materials, the solution was passed through a strongly acidic ion-exchange resin [H-type, Dowex 50X2 (trade name)]. The resin was washed with water and then eluted gradiently wtih 1 N to 4 N hydrochloric acid solutions. The fractions which afforded a maximum absorption aroundt 260 m$\mu$ in the ultraviolet absorption spectrum were combined together and lyophilized to obtain white powder. The powder was dissolved in water, and the solution was again passed through a strongly acidic ion-exchange resin [H-type, Dowex 50X2 (trade name)]. The resin was washed with water and eluted with 2% ammonia water, and the eluate was lyophilized to give yellowish white powder. The powder was dissolved in 0.1 M pyridine acetate buffer. The solution was passed through a strongly acidic ion-exchange resin [H-type Dowex 50X2 (trade name)] pretreated with 0.1 M pyridine acetate buffer. The resin was then eluted with 0.1 M pyridine acetate buffer. The eluate was divided into fractions of each 25 ml. The fractions which afforded a maximum absorption arounnd 260 m$\mu$ in the ultraviolet absorption spectrum were combined together and lyophilized to give crude crystals, which were recrystallized from water to produce about 250 mg. of the novel purine compound [I'] as pure crystals. M.P. 279° C. (decomp.).

Example 2

Dried Lentinus edodes (2.5 kg.) was crumbled, and 80% aqueous methanol (20 l.) was added thereto. Then, the mixture was treated as in Example 1 to produce about 265 mg. of the purine compound [I'] as pure crystals.

Example 3

Dried Lentinus edodes (50 kg.) was crumbled and extracted with 60% aqueous methanol (400 l.). The extract was concentrated under reduced pressure, and the concentrate was passed through a strongly acidic ion-exchange resin [H-type Amberlite IR–120 (trade name)]. The resin was washed with water and eluted with 2% ammonia water. The eluate was concentrated to give the concentrate (2150 g.). The concentrate (10 g.) was dissolved in acetic acid-ammonium hydroxide buffer (pH 5, 0.1 N as acetic acid) (80 ml.) and passed through a strongly basic ion-exchange resin [acetic acid-type Amberlite IRA–400 (trade name)] pretreated with the same buffer as above. The resin was washed with the same buffer as above and eluted with 0.5 N acetic acid. The fractions showing a maximum absorption around 260 m$\mu$ in the ultraviolet absorption spectrum are collected, concentrated under reduced pressure and dried in vacuo to give the purine compound [I'] (120 mg.) as pure crystals.

Example 4

The concentrate (20 g.) obtained in the course of the procedure as in Example 3 was dissolved in water (200 ml.) and passed through a strongly basic ion-exchange resin [acetic acid-type Amberlite IRA–400 (trade name)]. The resin was washed with water, 0.03 N acetic acid and 0.3 N acetic acid in order and eluted with 0.5 N acetic acid. The fractions showing a maximum absorption around 260 mµ in the ultraviolet absorption spectrum were collected, concentrated under reduced pressure and dried in vacuo to give the purine compound [I'] (100 mg.) as pure crystals.

Example 5

The concentrate (200 g.) obtained in the course of the procedure as in Example 3 was dissolved in water (1 l.) and passed through a strongly basic ion-exchange resin [acetic acid-type Amberlite IRA–400 (trade name)]. The resin was washed with water and acetic acid-ammonium hydroxide buffer (pH 5, 0.1 N as acetic acid) in order and eluted with 0.5 N acetic acid. The fractions showing a maximum absorption around 260 mµ in the ultraviolet absorption spectrum were collected, concentrated under reduced pressure and dried in vacuo to give the purine compound [I'] (2.80 g.) as pure crystals.

Example 6

Dried Lentinus edodes (50 kg.) was extracted with water (400 l.) at room temperature for 24 hours. The extract was passed through a strongly acidic ion-exchange resin [H-type Amberlite IR–120 (trade name)]. The resin was washed with water and eluted with 2% ammonia water. The eluate was concentrated to give the concentrate (2300 g.). The concentrate (200 g.) was treated as in Example 5 to give the purine compound [I'] (3.0 g.) as pure crystals.

Example 7

Dried Lentinus edodes (50 kg.) was extracted with 50% aqueous methanol (400 l.). The extract was passed through a strongly acidic ion-exchange resin [H-type Amberlite IR–120 (trade name)]. The resin was washed with water and eluted with 2% ammonia water. The eluate was concentrated to give the concentrate (2200 g.). The concentrate (200 g.) was treated as in Example 5 to give the purine compound [I'] (2.9 g.) as pure crystals.

Example 8

(A) Triethylamine (400 mg.) and formamidine acetate (250 mg.) were added to a suspension of 4-(5,6-diamino-4 - pyrimidinylamino) - 4-deoxy-2,3-O-isopropylidene-D-erythronic acid (500 mg.) in Methyl Cellosolve (10 ml.). The mixture was heated under reflux for 20 minutes. The solvent was removed from the reaction mixture under reduced pressure. The residue was dissolved in water and the aqueous solution was adjusted to pH 3 with dilute hydrochloric acid. Precipitated crystals were collected by filtration and washed with water to give 4-(6-aminopurin-9-yl)-4-deoxy-2,3-O-isopropylidene-D-erythronic acid (250 mg.) M.P. 214° C. (recrystallized from water).

(B) A solution of 4-(4,5-diamino-4-pyrimidinylamino)-4-deoxy-2,3-O-isopropylidene-D-erythronic acid (120 mg.) in 90% formic acid (3 ml.) was heated under reflux for an hour. After cooling, the formic acid was removed from the reaction mixture by evaporation under reduced pressure. To the residue was added water, and the solvent was again evaporated under reduced pressure. To the residue was added a small amount of water, and precipitated crystals were collected by filtration, washed with water and then methanol and recrystallized from water to give pillars (75 mg.) of 4-(6-amino-5-formamido-4-pyrimidinylamino)-4-deoxy-D-erythronic acid. M.P. 190° C. (decomp.). A solution of 4-(6-amino-5-formamido-4-pyrimidinylamino)-4-deoxy-D-erythronic acid (0.50 g.) in N sodium hydroxide (5 ml.) was heated for 10 minutes in a boiling water bath. After cooling, N hydrochloric acid (5 ml.) was added to the reaction mixture and precipitated crystals were collected by filtration. These crystals were washed with water and then methanol to give 4-(6-amino-purin-9-yl)-4-deoxy-D-erythronic acid (0.34 g.). M.P. 279° C. (decomp.). $[\alpha]_D^{25} = +30°$ (c.=0.93, dimethylsulfoxide).

UV spectrum: $\lambda_{max}^{H_2O}$ 261 mµ ($\epsilon$=14,700).

(C) A solution of 4-(5,6-diamino-4-pyrimidinylamino)-4-deoxy-2,3-O-isopropylidene-D-erythronic acid (200 mg.) in a mixture of 98% formic acid (1 ml.) and formamide (1 ml.) was heated for 30 minutes under reflux. To the reaction mixture was added ethanol, and precipitated crystals were collected by filtration. These crystals were dissolved into water, and the aqueous solution was treated with carbon powder and filtered. The filtrate was condensed, and methanol was added to the residue. Precipitated crystals were collected by filtration and washed with methanol to give 4-(6-amino-purin-9-yl)-4-deoxy-D-erythronic acid (40 mg.). M.P. 279° C. (decomp.).

The above prepared 4-(6-aminopurin-9-yl)-4-deoxy-D-erythronic acid (3.80 g.) was dissolved in N sodium hydroxide solution (17 ml.), warmed at 40° C. and filtered. Ethanol (30 ml.) was added to the filtrate dropwise. Precipitated crystals were collected by filtration and washed with ethanol to give sodium 4-(6-aminopurin-9-yl)-4-deoxy-D-erythronate (3.40 g.). M.P. 272° C. (decomp.).

UV spectrum: $\lambda_{max}^{HO^-}$ 261 mµ ($\epsilon$=14,700).

The above prepared 4-(6-aminopurin-9-yl)-4-deoxy-D-erythronic acid (500 mg.) was dissolved in 1 N hydrochloric acid (10 ml.). The solution was condensed under reduced pressure. Ethanol was added to an oily residue and the mixture was allowed to stand. Precipitated crystals were collected and washed with ethanol to give 4-(6 - aminopurin-9-yl)-4-deoxy-D-erythronic acid hydrochloride (380 mg.). M.P. 198 to 201° C.

The above prpeared 4-(6-aminopurin-9-yl)-4-deoxy-D-erythronic acid (500 mg.) was dissolved in 30% ammonia water (50 ml.). The solution was concentrated under reduced pressure and the concentrate was dissolved in ethanol. The solution was allowed to stand to give crystals. The crystals were washed with ethanol to give 4-(6-aminopurin - 9 - yl-4-deoxy-D-erythronic acid ammonium salt (340 mg.). M.P. 265 to 267° C. (decomp.).

(D) To a suspension of 4-(5-amino-6-chloro-4-pyrimidinylamino) - 4-deoxy-2,3-O-isopropylidene-D-erythronic acid (810 mg.) in triethyl orthoformate (25 ml.), was added dropwise conc. hydrochloric acid (0.36 ml.). The mixture was stirred for 3 hours at room temperature. The reaction mixture was condensed under reduced pressure and the residue was dissolved in dichloromethane. An insoluble substance was filtered off, the filtrate was evaporated under reduced pressure and the residue was dissolved in isopropyl ether. Rubbing the inside of the reaction vessel, precipitated crystals were collected by filtration to give 4-(6-chloropurin-9-yl)-4-deoxy-2,3-O-isopropylidene-D-erythronic acid (640 mg.). Yield, 76% M.P. 150° C. (decomp.) (Recrystallized from isopropyl ether). $[\alpha]_D^{25} = +51.6°$ C. (c.=0.835, methanol).

(E) A solution of 4-(5-amino-6-chloro-4-pyrimidinylamino) - 4-deoxy-2,3-O-isopropylidene-D-erythronic acid (700 mg.) in 90% formic acid (15 ml.) was heated at 100° C. for 2 hours. The reaction mixture was evaporated under reduced pressure. The residue was dissolved in a mixture of 10% sodium hydroxide solution (3 ml.) and water (5 ml.). The reaction mixture was heated on a water bath for 15 minutes and, after cooling, neutralized with hydrochloric acid. The resultant mixture was passed through a column containing a strong acidic ion-exchange resin [H-type, Amberlite IR 120B (trade name)] (40 ml.). The column was washed with water till the eluate became neutral and thereafter eluted with 2% ammonia. The eluate was evaporated under reduced pressure, and the residue was recrystallized from aqueous ethanol to give slightly brown plates (280 mg.) of 4-(6-hydroxypurin-9-yl)-4-deoxy-D-erythronic acid. This substance sintered at about 85° C., expanded at 100 to 105° C. and then melted around 185° C. Yield, 48%.

(F) To a suspension of 4-(5-amino-6-chloro-4-pyrimidinylamino)-4-deoxy-D-erythronic acid (6.76 g.) in triethyl orthoformate (200 ml.), conc. hydrochloric acid (3 ml.) was added, and the mixture was stirred at room temperature for 24 hours. The reaction mixture from which an insoluble substance was removed, was condensed under reduced pressure. To the residue was added ethyl acetate, and insoluble crystals were collected by filtration to give 4-(6-chloropurin-9-yl)-4-deoxy-D-erythronic acid. The filtrate was condensed under reduced pressure, and the residue was added with ethyl acetate. An insoluble substance was collected by filtration to give the same objective substance. The total yield is 6.71 g. This substance was recrystallized from isopropanol to give the isopropanol adduct. M.P. 110° C. (decomp.). $[\alpha]_D^{25} = +34°$ (c.=0.541, dimethylsulfoxide).

UV spectrum: $\lambda_{max.}^{0.1 N HCl}$ 265 m$\mu$ ($\epsilon$=9,000); $\lambda_{max.}^{H_2O}$ 266 m$\mu$ ($\epsilon$=8,800); $\lambda_{max.}^{0.1 N NaOH}$ 265 m$\mu$ ($\epsilon$=9,200).

(G) A solution of 4-(2 - methylthio-5-formamido-6-amino-4-pyrimidinylamino) - 4 - deoxy-D-erythronic acid (2.0 g.) in N sodium hydroxide solution (20 ml.) was heated for 20 minutes. After cooling, hydrochloric acid was added to the reaction mixture to adjust the pH to 2–3. Precipitated crystals were collected by filtration and washed with a mixture of water and ethanol to give 4-(2-methylthio-6-aminopurin-9-yl) - 4 - deoxy-D-erythronic acid (1.08 g.). M.P. 249° C. (decomp.) (recrystallized from dimethylsulfoxide). $[\alpha]_D^{25} = +49°$ (c.=0.502, dimethylsulfoxide).

UV spectrum: $\lambda_{max.}^{0.1 N HCl}$ 220 m$\mu$ ($\epsilon$=17,900); $\lambda_{max.}^{0.1 N HCl}$ 270 m$\mu$ ($\epsilon$=15,000); $\lambda_{max.}^{H_2O}$ 234 m$\mu$ ($\epsilon$=21,500); $\lambda_{max.}^{H_2O}$ 276.5 m$\mu$ ($\epsilon$=13,800); $\lambda_{max.}^{0.1 N NaOH}$ 234.5 m$\mu$ ($\epsilon$=23,100); $\lambda_{max.}^{0.1 N NaOH}$ 277 m$\mu$ ($\epsilon$=15,000).

(H) A solution of 4-(5-acetamide-6-amino-4-pyrimidinylamino)-4-deoxy-2,3-O-isopropylidene-D-erythronic acid (1.5 g.) in N sodium hydroxide solution (15 ml.) was heated in a boiling water bath for 1.5 hours. The reaction mixture was allowed to stand to cool, neutralized with N hydrochloric acid and then condensed under reduced pressure to ⅓ volume. Precipitated crystals were collected by filtration and washed with water and then methanol to give 4-(6-amino-8-methylpurin-9-yl) - 4 - deoxy-2,3-O-isopropylidene-D-erythronic acid (0.7 g.). M.P. 265° C. (decomp.).

(I) To a solution of 4-(5,6-diamino-4-pyrimidinylamino)-4-deoxy-2,3-O-isopropylidene-D-erythronic acid (960 mg.) in an ethanol solution (20 ml.) of metallic sodium (180 mg.), carbon disulfide (1 ml.) was added. The mixture was heated under reflux for 4 hours. From the reaction mixture, the ethanol was removed under reduced pressure. A small amount of water was added to the residue. The aqueous solution was adjusted to pH 3 with dilute hydrochloric acid. Precipitated crystals were collected by filtration and washed with methanol to give 4-(6-amino-8-mercapto-9H-purin-9-yl) - 4 - deoxy-2,3-O-isopropylidene-D-erythronic acid (650 mg.). M.P. 203° C. (decomp.).

(J) A solution of 4-(2-chloro-5,6-diamino-4-pyrimidinylamino)-4-deoxy-2,3-O-isopropylidene-D-erythronic acid (1.1 g.) in formic acid (5 ml.) was heated with reflux for 3 hours. The formic acid distilled off under reduced pressure. N sodium hydroxide solution (14 ml.) was added to the residue and heated with reflux for 7 hours. After cooling, the reaction mixture was adjusted to pH 2.5 with hydrochloric acid. Precipitated crystals were collected by filtration, decolored by carbon powder and recrystallized from water to give 4 - (2-hydroxy-6-aminopurin-9-yl)-4- deoxy-D-erythronic acid (670 mg.). M.P. over 300° C. (decomp.).

UV spectrum: $\lambda_{max.}^{H_2O}$ 245.5 m$\mu$ ($\epsilon$=6,200), 289.5 m$\mu$ ($\epsilon$=10,900); $\lambda_{max.}^{0.1 N HCl}$ 234.5 m$\mu$ ($\epsilon$=5,500), 283 m$\mu$ ($\epsilon$=13,400); $\lambda_{max.}^{0.1 N NaOH}$ 248 m$\mu$ ($\epsilon$=6,200), 286 m$\mu$ ($\epsilon$=10,600).

(K) 4-(2-hydroxy - 5 - formamido-6-amino-4-pyrimidinylamino)-4-deoxy-D-erythronic acid prepared from 4-(2-chloro-5,6-diamino-4-pyrimidinylamino) - 4 - deoxy-2,3-O-isopropylidene-D-erythronic acid (1.1 g.) and formic acid (5 ml.) was added to N sodium hydroxide solution (14 ml.), and the mixture was heated with reflux for 7 hours. After cooling, the reaction mixture was adjusted to pH 2.5 with hydrochloric acid. Precipitated crystals were collected by filtration, decolored by carbon powder and recrystallized from water to give 4-(2-hydroxy-6-aminopurin-9-yl)-4-deoxy-D-erythronic acid (670 mg.). M.P. over 300° C. (decomp.).

(L) A mixture of 4-(5,6-diamino-4-pyrimidinylamino)-4-deoxy-2,3-O-isopropylidene-D-erythronic acid (0.5 g.) and urea (0.41 g.) was heated at 170 to 180° C. on an oily bath for 25 minutes and washed with a small amount of 95% ethanol. The excess urea was removed, and the insoluble substance was dissolved in a small amount of water. The aqueous solution was adjusted to pH 3 with 10% hydrochloric acid to give crystals. These crystals were collected by filtration and washed with water to give 4-(6-amino-8-hydroxypurin-9-yl) - 4 - deoxy-D-erythronic acid (150 mg.). M.P. 215 to 217° C. (decomp.).

UV spectrum: $\lambda_{max.}^{H_2O}$ 210 m$\mu$, 270 m$\mu$.

(M) A solution of 4-(5-amino-6-chloro-4-pyrimidinylamino)-4-deoxy-D-erythronic acid (1.0 g.) in 90% formic acid (10 ml.) was heated refluxively. The solvent was distilled off from the reaction mixture under reduced pressure. The residue was recrystallized from isopropanol and then ethanol to give 4-(6-hydroxypurin-9-yl)-4-deoxy-D-erythronic acid (760 mg.). This substance expanded at 100 to 105° C. and then melted around 185° C.

(N) To a solution of 4(5-amino-6-hydroxy-4-pyrimidinylamino)-4-deoxy-D-erythronic acid hydrochloride (560 mg.) in formic acid (10 ml.), was added sodium formate (150 mg.). The mixture was heated refluxively for an hour. The formic acid was distilled off. The residue was dissolved in 1 N sodium hydroxide (6 ml.) and the solution was heated refluxively for 2 hours. After cooling, the reaction mixture was passed through a column packed with a basic ion-exchange resin [Amberlite IRA–400 (trade name)] (50 ml.). The resin was washed with water till the washings became neutral and eluted with 0.5 N formic acid. The eluate was concentrated under reduced pressure and the residue was recrystallized from isopropanol to give 4-(6-hydroxypurin-9-yl)-4-deoxy-D-erythronic acid (430 mg.). This substance expanded at 100 to 105° C. and then melted around 185° C.

(O) A mixture of methyl 4-(5,6-diamino-4-pyriminylamino)-4-deoxy-D-erythronate (0.27 g.) in formamide (2.0 ml.) was heated for 20 minutes at 160° C. on an oil bath. The formamide was distilled off from the reaction mixture under reduced pressure. The residue was dissolved in methanol (20 ml.) under heating, and the solution was treated with carbon powders and filtered. The methanol was removed by filtration under reduced pressure and the residue was washed with a small amount of methanol to give methyl 4-(6-aminopurin-9-yl)-4-deoxy-D-erythronate (0.10 g.). M.P. 231° C. (decomp.).

(P) To a solution of ethyl 4-(5,6-diamino-4-pyrimidinylamino)-4-deoxy-D-erythronate (400 mg.) in Methyl Cellosolve (5 ml.) was added formamidine acetate (160 mg.), and the mixture was heated for 20 minutes at 140° C. The solvent was removed by filtration and the residue was dissolved in 50% ethanol (20 ml.). To the solution, was added to weakly basic ion-exchange resin [Amberlite IR–45 (trade name)] (2.0 g.) and the mixture was stirred for about an hour and then filtered. The filtrate was condensed under reduced pressure, and the residue was added with a small amount of ethanol and allowed to stand. Precipitated crystals were collected and washed with ethanol to give ethyl 4-(6-aminopurin-9-yl)-4-deoxy-D-erythronate (110 mg.). M.P. 160° C.

(Q) A mixture of 4-(5-formamido-6-amino-4-pyrimidinylamino) - 4-deoxy-D-erythronic acid (0.06 g.) and formamide (2.0 ml.) was heated for 20 minutes at 160° C. on an oil bath and concentrated under reduced pressure. The residue was dissolved in methanol and an insoluble substance was filtered off. The filtrate was concentrated to yield crystals and thus obtained crystals were washed with methanol to give methyl 4-(6-amino-purin-9-yl)-4-deoxy-D-erythronate (0.03 g.). M.P. 231° C. (decomp.).

In the similar manner, there are obtained the following compounds:

methyl 4-(6-aminopurin-9-yl)-4-deoxy-D-erythronate [M.P. 231° C. (decomp.)];
ethyl 4-(6-aminopurin-9-yl)-4-deoxy-D-erythronate [M.P. 159 to 160° C. (decomp.)];
4-(6-aminopurin-9-yl)-4-deoxy-D-erythronamide [M.P. 264 to 268° C. (decomp.)];
4-(6-amino-8-methylpurin-9-yl)-4-deoxy-D-erthronic acid [M.P. 281° C. (decomp.)];
4-(6-amino-8-mercaptopurin-9-yl)-4-deoxy-D-erythronic acid [M.P. 265 to 268° C. (decomp.)];
methyl 4-(6-aminopurin-9-yl)-4-deoxy-2,3-O-isopropylidene-D-erythronate [M.P. 180 to 181° C.];
4-(6-aminopurin-9-yl)-4-deoxy-2,3-O-benzylidene-D-erythronic acid [M.P. 198 to 199° C. (decomp.)];
4-(2-amino-6-hydroxypurin-9-yl)-4-deoxy-D-erythronic acid [M.P. 223° C. (decomp.)];
4-(6-hydroxypurin-9-yl)-4-deoxy-D-erythronamide [M.P. 247° C. (decomp.)];
4-(6-ethylaminopurin-9-yl)-4-deoxy-D-erythronic acid [M.P. 242 to 243° C. (decomp.)];
4-(6-diethylaminopurin-9-yl)-4-deoxy-D-erythronic acid [hydrochloride; M.P. 187° C. (decomp.)];
4-(6-hydroxyaminopurin-9-yl)-4-deoxy-D-erythronic acid [M.P. 206.5° C. (decomp.)];
4-(6-benzylaminopurin-9-yl)-4-deoxy-D-erythronic acid [M.P. 206 to 206.5° C. (decomp)];
4-(6-aminopurin-9-yl)-4-deoxy-L-threonic acid [M.P. 291 to 293° C. (decomp.)];
ethyl 4-(6-hydroxypurin-9-yl)-4-deoxy-D-erythronate [M.P. 212° C. (decomp.)];
4-(6-methylthiopurin-9-yl)-4-deoxy-D-erythronic acid [melted at 85° C., solidified at 90° C. and decomposed at 260° C.];
4-(purin-9-yl)-4-deoxy-D-erythronic acid [M.P. 230° C. (decomp.)];
N-ethyl-4-(6-aminopurin-9-yl)-4-deoxy-2,3-O-isopropylidene-D-erythronamide [M.P. 178 to 179° C. (decomp.)];
N-ethyl-4-(6-aminopurin-9-yl)-4-deoxy-D-erythronamide [M.P. 166 to 168° C. (decomp.)];
N,N-diethyl-4-(6-aminopurin-9-yl)-4-deoxy-D-erythronamide [M.P. 192 to 193° C. (decomp.)];
4-(6-ethylaminopurin-9-yl)-4-deoxy-2,3-isopropylidene-D-erythronic acid;
4-(6-methoxypurin-9-yl) - 4-deoxy-D-erythronic acid (sodium salt; vesicated at 168 to 170° C. and colored at 220 to 230° C. with vesication];
4-(2,6-dihydroxypurin-9-yl)-4-deoxy-D-erythronic acid [M.P. 204 to 206° C. (decomp.)];
4-(2-methyl-6-aminopurin-9-yl)-4-deoxy-D-erythronic acid;
4-(6-butylaminopurin-9-yl)-4-deoxy-D-erythronic acid;
4-(6,8-dihydroxypurin-9-yl)-4-deoxy-D-erythronic acid;
4-(2,6-diaminopurin-9-yl)-4-deoxy-D-erythronic acid;
4(6,8-diaminopurin-9-yl)-4-deoxy-D-erythronic acid;
4-(2-aminopurin-9-yl)-4-deoxy-D-erythronic acid;
4-(8-aminopurin-9-yl)-4-deoxy-D-erythronic acid, 4-(6-aminopurin-9-yl)-4-deoxy-2,3-O-isopropylidene-D-threonic acid [M.P. 223° C. (decomp.)]; and
methyl 4-(6-aminopurin-9-yl)-4-deoxy-D-threonate [M.P. 211 to 212° C. (decomp.)], etc.

Example 9

(A) To a solution of 4-(6-amino-5-nitro-4-pyrimidinylamino) - 4 - deoxy-2,3-O-isopropylidene-D-erythronic acid (3.13 g.) in 90% formic acid (45 ml.), 10% palladium-carbon (0.4 g.) was added, and the mixture was subjected to the catalytic hydrogenation. After completion of the reaction the catalyst was filtered off, and the formic acid was evaorated under reduced pressure. The residue was dissolved in water, and the solvent was evaporated under reduced pressure. To the residue was added a small amount of water, and precipitated crystals were collected by filtration. These crystals were washed with methanol to give pillars (2.37 g.) of 4-(6-amino-5-formamido-4-pyrimidinylamino)-4-deoxy-D-erythronic acid. M.P. 190° C. (decomp.). A solution of 4-(6-amino-5-formamido-4-pyrimidinylamino-4-deoxy-D-erythronic acid (0.50 g.) in N sodium hydroxide (5 ml.) was heated in a boiling water bath for 10 minutes. After cooling, N hydrochloric acid (5 ml.) was added to the reaction mixture. Precipitated crystals were collected by filtration and washed with water and then methanol to give 4-(6-aminopurin-9-yl)-4-deoxy-D-erythronic acid (0.34 g.). M.P. 279° C. (decomp.). $[\alpha]_D^{25} = +30°$ (c.=0.93, dimethylsulfoxide).

UV spectrum: $\lambda_{max.}^{H_2O}$ 261 m$\mu$ ($\epsilon$=14,700).

Ammonium salt: M.P. 265 to 267° C. (decomp.). Sodium salt; M.P. 272° C. (decomp.). Hydrochloride: M.P. 198 to 201° C.

(B) To a solution of 4-(6-amino-5-nitro-4-pyrimidinylamino)-4-deoxy-2,3 - O-isopropylidene-D-erythronic acid (1.0 g.) in 98% formic acid (10 ml.), a solution of sodium dithionite (1.5 g.) in water (5 ml.) was dropwise added. After completion of the addition, the mixture was heated with reflux for an hour. The formic acid was distilled off from the reaction mixture under reduced pressure. The residue was dissolved in water, and the solvent was evaporated under reduced pressure. To the residue, there was added N sodium hydroxide (10 ml.) to make alkaline, and the solution was heated in a boiling water bath for 10 minutes. The reaction mixture was condensed to a half volume and allowed to cool. Precipitated crystals were collected by filtration to give sodium 4-(6-aminopurin-9-yl)-4-deoxy-D-erythronate (0.12 g.). This substance was dissolved in water. The aqueous solution was adjusted to pH 3, and precipitated crystals were collected by filtration to give 4-(6-aminopurin-9-yl)-4-deoxy-D-erythronic acid. M.P. 279° C. (decomp.).

(C) To a solution of 4-(2-amino-5-nitro-6-hydroxy-4-pyrimidinylamino) 4 - deoxy - 2,3 - O - isopropylidene-D-erythronic acid (6.1 g.) in 98% formic acid (120 ml.), there was added palladium black (0.5 g.), and the mixture was subjected to catalytic hydrogenation at room temperature under atmospheric pressure. After the absorption of hydrogen gas stopped, the catalyst was removed by filtration, and the filtrate was heated for an hour under reflux. From the reaction mixture, the formic acid was removed by distillation under reduced pressure. The residue was dissolved into a small amount of water, and the solvent was distilled off under reduced pressure. The residue was dissolved into 0.5 N sodium hydroxide solution (90 ml.), and the solution was heated for an hour under reflux and condensed under reduced pressure to about ⅓ volume.

The concentrate was acidified by dilute hydrochloric acid and allowed to stand. Precipitated crystals were collected by filtration, washed with water and then recrystallized from water to give 4-(2-amino-6-hydroxypurin-9-yl)-4-deoxy-D-erythronic acid (1.45 g.). M.P. 223° C. (decomp.).

UV spectrum: $\lambda_{max.}^{H_2O}$ 253 m$\mu$ ($\epsilon$=12,400); $\lambda_{max.}^{H_2O}$ 270 m$\mu$ ($\epsilon$=9,100); $\lambda_{max.}^{0.5 N\ NaOH}$ 270 m$\mu$ ($\epsilon$=10,600); $\lambda_{max.}^{0.5 N\ HCl}$ 255 m$\mu$ ($\epsilon$=12,000); $\lambda_{max.}^{0.5 N\ HCl}$ 280 m$\mu$ ($\epsilon$=7,900).

(D) A solution of ethyl 4-(5-nitro-6-amino-4-pyrimidinylamino) - 4 - deoxy - 2,3 - O - dibenzoyl-L-threonate (2.5 g.) in 90% formic acid (40 ml.) was subjected to catalytic hydrogenation in the presence of palladium carbon at room temperature, after which the palladium carbon was filtered off. The filtrate was condensed under reduced pressure, and N sodium hydroxide solution (45 ml.) and ethanol (45 ml.) were added thereto. The mixture was heated for 30 minutes under reflux and then condensed under reduced pressure. The residue was dissolved in water, and the aqueous solution was adjusted to pH 3 by 10% hydrochloric acid. Precipitated crystals were collected by filtration and washed with water and then ethyl acetate to give 4-(6-aminopurin-9-yl)-4-deoxy-L-threonic acid (0.54 g.). M.P. 291 to 293° C. (decomp.) (recrystallized from 10% acetic acid). $[\alpha]_D^{25}$=—95.0° (c.=0.505, dimethylsulfoxide).

UV spectrum: $\lambda_{max.}^{H_2O}$ 262 m$\mu$ ($\epsilon$=14,600); $\lambda_{max.}^{0.5 N\ HCl}$ 260 m$\mu$ ($\epsilon$=14,200); $\lambda_{max.}^{0.5 N\ NaOH}$ 262.5 m$\mu$ ($\epsilon$=14,500).

(E) A solution of 4-(5-nitro-6-methoxy-4-pyrimidinylamino)-4-deoxy-D-erythronic acid (2.4 g.) in 90% formic acid (60 ml.) was subjected to catalytic hydrogenation in the presence of palladium black (500 mg.), after which the palladium black was filtered off. The filtrate was heated with reflux for 2 hours and the formic acid was distilled off under reduced pressure. N sodium hydroxide solution (25 ml.) was added to the residue and the mixture was heated under reflux for 30 minutes. After cooling, the reaction mixture was absorbed on an ion-exchange resin [OH type, Amberlite IRA 400 (trade name)] (400 ml.) and the resin was washed with water till the washings became neutral. The eluate with 0.5 N formic acid was concentrated with reflux to give a solid (1.2 g.), which was recrystallized from isopropanol to afford 4-(6-hydroxypurin - 9 - yl) - 4 - deoxy - D - erythronic acid. This substance sintered at about 85° C., expanded at 100 to 105° C. and then melted around 185° C.

(F) To a solution of 4-(5-nitro-6-amino-4-pyrimidinylamino)-3-hydroxy-DL-butyric acid (2.0 g.) in 90% formic acid (30 ml.), was added 5% palladium-carbon (200 mg.). The mixture was subjected to catalytic hydrogenation at room temperature under atmospheric pressure. After the absorption of hydrogen gas stopped, the catalyst was removed by filtration, and the filtrate was heated for 30 minutes under reflux. From the reaction mixture, the solvent was removed by distillation under reduced pressure. The residue was dissolved into a small amount of water, and the solvent was distilled off under reduced pressure. In order to remove the formic acid, there were repeated three times the procedures of dissolution of the residue in water and distillation of the solvent. The residue was dissolved into N sodium hydroxide solution (20 ml.), and the solution was heated for 30 minutes on a water bath. After cooling, the reaction mixture was neutralized by 10% hydrochloric acid, and precipitated crystals were collected by filtration, washed with water and then dried to give 4-(6-aminopurin-9-yl)-3-hydroxy-DL-butyric acid (1.5 g.). M.P. 290 to 291° C. (decomp.) (recrystallized from 10% acetic acid).

(G) A solution of 4-(5-nitro-6-pyrimidinylamino-4-deoxy-D-erythronic acid (2.73 g.) in 90% formic acid (50 ml.) was subjected to catalytic hydrogenation in the presence of 10% palladium carbon (0.25 g.) under atmospheric pressure. After the absorption of hydrogen gas stopped, the catalyst was filtered off. The filtrate was heated with reflux for an hour and the formic acid was distilled off under reduced pressure. Water was added to the residue and the solvent was distilled off. In order to remove the formic acid, there were repeated twice the procedures of dissolution of the residue and distillation of the solvent. To the residue was added N sodium hydroxide (50 ml.) and the solution was heated for 20 minutes on a boiling water bath. After cooling, N hydrochloric acid (50 ml.) was added to the reaction mixture. Precipitated crystals were collected by filtration and washed with water to give 4-(6-aminopurin-9-yl)-4-deoxy-D-erythronic acid (2.02 g.). M.P. 279° C. (decomp.).

In the similar manner, there are obtained the following compounds:

4-(6-aminopurin-9-yl)-4-deoxy-D-erythronamide [M.P. 264 to 268° C. (decomp.)];
4-(6-hydroxypurin-9-yl)-4-deoxy-D-erythronic acid [M.P. 215° C. (decomp.)];
4-(2-amino-6-hydroxypurin-9-yl)-4-deoxy-D-erythronic acid [M.P. 223° C. (decomp.)];
4-(6-hydroxypurin-9-yl)-4-deoxy-D-erythronamide [M.P. 247° C. (decomp.)];
4-(6-ethylaminopurin-9-yl)-4-deoxy-D-erythronic acid [M.P. 242 to 243° C. (decomp.)];
4-(6-diethylaminopurin-9-yl)-4-deoxy-D-erythronic acid hydrochloride [M.P. 187° C. (decomp.)];
4-(6-aminopurin-9-yl)-4-deoxy-L-threonic acid [M.P. 291 to 293° C. (decomp.)];
4-(purin-9-yl)-4-deoxy-D-erythronic acid [M.P. 230° C. (decomp.)];
N-ethyl-4-(6-aminopurin-9-yl)-4-deoxy-D-erythronamide [M.P. 166 to 168° C. (decomp.)];
N,N-diethyl-4-(6-aminopurin-9-yl)-4-deoxy-D-erythronamide [M.P. 192 to 193° C. (decomp.)];
4-(2-methyl-6-aminopurin-9-yl)-4-deoxy-D-erythronic acid;
4-(6,8-diaminopurin-9-yl)-4-deoxy-D-erythronic acid;
4-(2-aminopurin-9-yl)-4-deoxy-D-erythronic acid;
4-(8-aminopurin-9-yl)-4-deoxy-D-erythronic acid;
4-(2,6-dihydroxypurin-9-yl)-4-deoxy-D-erythronic acid [M.P. 204 to 206° C. (decomp.)];
4-(6-butyrylaminopurin-9-yl)-4-deoxy-D-erythronic acid;
4-(2,6-diaminopurin-9-yl)-4-deoxy-D-erythronic acid, etc.

Example 10

(A) A solution of 4-(5-amino-4-cyano-1-imidazolyl)-4-deoxy-D-erythronic acid (500 mg.) in diethoxymethyl acetate (5 ml.) was heated under reflux for 3 hours. After cooling, the solvent was distilled off under reduced pressure. The residue was dissolved into methanolic ammonia. The solution was allowed to stand for 24 hours. The methanol was distilled off under reduced pressure, and the residue was dissolved into water. The aqueous solution was adjusted to pH 3 with 5% hydrochloric acid. Precipitated crystals were collected by filtration and washed with water and then methanol to give 4-(6-aminopurin-9-yl)-4-deoxy-D-erythronic acid (130 mg.). M.P. 279° C. (decomp.). Ammonium salt: M.P. 265 to 267° C. (decomp.). Sodium salt: M.P. 272° C. (decomp.) Hydrochloride: M.P. 198 to 201° C.

In the similar manner, there are obtained the following compounds:

methyl 4-(6-aminopurin-9-yl)-4-deoxy-D-erythronate [M.P. 231° C. (decomp.)];
ethyl 4-(6-aminopurin-9-yl)-4-deoxy-D-erythronate [M.P. 159 to 160° C. (decomp.)];
4-(6-aminopurin-9-yl)-4-deoxy-D-erythronamide [M.P. 264 to 268° C. (decomp.)];
4-(6-aminopurin-9-yl)-4-deoxy-2,3-O-isopropylidene-D-erythronic acid [M.P. 214° C. (decomp.)];
methyl 4-(6-aminopurin-9-yl)-4-deoxy-2,3-O-isopropylidene-D-erythronate [M.P. 180 to 181° C. (decomp.)];
4-(6-aminopurin-9-yl)-4-deoxy-2,3-O-benzylidene-D-erythronic acid [M.P. 198 to 199° C. (decomp.)];
N-ethyl-4-(6-aminopurin-9-yl)-4-deoxy-2,3-O-isopropylidene-D-erythronamide [M.P. 178 to 179° C. (decomp.)];

N-ethyl-4-(6-aminopurin-9-yl)-4-dexoy-D-erythronamide [M.P. 166 to 168° C. (decomp.)];
N,N-diethyl-4-(6-aminopurin-9-yl)-4-dexoy-D-erythronamide [M.P. 192 to 193° C. (decomp.)];
4-(6-amino-8-hydroxypurin-9-yl)-4-deoxy-D-erythronic acid [M.P. 215 to 217° C. (decomp.)];
4-(2-methyl-6-aminopurin-9-yl)-4-deoxy-D-erythronic acid;
4-(2,6-diaminopurin-9-yl)-4-deoxy-D-erythronic acid, etc.

Example 11

(A) To a solution of adenine (1.35 g.) in dimethylsulfoxide (25 ml.), sodium hydride (0.48 g.) was added. The mixture was stirred at room temperature for an hour and then at 50° C. for 30 minutes. To the mixture was added 2,3-O-isopropylidene-D-erythronolactone (1.58 g.), and the reaction mixture was stirred at 120° C. for 20 hours. The dimethylsulfoxide was distilled off under reduced pressure from the reaction mixture, and the residue was dissolved in water. The aqueous solution was washed with ether, and the water layer was adjusted to pH 3 with hydrochloric acid and then allowed to stand. Precipitated crystals were collected by filtration and washed with water to give 4-(6-aminopurin-9-yl)-4-deoxy-2,3-O-isopropylidene - D - erythronic acid. On the other hand, the filtrate was condensed under reduced pressure and the residue was treated with water to give the same substance as obtained above. Yield, 56%. M.P. 214° C. (decomp.) (recrystallized from 50% ethanol).

(B) A solution of adenine (2.7 g.) in dimethylformamide (45 ml.) was added sodium hydride (0.96 g.). The reaction mixture was stirred at room temperature for an hour and then at 50° C. for 30 minutes. To the mixture was added 2,3-O-isopropylidene-D-erythronolactone (3.15 g.). The resultant mixture was heated under reflux for 8 hours. The dimethylformamide was evaporated under reduced pressure, and the residue was dissolved in water. The aqueous solution was washed with ether and neutralized with hydrochloric acid. The solution was condensed under reduced pressure. The residue was treated with water, and precipitated crystals were collected by filtration and dried to give 4-(6-aminopurin-9-yl)-4-deoxy-2,3-O-isopropylidene - D - erythronic acid (3.4 g.). M.P. 214° C. (decomp.). On the other hand, the filtrate was condensed under reduced pressure, and the residue was treated with water to give the same substance (0.44 g.) as obtained above. Yield, 65.5%.

(C) A solution of adenine (1.35 g.), 2,3-O-isopropylidene-D-erythronolactone (1.58 g.) and potassium carbonate (0.7 g.) in dimethylformamide (20 ml.) was heated for 6 hours under reflux. The reaction mixture was treated as in Example 4(B) to give 4-(6-aminopurin-9-yl)-4-deoxy-2,3-O-isopropylidene-D-erythronic acid (0.88 g.). M.P. 214° C. (decomp.). Yield, 30%.

(D) A suspension of adenin-1-oxide (1.51 g.) 2,3-isopropylidene-D-erythronolactone (2.21 g.) and potassium carbonate (1.38 g.) in dimethylformamide (50 ml.) was heated with stirring for 8 hours under reflux. From the reaction mixture, the dimethylformamide was removed by distillation under reduced pressure. The residue was dissolved into a small amount of water, and an insoluble substance was filtered off. The filtrate was adjusted to pH 3 with 5% hydrochloric acid. Precipitated crystals were collected by filtration to give 6-amino-9-(3-carboxy-2,3-isopropylideneoxypropyl)-purin-1-oxide (0.40 g.). M.P. 270° C. (decomp.) (recrystallized from methanol).

(E) A suspension of adenin-1-oxide (1.51 g.), 2,3-isopropylidene-D-erythronolactone (2.21 g.) and sodium carbonate (1.06 g.) in dimethylformamide (50 ml.) was heated with stirring for 12 hours under reflux. The reaction mixture was treated as in Example 4(D) to give 6-amino - 9 - (3 - carboxy - 2,3 - isopropylideneoxypropyl)-purin-1-oxide (1.10 g.). M.P. 270° C. (decomp.) (recrystallized from methanol).

(F) A suspension of adenin-1-oxide (1.51 g.), 2,3-isopropylidene-D-erythronolactone (2.21 g.) and sodium carbonate (1.06 g.) in dimethylsulfoxide (50 ml.) was heated with stirring at 160° C. for 6 hours. The reaction mixture was treated as in Example 4(D) to give 6-amino-9-(3-carboxy - 2,3 - isopropylideneoxypropyl)-purin - 1 - oxide (1.30 g.). M.P. 270° C. (decomp.) (recrystallized from methanol.

(G) A suspension of adenin-1-oxide (1.51 g.), 2,3-O-isopropylidene-D-erythronolactone (2.21 g.) and sodium carbonate (1.06 g.) in dimethylacetamide (50 ml.) was heated with stirring at 160° C. for 12 hours. The reaction mixture was treated as in Example 4(D) to give 6-amino - 9 - (3 - carboxy - 2,3 - isopropylideneoxypropyl)-purin-1-oxide (0.80 g.). M.P. 270° C. (decomp.) (recrystallized from methanol).

(H) A mixture of N-ethyladenine (1.63 g.), 2,3-O-isopropylidene-D-erythronolactone (2.20 g.) and sodium carbonate (1.06 g.) in dimethylformamide (32 ml.) was heated with reflux for 24 hours. The dimethylformamide was distilled off, and water was added to the residue. An insoluble substance was filtered off, and the filtrate was neutralized with 10% hydrochloric acid (7.3 ml.) and concentrated to give 4-(6-ethylaminopurin-9-yl)-4-deoxy-2,3-O-isopropylidene - D - erythronic acid. This substance was further subjected to the procedure for converting it into 4-(6-ethylaminopurin-9-yl)-4-deoxy - D - erythronic acid 10% acetic acid (50 ml.) was added to the substance, heated with reflux for 30 minutes and concentrated. The concentrate was adsorbed on an ion exchange resin [OH type IRA 400 (trade name)], the resin was washed with 0.05 N acetic acid and eluted with 0.5 N acetic acid. The eluate was concentrated to give 4-(6-ethylaminopurin-9-yl)-4-deoxy - D - erythronic acid (0.56 g.). M.P. 242 to 243° C. (decomp.) (recrystallized from aqueous ethanol).

UV spectrum: $\lambda_{max.}^{H_2O}$ 269 m$\mu$ ($\epsilon$=17,400).

(I) A mixture of adenine (1.35 g.), benzylideneerthronolactone (2.89 g.) and sodium carbonate (1.06 g.) in dimethylformamide (50 ml.) was heated with reflux under stirring for 19 hours. The dimethylformamide was distilled off under reduced pressure. The residue was dissolved in water (20 ml.) and filtered. The filtrate was adjusted to pH 3 with N hydrochloric acid (20 ml.). Precipitated crystals were collected by filtration, treated with carbon powder and recrystallized twice from methanol while hot to give 4-(6-aminopurin-9-yl)-4-deoxy-2,3-O-benzylidene - D - erythronic acid. M.P. 198 to 199° C. (decomp.).

UV spectrum: $\lambda_{max.}^{H_2O}$ 261 m$\mu$.

(J) A mixture of adenine-N-oxide (1.51 g.), benzylideneerythronolactone (2.89 g.) and sodium carbonate (1.06 g.) in dimethylformamide (50 ml.) was heated with reflux under stirring for 19 hours. The dimethylformamide was distilled off under reduced pressure and the residue was dissolved in water (20 ml.). The solution was filtered and the filtrate was neutralized with N hydrochloric acid (20 ml.). Precipitated crystals were collected by filtration and recrystallized from methanol while hot to give 4- (6-aminopurin - 9 - yl) - 4 - deoxy - 2,3 - O-benzylidene - D - erythronic acid. M.P. 198 to 199° C. (decomp.).

UV spectrum: $\lambda_{max.}^{H_2O}$ 261 m$\mu$.

(K) A mixture of adenine (1.53 g.), dimethylformamide (27 ml.) and potassium hydroxide (0.84 g.) was heated at 120° C. for 30 minutes and further at 140° C. for 10 minutes. To the mixture was added 2,3-O-isopropylidene-D-erythronolactone (1.90 g.) in dimethylformamide (5 ml.), and the reaction mixture was refluxed for 18 hours. The dimethylformamide was distilled off, water was added to the residue and insoluble substance was removed.

The water layer was adjusted to pH 3 with 10% hydrochloric acid and concentrated. A small amount of water was added to the residue and precipitated crystals were collected by filtration to give 4-(6-amino-purin-9-yl)-4-deoxy-2,3-O-isopropylidene - D erythronic acid (0.73 g.). M.P. 214° C. (decomp.).

(L) A mixture of adenine (1.35 g.), dimethylformamide (20 ml.), 2,3 - O - isopropylidene-D-erythronolactone (1.58 g.) and cesium fluoride (0.75 g.) was heated under reflux for 23 hours. The dimethylformamide was evaporated under reduced pressure, the residue was dissolved in water and insoluble material was removed. The aqueous solution was adjusted to pH 3 with 10% hydrochloric acid. The solution was condensed under reduced pressure. The residue was treated with water, and precipitated crystals were collected by filtration to give 4-(6-aminopurin-9-yl)-4-deoxy-2,3 - O - isopropylidene-D-erythronic acid (0.4 g.). M.P. 214° C. (decomp.).

(M) A mixture of adenine (1.35 g.), 2,3 - O - isopropylidene-D-erythronolactone (2.20 g.), potassium t-butoxide (1.68 g.) and dimethylformamide (27 ml.) was heated under reflux for 24 hours. The reaction mixture was treated as in Example 4 (L) to give 4-(6-aminopurin-9-yl)-4-deoxy-2,3 - O - isopropylidene - D - erythronic acid (1.41 g.). M.P. 214° C. (decomp.).

(N) A mixture of 6-benzamidopurin (2.40 g.) 2,3 - O-isoprpoylidene-D-erythronolactone (2.21 g.) and sodium carbonate (1.06 g.) in dimethylformamide (30 ml.) was stirred at 120 to 125° C. for 20 hours. The dimethylformamide was removed by filtration and the residue was dissolved in a small amount of water. The aqueous solution was adjusted to pH 3 with dilute hydrochloric acid and precipitated crystals were filtered off. The filtrate was concentrated under reduced pressure and the concentrate was dissolved in 10° acetic acid (50 ml.) and the solution was heated refluxively for two hours. The reaction mixture was treated with carbon powders and concentrated under reduced pressure. The concentrate was dissolved in a small amount of water. The aqueous solution was proved to contain 4-(6-benzamidopurin-9-yl)-4-deoxy - 2,3 - O - isopropylidene-D-erythronic acid by thin layer chromatography. Precipitated crystals from the aqueous solution were collected by filtration and recrystallized from water to give 4-(6-aminopurin-9-yl)-4-deoxy - D - erythronic acid (0.50 g.). M.P. 279° C. (decomp.).

(O) A solution of adenine (1.35 g.), 2,3 - O - isopropylidene-D-erythronolactone (2.40 g.) and sodium bicarbonate (1.26 g.) in dimethylformamide (27 ml.) was heated under reflux for 18 hours. The reaction mixture was treated as in Example 4(L) to give 4-(6-aminopurin-9-yl)-4-deoxy-2,3 - O - isopropylidene - D - erythronic acid (0.88 g.). M.P. 214° C. (decomp.).

(P) A mixture of 6-methoxypurine (1.50 g.) 2,3-O-isopropylidene-D-erythronolactone (1.90 g.), sodium carbonate (0.64 g.) and dimethylformamide (30 ml.) was heated at 140° C. for 8 hours. The dimethylformamide was distilled off, after which the residue was dissolved in water and 10% hydrochloric acid (4.5 ml.) was added to the aqueous solution. The reaction mixture was concentrated under reduced pressure to obtain an oil of 4-(6-methoxypurin-9-yl) - 4 - deoxy - 2,3 - O -isopropylidene D-erythronic acid. 10% acetic acid (50 ml.) was added to thus obtained oil and the mixture was refluxed for 30 minutes. After concentration, the residue was dissolved in a small amount of water. The aqueous solution was adsorbed on an ion exchange resin [OH type, Amberlite IRA-400 (trade name)] (100 ml.) and washed with water, 0.05 N acetic acid and 0.5 N acetic acid in order. The eluate with 0.5% formic acid was concentrated and treated with ethanol to give a mixture of 4-(6-methoxypurin-9-yl)-4-deoxy-D-erythronic acid and 4 - (6 - hydroxypurin-9-yl)-4-deoxy-D-erythronic acid. Each component was separated and confirmed by thin-layer chromatography.

(Q) 6-octanamidopurine (1.3 g.), potassium carbonate (0.55 g.), 2,3 - O - isopropylidene - D - erythronolactone (1.18 g.) and dimethylformamide (26 ml.) were heated with reflux for 6 hours. The dimethylformamide was distilled off and water was added thereto. Insoluble material was filtered off, and the filtrate was adjusted to pH 3 with 10% hydrochloric acid. The separated oil was extracted with ethyl acetate and the aqueous layer was concentrated. A small amount of water was added to the residue. The aqueous solution was proved to contain 4-(6-octanolyamido-purin - 9 - yl) - 4 - deoxy-2,3-O-isopropylidene-D - erythronic acid by thin-layer chromatography. Precipitated crystals form the aqueous solution were collected by filtration to give 4-(6-aminopurin-9-yl)-4-deoxy-2,3-O-isopropylidene - D - erythronic acid (0.36 g.). M.P. 214° C. (decomp.).

In the similar manner, there are obtained the following compounds: 4-(6-amino-8-methylpurin-9-yl)-4-deoxy-2,3-O-isopropylidene-D-erythronic acid [M.P. 265° C. (decomp.)], etc.

Example 12

(A) A suspension of methyl 4-(6-aminopurin-9-yl)-4-deoxy-2,3-O-diacetyl-D-erythronate (100 mg.) in N sodium hydroxide solution (2 ml.) was stirred at room temperature for 3 hours. The reaction mixture was adjusted to pH 3–4 with hydrochloric acid. Precipitated crystals were collected by filtration, washed with water and then dried to give 4-(6-aminopurin-9-yl)-4-deoxy-D-erythronic acid (44 mg.) M.P. 279° C. (decomp.). Ammonium salt: M.P. 265 to 267° C. (decomp.). Sodium salt: M.P. 272° C. (decomp.). Hydrochloride: M.P. 198 to 201° C.

(B) A solution of 4-(6-benzamidopurin-9-yl)-4-deoxy-D-erythronic acid (80 mg.) in methanol (5 ml.) containing metallic sodium (50 mg.) was heated under reflux for an hour. From the reaction mixture, methanol was removed by evaporation under reduced pressure, and the residue was dissolved in water. The aqueous solution was adjusted to pH 3–4 with 5% hydrochloric acid. The water layer was washed with ether and allowed to stand. The precipitated crystals were collected by filtration, washed with water and then dried to give 4-(6-aminopurin-9-yl)-4-deoxy-D-erythronic acid (36 mg.). M.P. 279° C. (decomp.).

(C) 4-(6 - aminopurin-9-yl)-4-deoxy-D-erythronamide (100 mg.) was dissolved under heating in 10% sodium hydroxide solution (5 ml.). The solution was refluxed under heating for 1.5 hours, adjusted to pH 3 with dilute hydrochloric acid and allowed to stand. Precipitated crystals were collected by filtration and washed with water to give 4-(6-aminopurin-9-yl)-4-deoxy-D-erythronic acid (8 mg.). M.P. 279° C. (decomp.).

(D) A solution of 4-(6-aminopurin-9-yl)-4-deoxy-2,3-O-isopropylidene-D-erythronic acid (150 mg.) in 10% formic acid (3 ml.) was heated on a water bath for 30 minutes. The reaction mixture was condensed under reduced presure, and water was added thereto. The precipitated crystals were collected by filtration, washed with water and then dried to give 4-(6-aminopurin-9-yl)-4-deoxy-D-erythronic acid (130 mg.). M.P. 279° C. (decomp.).

(E) 4-(6 - amino-8-methylpurin-9-yl) - 4 - deoxy-2,3-O-isopropylidene-D-erythronic acid (400 mg.) was dissolved in 20% acetic acid (10 ml.) under heating. The solution was heated for 30 minutes under reflux, treated with carbon powder and then filtered. The filtrate was allowed to cool, and precipitated crystals were collected by filtration and washed with water to give crystals (232 mg.) of 4 - (6 - amino - 8 - methylpurin-9-yl)-4-deoxy-D-erythronic acid. M.P. 281° C. (decomp.) (recrystallized from water).

UV spectrum: $\lambda_{max.}^{H_2O}$ 263 m$\mu$ ($\epsilon$=14,300).

(F) 6-amino - 9 - (3 - carboxy-2,3-O-isopropylidene-dihydroxypropyl)-purin-1-oxide (300 mg.) was suspended in 10% acetic acid (10 ml.). The suspension was heated under reflux for 30 minutes. A small amount of carbon powder was added to the reaction mixture and filtered. The filtrate was concentrated under reduced pressure. Precipitated crystals were collected by filtration and recrystallized from water to give 6-amino-9-(3-carboxy-2,3-dihydroxypropyl)-purin-1-oxide (165 mg.). M.P. 275° C. (decomp.).

(G) A suspension of 4-(6-amino-8-mercaptopurin-9-yl)-4-deoxy-2,3-O-isopropylidene-D-erythronic acid (300 mg.) in 10% acetic acid (20 ml.) was heated with reflux for 2 hours. The reaction mixture was treated with carbon powder and filtered while hot. The filtrate was concentrated under reduced pressure and water was added to the residue. Precipitated crystals were collected by filtration and washed with methanol to give 4-(6-amino-8-mercaptopurin-9-yl)-4-deoxy-D-erythronic acid (220 mg.). M.P. 265 to 268° C. (decomp.).

UV spectrum: $\lambda_{max.}^{H_2O}$ 240 m$\mu$ ($\epsilon$=19,000), $\lambda_{max.}^{H_2O}$ 288 m$\mu$ ($\epsilon$=25,500), $\lambda_{max.}^{H_2O}$ 306 m$\mu$ ($\epsilon$=27,300).

(H) A mixture of 4-(6-aminopurin-9-yl)-4-deoxy-2,3-O-benzylidene-D-erythronic acid (1.00 g.) and 10% acetic acid (30 ml.) was heated with reflux for an hour. The reaction mixture was treated with carbon powder and filtered. The filtrate was evaporated under reduced pressure, and the residue was washed with methanol to give crude crystals (285 mg.) of 4-(6-aminopurin-9-yl)-4-deoxy-D-erythronic acid. M.P. 279° C. (decomp.) (recrystallized from water while hot with treatment of carbon powder).

UV spectrum: $\lambda_{max.}^{H_2O}$ 263 m$\mu$.

(I) Methyl 4-(6-aminopurin-9-yl)-4-deoxy-D-erythronate (300 mg.) was dissolved in methanol (5 ml.) and N sodium hydroxide solution (5 ml.). The solution was stirred for an hour at room temperature and concentrated under reduced pressure. To the residue was added 1 N hydrochloric acid (5 ml.). Precipitated crystals were collected by filtration and washed with methanol to give 4-(6-aminopurin-9-yl) - 4 - deoxy-D-erythronic acid (220 mg.). M.P. 279° C. (decomp.).

(J) Methyl 4-(6-aminopurin-9-yl)-4-deoxy-2,3-O-isopropylidene-D-erythronate (500 mg.) in a mixture of methanol (10 ml.) and 1 N sodium hydroxide (5 ml.) was treated as in Example 5(I) to give 4-(6-aminopurin-9-yl)-4-deoxy - 2,3 - O-isopropylidene-D-erythronate (470 mg.). M.P. 229° C. (decomp.).

(K) Methyl 4-(6-aminopurin-9-yl)-4-deoxy-2,3-O-isopropylidene-D-threonate (200 mg.) in a mixture of methanol (4 ml.) and 1 N sodium hydroxide (2 ml.) was treated as in Example 5(I) to give 4-(6-aminopurin-9-yl)-4-deoxy-2,3-O-isopropylidene-D-threonate (105 mg.). M.P. 223° C. (decomp.).

(L) 4-(6-hydroxypurin-9-yl) - 4 - deoxy-D-erythronamide (50 mg.) in 20% hydrochloric acid (1 ml.) was heated refluxively for 20 hours. After cooling, the reaction mixture was concentrated under reduced pressure and the residue was dissolved in water. The solution was neutralized with sodium bicarbonate aqueous solution and concentrated under reduced pressure. The residue was recrystallized from 80% ethanol to give sodium 4-(6-hydroxypurin-9-yl)-4-deoxy-D-erythronate (30 mg.). This substance expanded at 100 to 105° C. and then melted around 185° C.

(M) 4-(6-aminopurin - 9 - yl)-4-deoxy-2,3-O-diacetyl-D-erythronic acid (180 mg.) in 1 N sodium hydroxide (5 ml.) was stirred at room temperature for an hour. The reaction mixture was neutralized with 1 N hydrochloric acid (5 ml.) and concentrated to about half volume under reduced pressure. Precipitated crystals were collected by filtration and washed with methanol to give 4-(6-aminopurin-9-yl)-4-deoxy-D-erythronic acid (95 mg.). M.P. 279° C. (decomp.).

(N) 4 - (6 - ethylaminopurin - 9 - yl)-4-deoxy-2,3-O-isopropylidene-D-erythronic acid (0.70 g.) in 10% acetic acid (50 ml.) was heated refluxively for 30 minutes. The reaction mixture was concentrated under reduced pressure and absorbed on an ion-exchange resin [Amberlite IRA-400 (trade name)]. The resin was washed with 0.05 N acetic acid and eluted with 0.5 N acetic acid. The eluate was concentrated under reduced pressure to give 4 - (6 - ethylaminopurin-9-yl)-4-deoxy-D-erythronic acid (0.56 g.). M.P. 242 to 243° C. (decomp.) (recrystallized from hydrous ethanol).

(O) Methyl 4 - (6-aminopurin-9-yl)-4-deoxy-2,3-O-isopropylidene-D-erythronate (200 mg.) in formic acid (5 ml.) was treated as in Example 5(D) to give 4-(6-aminopurin - 9 - yl)-4-deoxy-D-erythronic acid (110 mg.). M.P. 279° C. (decomp.).

(P) To a suspension of methyl 4-(6-aminopurin-9-yl) - 4 - deoxy-2,3,-O-isopropylidene-D-erythronate (200 mg.) in methanol (20 ml.), was added conc. hydrochloric acid (0.5 ml.), and the mixture was allowed to stand at room temperature for 65 hours. The reaction mixture was added to a suspension of a weakly basic ion-exchange resin [Amberlite IR-45 (trade name)] (4.0 g.) in 50% methanol (20 ml.), and the mixture was stirred for 30 minutes and filtered. The filtrate was concentrated under reduced pressure and precipitated crystals were collected and washed with methanol to give methyl 4-(6-aminopurin-9-yl)-4-deoxy-D-erythronate (160 mg.). M.P. 231° C. (decomp.).

(Q) 4 - (6 - aminopurin - 9-yl)-4-deoxy-2,3-O-isopropylidene-D-threonic acid (450 mg.) in 20% acetic acid (30 ml.) was heated refluxively for two hours. After cooling, precipitated crystals were collected and washed with water and acetone in order to give 4-(6-aminopurin-9-yl)-4-deoxy-D-threonic acid (350 mg.). M.P. 297° C. (decomp.).

In the similar manner, there are obtained the following compounds:

4-(2-methylthio-6-aminopurin-9-yl)-4-deoxy-D-erythronic acid [M.P. 249° C. (decomp.)];
4-(6-amino-8-mercaptopurin-9-yl)-4-deoxy-D-erythronic acid [M.P. 265 to 268° C. (decomp.)];
4-(2-hydroxy-6-aminopurin-9-yl)-4-deoxy-D-erythronic acid [M.P. over 300° C. (decomp.)];
4 - (6-hydroxypurin-9-yl)-4-deoxy-D-erythronic acid [sintered at about 85° C., expanded at 100 to 105° C. and then melted around 185° C.];
4 - (2 - amino-6-hydroxypurin-9-yl)-4-deoxy-D-erythronic acid [M.P. 223° C. (decomp.)];
4-(6-chloropurin-9-yl)-4-deoxy-D-erythronic acid [melted at 85° C., solidified at 90° C. and then decomposed at 260° C., isopropanol adduct; M.P. 110° C. (decomp.)];
4-(6-ethylaminopurin-9-yl)-4-deoxy-D-erythronic acid [M.P. 242 to 243° C. (decomp.)];
4-(6-diethylaminopurin-9-yl)-4-deoxy-D-erythronic acid [hydrochloride; M.P. 187° C. (decomp.)];
4-(6-hydroxyaminopurin-9-yl)-4-deoxy-D-erythronic acid [M.P. 206.5° C. (decomp.)];
4-(6-benzylaminopurin-9-yl)-4-deoxy-D-erythronic acid [M.P. 206 to 206.5° C. (decomp.)];
4-(6-benzoylaminopurin-9-yl)-4-deoxy-D-erythronic acid [M.P. 232 to 235° C. (decomp.)];
4-(6-aminopurin-9-yl)-4-deoxy-L-threonic acid [M.P. 291 to 293° C. (decomp.)];
4-(6-mercaptopurin-9-yl)-4-deoxy-D-erythronic acid [M.P. 240° C. (decomp.)];
4 - (6 - methylthiopurin - 9-yl)-4-deoxy-D-erythronic acid [sintered at 114° C. colored at about 220° C. and thereafter decomposed gradually];
4-(purin-9-yl)-4-deoxy-D-erythronic acid [M.P. 230° C. (decomp.)];
N-ethyl-4-(6-aminopurin-9-yl)-4-deoxy-D-erythronamide [M.P. 166 to 168° C. (decomp.)];
4 - (6 - amino-8-hydroxypurin-9-yl)-4-deoxy-D-erythronic acid [M.P. 215 to 217° C. (decomp.)], etc.

Example 13

(A) To a solution of 4-(2-methylthio-6-aminopurin-9-yl)-4-deoxy-D-erythronic acid (300 mg.) in an aqueous solution (5 ml.) containing sodium bicarbonate (90 mg.) was added Raney nickel (5 ml.), and the mixture was heated with stirring on a water bath for 4 hours. The reaction mixture was filtered while hot and washed with water. The filtrate and the washings were combined together and condensed under reduced pressure. The residue was adjusted to about pH 3 with hydrochloric acid. Precipitated crystals were collected by filtration and dried to give 4-(6-aminopurin-9-yl)-4-deoxy-D-erythronic acid (90 mg.). M.P. 279° C. (decomp.).

(B) To a solution of 4-(6-amino-8-mercaptopurin-9-yl)-4-deoxy-D-erythronic acid (90 mg.) in an aqueous solution (5 ml.) containing sodium bicarbonate (20 mg.) was added Raney nickel (0.5 ml.). The mixture was heated under reflux for an hour. The catalyst was removed by filtration from the reaction mixture and washed with water. The washings were combined with the previously obtained filtrate. The mixture was condensed under reduced pressure and the residue was dissolved into a small amount of water. The aqueous solution was adjusted to pH 3 with dilute hydrochloric acid. Precipitated white crystals were collected by fitration and washed with water and then methanol to give 4-(6-aminopurin-9-yl)-4-deoxy-D-erythronic acid (56 mg.). M.P. 279° C. (decomp.). Ammonium salt: M.P. 265 to 267° C. (decomp.). Sodium salt: M.P. 272° C. (decomp.). Hydrochloride: M.P. 198 to 201° C.

(C) 4-(6-chloropurin-9-yl)-4-deoxy-D-erythronic acid (10 mg.) was dissolved in a mixture of conc. aqueous ammonia (0.4 ml.) and water (15 ml.). To the solution was added 5% palladium-carbon (500 mg.), and the mixture was shaken under hydrogen atmosphere. After the absorption of hydrogen gas stopped, the catalyst was removed by filtration and washed with water. The washings and the filtrate were combined together and concentrated under reduced pressure. The concentrate was adjusted to pH 2 with conc. hydrochloric acid and further concentrated under reduced pressure. The residue was recrystallized from aqueous methanol to give 4-(purin-9-yl)-4-deoxy-D-erythronic acid (480 mg.). M.P. 230° C. (decomp.).

UV spectrum: $\lambda_{max.}^{H_2O}$ 265 m$\mu$ ($\epsilon$=7,800); $\lambda_{max.}^{0.1\,N\,HCl}$ 264 m$\mu$ ($\epsilon$=5,600); $\lambda_{max.}^{0.1\,N\,NaOH}$ 265 m$\mu$ ($\epsilon$=7,400).

(D) To a solution of 4-(6-benzylaminopurin-9-yl)-4-deoxy-D-erythronic acid (850 mg.) in 50% formic acid (30 ml.) was added palladium black (830 mg.). The mixture was heated for 11 hours at 60 to 75° C. under hydrogen gas of 2 to 3 atm. After removing the catalyst, the reaction mixture was condensed under reduced pressure to give white crystals (650 mg.) of 4-(6-aminopurin-9-yl)-4-deoxy-D-erythronic acid. M.P. 279° C. (decomp.) (recrystallized from water).

(E) 4-(6-hydroxyaminopurin-9-yl)-4-deoxy-D-erythronic acid (500 mg.) was dissolved in 10% formic acid (10 ml.). Platinum dioxide (500 mg.) was added to the solution, and the mixture was subjected to catalytic hydrogenation for 6 hours. After completion of the reaction, the catalyst was collected by filtration and washed with water. The washings and the filtrate were combined together and condensed to dryness. The residue was washed with water and then ethanol and crystallized from 10% acetic acid to give 4-(6-aminopurin-9-yl)-4-deoxy-D-erythronic acid (290 mg.). M.P. 279° C. (decomp.).

(F) 4-(6-hydroxyaminopurin-9-yl)-4-deoxy-D-erythronic acid (200 mg.) was dissolved in N sodium hydroxide solution (1 ml.). The solution was heated together with Raney nickel (2 ml.) under reflux for 2 hours. After cooling, the catalyst was collected by filtration and washed with water. The washings and the filtrate were combined together and concentrated. The concentrate was adjusted to pH 3 with formic acid. Precipitated crystals were collected by filtration and recrystallized from 10% acetic acid to give 4-(6-aminopurin-9-yl-4-deoxy-D-erythronic acid (40 mg.). M.P. 279° C. (decomp.).

(G) 6-amino-9-(3-carboxy-2,3-dihydroxypropyl)-purin-1-oxide (250 mg.) was dissolved in 0.1 N sodium hydroxide solution (10 ml.). A small amount of Raney nickel was added to the solution and subjected to catalytic hydrogenation under atmospheric pressure. After the absorption of hydrogen gas stopped, the catalyst was removed by filtration. The filtrate was neutralized with 0.1 N hydrochloric acid and concentrated to a half volume under reduced pressure. Precipitated crystals were collected by filtration and washed with water to give 4-(6-aminopurin-9-yl)-4-deoxy-D-erythronic acid (197 mg.). M.P. 279° C. (decomp.).

(H) Ethyl 4-(6-amino-8-mercaptopurin-9-yl)-4-deoxy-D-erythronate (300 mg.) in ethanol (30 ml.) and Raney nickel (0.5 ml.) were treated as in Example 6(B) to give ethyl 4-(6-aminopurin-9-yl)-4-deoxy-D-erythronate (170 mg.). M.P. 190° C.

(I) 6-amino-9-(3-ethoxycarbonyl-2,3-dihydroxypropyl)purin-1-oxide (1.0 g.) in 50% ethanol (20 ml.) was subjected to catalytic hydrogenation under presence of a small amount of Raney nickel. The reaction mixture was concentrated under reduced pressure to give ethyl 4-(6-aminopurin-9-yl)-4-deoxy-D-erythronate (820 mg.). M.P. 161 to 163° C. (recrystallized from a mixture of ethanol and acetone).

(J) Ethyl 4-(6-hydroxyaminopurin-9-yl)-4-deoxy-D-erythronate hydrochloride (390 mg.) in ethanol (30 ml.) was subjected to catalytic hydrogenation under presence of platinum dioxide (300 mg.). The catalyst was filtered off and the filtrate was added to a suspension of a weakly basic ion-exchange resin (Amberlite-IR 45 (trade name)) (5 g.) in 70% ethanol (50 ml.). The mixture was filtered and the filtrate was concentrated under reduced pressure to give ethyl 4-(6-aminopurin-9-yl)-4-deoxy-D-erythronate (280 mg.). M.P. 160° C. (recrystallized from ethanol).

In the similar manner, there are obtained the following compound: methyl 4-(6-aminopurin-9-yl)-4-deoxy-D-erythronate [M.P. 231° C. (decomp.)]; 4-(6-amino-8-methylpurin-9-yl)-4-deoxy-2,3,O-isopropylidene-D-erythronic acid [M.P. 265° C. (decomp.)], 4-(6-aminopurin-9-yl)-4-deoxy-2,3-O-isopropylidene-D-erythronic acid [M.P. 214° C.], etc.

Example 14

(A) 4-(6-chloropurin-9-yl)-4-deoxy-D-erythronic acid (500 mg.) was dissolved into ammonia-saturated ethanol (30 ml.) at 0° C. The solution was heated at 120° C. for 21 hours in a sealed vessel. After cooling, the ethanol was removed from the reaction mixture by evaporation. The residue was dissolved into a small amount of water. The aqueous solution was adjusted to pH 3 by hydrochloric acid. Precipitated crystals were collected by filtration, washed with water and then dried to give 4-(6-aminopurin-9-yl)-4-deoxy-D-erythronic acid (300 mg.). M.P. 279° C. (decomp.). Ammonium salt: M.P. 265 to 267° C. (decomp.). Sodium salt: M.P. 272° C. (decomp.). Hydrochloride: M.P. 198 to 201° C.

(B) 4-(6-Chloropurin-9-yl)-4-deoxy-2,3,O-isopropylidene-D-erythronic acid (500 mg.) was dissolved in ammonia-saturated ethanol solution (30 ml.) at 0° C. The solution was heated at 120° C. for 21 hours in a sealed vessel. After cooling, the ethanol was removed by distillation from the reaction mixture. The residue was dissolved in a small amount of water and the aqueous solution was adjusted to pH 2 to 3 with hydrochloric acid. Precipitated crystals were collected by filtration and washed with water to give 4-(6-aminopurin-9-yl)-4-deoxy-2,3,O-isopropylidene-D-erythronic acid (320 mg.). M.P.

214° C. (decomp.) (recrystallized from 95% ethanol). $[\alpha]_D^{25} = +60°$ (c.=0.503, dimethylsulfoxide).

UV spectrum: $\lambda_{max.}^{H_2O}$ 261.5 m$\mu$ ($\epsilon$=14,200); $\lambda_{max.}^{0.1\ N\ HCl}$ 258.5 m$\mu$ ($\epsilon$=13,500); $\lambda_{max.}^{0.1\ N\ NaOH}$ 261.0 m$\mu$ ($\epsilon$=15,300).

(C) A solution of 4-(6-chloropurin-9-yl)-4-deoxy-D-erythronic acid (1.36 g.) and benzylamine (1.61 g.) in ethanol (30 ml.) was heated under reflux for 8 hours. The ethanol was removed by evaporation under reduced pressure and the residue was dissolved in water (10 ml.). To the aqueous solution was added ethyl acetate to extract excess of benzylamine. The aqueous layer was separated and adjusted to pH 2 to 3 with hydrochloric acid and then cooled with ice-water overnight. Precipitated crystals were washed with water to give 4-(6-benzylaminopurin-9-yl)-4-deoxy-D-erythronic acid (1.10 g.). M.P. 206 to 206.5° C. (decomp.) (recrystallized from water).

UV spectrum: $\lambda_{max.}^{H_2O}$ 271 m$\mu$ ($\epsilon$=20,400); $\lambda_{max.}^{0.1\ N\ HCl}$ 268 m$\mu$ ($\epsilon$=19,500); $\lambda_{max.}^{0.1\ N\ NaOH}$ 271 m$\mu$ ($\epsilon$=20,400).

(D) A solution of 4-(6-chloropurin-9-yl)-4-deoxy-D-erythronic acid (750 mg.) in 70% aqueous ethylamine (7.5 ml.) was heated under reflux for 2 hours. From the reaction mixture, the solvent was removed by distillation. The residue was dissolved in a small amount of water, and the aqueous solution was adjusted to pH 3 with 10% hydrochloric acid. Precipitated crystals were collected by filtration and washed with water to give 4-(6-ethylaminopurin-9-yl)-4-deoxy-D-erythronic acid (400 mg.). M.P. 242 to 243° C. (decomp.) (recrystallized from a mixture of water and ethanol).

UV spectrum: $\lambda_{max.}^{H_2O}$ 267 m$\mu$ ($\epsilon$=16,900); $\lambda_{max.}^{0.1\ N\ NaOH}$ 269 m$\mu$ ($\epsilon$=17,000).

(E) A solution of 4-(6-chloropurin-9-yl)-4-deoxy-D-erythronic acid (1.0 g.) in 50% aqueous diethylamine (10 ml.) was heated under reflux for 2 hours. The solvent was removed by distillation from the reaction mixture, adjusted to pH 3 with 10% hydrochloric acid and then condensed under reduced pressure. The oily residue was dissolved into ethanol. A mixture of hydrochloric acid and ethanol was added thereto. Precipitated crystals were collected by the filtration and recrystallized from a mixture of ethanol and ether to give crystals (1.0 g.) of 4-(6-diethylaminopurin-9-yl)-4-deoxy-D-erythronic acid hydrochloride. M.P. 187° C. (decomp.).

(F) Into a mixture of ethanol (10 ml.) and water (2 ml.), 4 - (6-chloropurin-9-yl)-4-deoxy-D-erythronic acid (1.0 g.) and ethoxyamine (1.2 g.) were dissolved, and the resultant mixture was heated at 80° C. in a sealed tube for 4 hours. The reaction mixture was distilled under reduced pressure to dryness. The residue was recrystallized from isopropanol to give 4-(6-ethoxyaminopurin-9-yl)-4-deoxy-D-erythronic acid (900 mg.). Recrystallization from ethanol afforded pure crystals. M.P. 208.5 to 209° C. (decomp.).

UV spectrum: $\lambda_{max.}^{H_2O}$ 269 m$\mu$ ($\epsilon$=15,100); $\lambda_{max.}^{0.1\ N\ HCl}$ 268.5 m$\mu$ ($\epsilon$=16,000); $\lambda_{max.}^{0.1\ N\ NaOH}$ 285 m$\mu$ ($\epsilon$=11,300).

(G) A solution of 4-(6-chloropurin-9-yl)-4-deoxy-D-erythronic acid (1.0 g.) and benzyloxyamine (1.8 g.) in ethanol (10 ml.) was heated under reflux for 3 hours. After removal of the ethanol under reduced pressure, the residue was dissolved in water, adjusted to pH 9 with 10% sodium hydroxide solution and shaken with ethyl acetate. The aqueous layer was concentrated under reduced pressure to dryness and the residue was recrystallized from ethanol to give sodium 4 - (6-benzyloxyaminopurin-9-yl)-4-deoxy-D-erythronate (550 mg.). M.P. 205° C. (decomp.).

UV spectrum: $\lambda_{max.}^{H_2O}$ 270.5 m$\mu$ ($\epsilon$=15,600); $\lambda_{max.}^{0.1\ N\ HCl}$ 271 m$\mu$ ($\epsilon$=15,200); $\lambda_{max.}^{0.1\ N\ NaOH}$ 287 m$\mu$ ($\epsilon$=12,100).

In the similar manner, there are obtained the following compounds:

4-(6-amino-8-methylpurin-9-yl)-4-deoxy-D-erythronic acid [M.P. 281° C. (decomp.)];
4-(2-hydroxy-6-aminopurin-9-yl)-4-deoxy-D-erythronic acid [M.P. over 300° C. (decomp.)];
4-(6-amino-8-methylpurin-9-yl)-4-deoxy-2,3-O-isopropylidene-D-erythronic acid [M.P. 265° C. (decomp.)];
4-(6-aminopurin-9-yl)-4-deoxy-2,3-O-benzylidene-D-erythronic acid [M.P. 198 to 199° C. (decomp.)];
4-(6-aminopurin-9-yl)-4-deoxy-L-threonine acid [M.P. 291 to 293° C. (decomp.)], etc.

Example 15

(A) 4 - (6-aminopurin-9-yl)-4-deoxy-2,3,-di-O-acetyl-D-erythronic acid (60 mg.) was suspended in tetrahydrofuran (4 ml.), and an ether solution (2 ml.) containing diazomethane (25 mg.) was added thereto under stirring. The mixture was further stirred for 2 hours. The reaction mixture was concentrated under reduced pressure. The residue was subjected to column chromatography using neutral alumina and eluated with a mixture of chloroform and methanol (10:1) to give crystals of methyl 4 - (6 - aminopurin - 9 - yl)-4-deoxy-2,3-di-O-acetyl-D-erythronate (38 mg.). M.P. 228° C. (decomp.).

(B) 4 - (6 - aminopurin - 9-yl)-4-deoxy-D-erythronic acid (100 mg.) was suspended in tetrahydrofuran (15 ml.), and an ether solution (5 ml.) containing diazomethane (50 mg.) was added thereto. The mixture was stirred at room temperature while stirring. The reaction mixture was concentrated under reduced pressure to give needles (82 mg.) of methyl 4-(6-aminopurin-9-yl)-4-deoxy-D-erythronate. M.P. 231° C. (decomp.) (recrystallized from mixture of methanol and water).

(C) 4 - (6-aminopurin-9-yl)-4-deoxy-D-erythronic acid (1.00 g.) was suspended in methanol (50 ml.) Boron trifluoride etherate (2 ml.) was added dropwise to the solution with stirring. The mixture was stirred for 5 hours, and the methanol was evaporated under reduced pressure. The residue was dissolved in water and neutralized with sodium bicarbonate. Precipitated crystals were collected by filtration, washed with water and further methanol and recrystallized from a mixture of methanol and water to give methyl 4-(6-aminopurin-9-yl)-4-deoxy-D-erythronate (0.86 g.). M.P. 231° C. (decomp.).

(D) 4 - (6 - aminopurin - 9-yl)-4-deoxy-D-erythronic acid (500 mg.) was suspended in ethanol (25 ml.). Conc. sulfuric acid (0.4 g.) was added to the solution. The mixture was heated under reflux for 6 hours and poured into an aqueous solution (25 ml.) containing sodium bicarbonate (2.5 g.). The precipitated substance was filtered off. The filtrate was concentrated under reduced pressure at room temperature. The concentrate was dissolved in ethanol, and insoluble material was filtered off. The filtrate was concentrated under reduced pressure, the concentrate was dissolved in ethhanol, and acetone was added to the ethanol solution. The precipitate was removed by filtration, and acetone was further added to the filtrate. Precipitated crystals were collected by filtration and recrystallized from a mixture of ethanol and acetone to give ethyl 4-(6-aminopurin-9-yl)-4-deoxy-D-erythronate (260 mg.). M.P. 159 to 160° C.

(E) 4 - (6 - hydroxypurin-9-yl)-4-deoxy-D-erythronic acid (1.0 g.) was dissolved in anhydrous ethanol (40 ml.). Thionyl chloride (490 mg.) was added to the solution, and the mixture was heated under reflux for 6.5 hours. After cooling, an ion-exchange resin [OH-type, Amberlite IRA–400 (trade name)] was added to the reaction mixture. The mixture was stirred, neutralized and, after removal of the ion-exchange resin, concentrated under reduced pressure to give crystals (570 mg.) of ethyl 4 - ( 6 - hydroxypurin-9-yl)-4-deoxy-D-erythronate. M.P. 212° C. (decomp.) (recrystallized from a mixture of ethanol and acetone). 4-(6-hydroxypurine-9-yl)-4-deoxy-D-erythronic acid (420 mg.) was recovered by washing the ion exchange resin collected as above.

(F) 4 - (6-aminopurin-9-yl)-4-deoxy-D-erythronic acid (1.00 g.) in n-propanol (50 ml.) and thionyl chloride (0.50 ml.) were treated as in Example 8 (D) to give propyl 4 - (6 - aminoporin-9-yl)-4-deoxy-D-erythronate (0.70 g.). M.P. 188 to 189° C.

(G) 4 - (6 - aminopurin-9-yl)-4-deoxy-2,3-isopropylidene-D-erythronic acid (1.0 g.) in a mixture of anhydrous ethanol (20 ml.) and conc. sulfuric acid (0.4 ml.) was heated refluxively for 3 hours. To the reaction mixture was added gradually a weakly basic ion-exchange resin [Amberlite IR–45 (trade name)] (9 g.) in 50% ethanol (20 ml.). The mixture was stirred for 30 minutes, and the resin filtered and washed with 50% ethanol. The washings were combined to the previously obtained filtrate and the mixture was concentrated under reduced pressure to give ethyl 4 - (6 - aminopurin - 9-yl)-4-deoxy-D-erythronate (600 mg.). M.P. 161 to 163° C. (recrystalized from a mixture of ethanol and acetone).

(H) A mixture of sodium 4-(6-aminopurin-9-yl)-4-deoxy-D-erythronate (500 mg.) in dimethylformamide (10 ml.) and methyl iodide (390 mg.) was stirred at 40° C. for 6 hours. An insoluble substance was filtered off and the filtrate was concentrated under reduced pressure. Methanol was added to the residue, and precipitated crystals were collected to give methyl 4-(6-aminopurin-9-yl)-4-deoxy-D-erythronate (250 mg.). M.P. 234 to 235° C. (decomp.) (recrystallized from methanol).

(I) A suspension of 4-(6-hydroxyaminopurin-9-yl)-4-deoxy-D-erythronic acid (400 mg.) in an ethanol solution saturated with hydrochloric acid was heated refluxively for 2.5 hours. After cooling, precipitated crystals were collected and recrystallized from ethanol to give ethyl 4-(6-hydroxyaminopurin-9-yl)-4-deoxy-D - erythronate hydrochloride (450 mg.). M.P. 151 to 152° C. (decomp.).

(J) 6-amino-9-(3-carboxy-2,3-dihydroxypropyl)-purin-1-oxide (150 mg.) was added to a mixture of anhydrous ethanol (6 ml.) and sulfuric acid (0.02 ml.), and the resulting mixture was refluxed for 4 hours. After cooling, the reaction mixture was gradually added to a suspension of weakly basic ion-exchange resin (Amberlite IR–45, 3 g.) in ethanol (20 ml.), the resultant mixture was stirred for 30 minutes and then the ion-exchange resin was filtered. The collected ion-exchange resin was treated with ethanol while hot. The ethanol extract was combined with the filtrate and concentrated under reduced pressure to give 6-amino-9-(3-ethoxycarbonyl-2,3-dihydroxypropyl)purin-1-oxide (140 mg.). Recrystallization from ethanol gave white crystalline material. M.P. 219 to 220° C. (decomp.).

In the similar manner, there are obtained the following compounds: methyl 4-(6-aminopurin-9-yl)-4-deoxy-2,3-O-isopropylidene-D-erythronate [M.P. 180 to 181° C. (decomp.)]; ethyl 4-(6-hydroxypurin-9-yl)-4-deoxy-2,3-O-diacetylerythronate [M.P. 188.5 to 189° C. (decomp.)]; ethyl 4-(6-hydroxypurin-9-yl)-4-deoxy - D - erythronate [M.P. 212° C. (decomp.)]; methyl 4-(6-aminopurin-9-yl)-4-deoxy-2,3-O-isopropylidene-O-threonate [M.P. 211 to 212° C. (decomp.)], etc.

Example 16

(A) Methyl 4-(6-aminopurin-9-yl)-4-deoxy-D-erythronate (500 mg.) was suspended in 30% aqueous ammonia (50 ml.). The suspension was warmed at 60° C. for 2 hours in a sealed vessel. The reaction mixture was concentrated under reduced pressure. Precipitated crystals were washed with water and recrystallized from water to give 4-(6-aminopurin-9-yl)-4-deoxy - D - erythronamide (240 mg.). M.P. 264 to 268° C. (decomp.).

(B) A suspension of ethyl 4-(6-hydroxypurin-9-yl)-4-deoxy-O-erythronate (1.0 g.) in ammonia-saturated ethanol (20 ml.) was heated at 80° C. for 3 hours. After cooling, the solvent was distilled off, and insoluble crystals were collected by filtration and recrystallized from 95% ethanol to give 4-(6-hydroxypurin-9-yl)-4-deoxy-D-erythronamide (550 mg.). M.P. 247° (decomp.).

UV spectrum: $\lambda_{max.}^{H_2O}$ 250.5 m$\mu$.

(C) A mixture of methyl 4-(6-aminopurin-9-yl)-4-deoxy-O-erythronate (500 mg.) and 4% ethylamine ethanol solution (5 ml.) was heated at 8° C. for 1.5 hours in a sealed vessel. The reaction mixture was concentrated under reduced pressure. Precipitated crystals were washed with ethanol to give N-ethyl-4-(6-aminopurin-9-yl)-4-deoxy-D-erythronamide (480 mg.). M.P. 192 to 193° C. (decomp.).

(D) A mixture of ethyl 4-(6-aminopurin-9-yl)-4-deoxy-D-erythronate (500 mg.), ethylamine (1.0 g.) and ethanol (2 ml.) was heated at 100° C. for 2 hours. The solvent was distilled off to give an oily substance. The substance was dissolved in hydrochloric acid saturated methanol, and ether was added to the solution to give N,N-diethyl-4-(6-aminopurin-9-yl)-4-deoxy-D - erythronamide (510 mg.). M.P. 166 to 168° C. (decomp.).

(E) A mixture of methyl 4-(6-aminopurin-9-yl)-4-deoxy-2,3-O-isopropylidene-D - erythronate (300 mg.) and 4% ethylamine ethanol solution (3 ml.) was treated as in Example 9(C) to give N-ethyl-4-(6-aminopurin-9-yl)-4-deoxy-2,3-O-isopropylidene-D-erythronamide (280 mg.). M.P. 179 to 180° C. (decomp.) (recrystallized from ethyl acetate).

(F) A suspension of ethyl 4-(6-hydroxyaminopurin-9-yl)-4-deoxy-D-erythronate hydrochloride (500 mg.) in ammonia-saturated ethanol (20 ml.) was heated at 80° C. for 4 hours. After cooling, the solvent was distilled off, and insoluble crystals were collected by filtration and recrystallized from 85% ethanol to give 4-(6-hydroxyaminopurin-9-yl)-4-deoxy-D-erythronamide (320 mg.). M.P. 205.5 to 206° C. (decomp.).

(G) In a sealed tube, a mixture of 6-amino-9-(3-ethoxycarbonyl-2,3-dihydroxypropyl)-9H-purin-1-oxide (220 mg.) and 40% ethanolic solution of methylamine (7 ml.) was heated at 80° C. for 1.5 hours. After removal of the solvent from the reaction mixture under reduced pressure, the residue (190 mg.) was recrystallized from ethanol to give 6-amino-9-[3-(N-methylcarbamoyl)-2,3 - dihydroxypropyl]-9H-purin-1-oxide. M.P. 254 to 255° C. (decomp.).

Example 17

(A) 4-(6-aminopurin-9-yl)-4-deoxy-D-erythronic acid (45 mg.) was suspended in pyridine (1 ml.). Anhydrous acetic acid (0.5 ml.) was added to the suspension, and the mixture was allowed to stand for 4 hours. The reaction mixture was poured into ice-water and concentrated under reduced pressure. Precipitated crystals were collected by filtration and recrystallized from a mixture of methanol and water to give needles (32 mg.) of 4-(6-aminopurin-9-yl)-4-deoxy-2,3-di-O-acetyl-D-erythronic acid. M.P. 250° C. (decomp.).

(B) Methyl 4-(6-aminopurin-9-yl)-4-deoxy-D-erythronate (300 mg.) was suspended in pyridine (6 ml.). Anhydrous acetic acid (3 ml.) was added to the suspension and stirred at room temperature for 6 hours. The reaction mixture was poured into ice-water and extracted with chloroform. The extract was washed with water and dried over anhydrous magnesium sulfate. The chloroform was evaporated under reduced pressure and crude crystals thus obtained were washed with and recrystallizel from methanol to give methyl 4-(6-aminopurin-9-yl)-4-deoxy-2,3-di-O-acetyl-D-erythronate (290 mg.). M.P. 228° C. (decomp.).

(C) Anhydrous acetic acid (5 ml.) was added to a solution of ethyl 4-(6-hydroxypurin-9-yl)-4-deoxy-D-erythronate (500 mg.) in pyridine (10 ml.). The mixture was stirred at room temperature for 8 hours, poured into ice-water (50 ml.) and extracted with chloroform. The chloroform layer was washed with water and concentrated. Ether was added to the residue, and the walls of the reaction vessel was rubbed to give crystals. These crystals were collected by filtration washed with ether and recrystallized from ethanol to give ethyl 4-(6-hydroxypurin-9-yl)-4-deoxy-2,3-O-acetyl-D-erythronate (530 mg.). M.P. 188.5 to 189° C. (decomp.).

UV spectrum: $\lambda_{max}^{H_2O}$ 250 m$\mu$.

(D) Benzoyl chloride (2.80 g.) was added to a suspension of methyl 4 - (6 - aminopurin - 9 - yl)-4-deoxy-D-erythronate (1.06 g.) in pyridine (60 ml.) under cooling with ice. The mixture was stirred for 15 hours, poured into ice-water and extracted with chloroform. The extract was dried over anhydrous magnesium sulfate and the chloroform was evaporated under reduced pressure. The residue was subjected to column chromatography using neutral alumina (20 g.). A gummy substance obtained from the fraction eluted wth benzene and chloroform was dissolved in pyridine (30 ml.), and 2 N sodium hydroxide (30 ml.) was added thereto. The mixture was stirred at room temperature for 1.5 hours and passed through a column packed with an ion-exchange resin [H-type, Dowex 50 (trade name)] (30 ml.). The ion-exchange resin was washed with 50% pyridine (50 ml.). The effluents and the washings were combined together and concentrated. The residue was dissolved in methanol, treated with carbon powder and allowed to stand to give crystals (530 mg.) of 4-(6-benzoylaminopurin-9-yl)-4-deoxy-D-erythronic acid, M.P. 232 to 235° C.

In the similar manner, there are obtained the following compounds; 4-(6 - butyrylaminopurin - 9 - yl) - 4 - deoxy-D-erythronic acid; 4 -(6 - octanoylaminopurin - 9 - yl)-4-deoxy-D-erythronic acid, etc.

Example 18

(A) Methyl 4-(6 - aminopurin - 9 - yl) - 4 - deoxy-D-erythronate (1.00 g.) was suspended in acetone (80 ml.). Phosphrous oxychloride (2.0 g.) was added to the suspension. The mixture was stirred for 2 hours and poured into an aqueous solution (50 ml.) containing sodium bicarbonate (5.0 g.). The reaction mixture was stirred for 30 minutes and the acetone was evaporated under reduced pressure. The residue was extracted with chloroform and the extract was dried over anhydrous magnesium sulfate, after which the chloroform was distilled off to give crude crystals. The crystals were recrystallized from acetone to give flakes (0.82 g.) of methyl 4-(6-aminopurin - 9 - yl) - 4 - deoxy - 2,3 - O - isopropylidene-D-erythronate. M.P. 180 to 181° C.

In the similar manner, there are obtained the following compounds:

6-amino-9-(3-carboxy-2,3-isopropylideneoxypropyl)-purine-1-oxide [M.P. 270° C. (decomp.)];
4-(6-aminopurin-9-yl)-4-deoxy-2,3-O-isopropylidene-D-erythronic acid [M.P. 214° C. (decomp.)];
4-(6-amino-8-methylpurin-9-yl)-4-deoxy-2,3-O-isopropylidene-D-erythronic acid [M.P. 265° C. (decomp.)];
4-(6-amino-8-mercaptopurin-9-yl)-4-deoxy-2,3-O-isopropylidene-D-erythronic acid [M.P. 198 to 203° C. (decomp.)];
4-(6-aminopurin-9-yl)-4-deoxy-2,3-O-benzylidene-D-erythronic acid [M.P. 198 to 199° C. (decomp.)];
4-(6-chloropurin-9-yl)-4-deoxy-2,3-O-isopropylidene-D-erythronic acid [M.P. 150° C. (decomp.)];
N-ethyl-4-(6-aminopurin-9-yl)-4-deoxy-2,3-isopropylidene-D-erythronamide [M.P. 178 to 179° C. (decomp.)];
4-(6-ethylaminopurin-9-yl)-4-deoxy-2,3-O-isopropylidene-D-erythronic acid, etc.

Example 19

(A) 4-(6-chloropurin-9-yl) - 4-deoxy - D - erythronic acid (1.89 g.) was reacted with thiourea (530 mg.) in ethanol (70 ml.) under reflux for 3 hours. N sodium hydroxide solution (15 ml.) and water (10 ml.) were added to the reaction mixture and heated for an hour. The ethanol was distilled off, and the residue was adjusted to pH 1 with hydrochloric acid. Precipitated crystals were collected by filtration and recrystallized from water to give 4-(6-mercaptopurin-9-yl)-4-deoxy-D-erythronic acid (860 mg.). M.P. 240° C. (decomp.).

UV spectrum: $\lambda_{max}^{H_2O}$ 226.5 m$\mu$ ($\epsilon$=9,400), 322 m$\mu$ ($\epsilon$=25,900); $\lambda_{max}^{H_2O}$ 225 m$\mu$ ($\epsilon$=10,100), 324 m$\mu$ ($\epsilon$=22,200); $\lambda_{max}^{0.1\,N\,NaOH}$ 232.5 m$\mu$ ($\epsilon$=14,300), 310.5 m$\mu$ ($\epsilon$=22,400).

(B) 4-(6-mercaptopurin-9-yl)-4 - deoxy-D - erythronic acid (1.39 g.) was dissolved in 0.1 N sodium hydroxide solution (100 ml.), and methyl iodide (0.4 ml.) was added thereto. The reaction mixture was stirred at room temperature for 4 hours and concentrated. The concentrate was adjusted to pH 1 with hydrochloric acid and further condensed to dryness. The residue was extracted with hot methanol, and thus obtained crude crystals were recrystallized from methanol to give 4-(6-methylthiopurin-9-yl)-4 - deoxy-D-erythronic acid (1.22 g.). M.P. 210° C. (decomp.).

UV spectrum: $\lambda_{max}^{H_2O}$ 221 m$\mu$ ($\epsilon$=11,300), 287 m$\mu$ ($\epsilon$=17,500), 293 m$\mu$ ($\epsilon$=17,400; $\lambda_{max}^{0.1\,N\,HCl}$ 222.5 m$\mu$ ($\epsilon$=10,500), 295.5 m$\mu$ ($\epsilon$=15,700); $\lambda_{max}^{0.1\,N\,NaOH}$ 223 m$\mu$ ($\epsilon$=10,600), 287 m$\mu$ ($\epsilon$=17,100), 293 m$\mu$ ($\epsilon$=17,000).

(C) 4-(6-chloropurin-9-yl)-4 - deoxy-D-erythronic acid (1.48 g.) was dissolved in ethanol (20 ml.). An ethanol solution (45 ml.) of hydroxylamine prepared from hydroxylamine hydrochloride (1.63 g.) and potassium hydroxide (1.50 g.) was added thereto. The mixture was heated under reflux for 6 hours on a water bath. The solvent was distilled off and the residue was dissolved in a small amount of water. The aqueous solution was adjusted to pH 2 with formic acid and allowed to stand overnight. Precipitated crystals were collected by filtration and recrystallized from 70% ethanol to give 4-(6-hydroxyaminopurin-9-yl)-4-deoxy-D-erythronic acid (920 mg.). M.P. 206.5° C. (decomp.).

UV spectrum: $\lambda_{max}^{H_2O}$ 267 m$\mu$ ($\epsilon$=16,100); $\lambda_{max}^{0.1\,N\,HCl}$ 267.5 m$\mu$ ($\epsilon$=13,800).

(D) 4-(6 - chloropurin-9-yl)-4-deoxy-D-erythronic acid (0.5 g.) was added to a solution of metallic sodium (85 mg.) in absolute methanol (10 ml). The mixture was refluxed for 2 hours and precipitated sodium chloride was removed by filtration. The methanol was distilled off and the residue was dissolved into ethanol. The solution was allowed to stand. Precipitated crystals were collected by filtration and recrystallized from 99% ethanol to give needles of sodium 4-(6-methoxypurin-9-yl) - 4 - deoxy-D-erythronate. This substance was vesicated at 168 to 170° C. and colored at 220 to 230° C. with vesication.

UV spectrum: $\lambda_{max}^{H_2O}$ 252 m$\mu$.

(E) 4-(6-aminopurin-9-yl) - 4-deoxy-D-erythronic acid (1.0 g.) was dissolved in formic acid (15 ml.) and water (40 ml.). Sodium nitrite (40 g.) in water (15 ml.) was added dropwise to the solution under ice-cooling in an hour. The mixture was stirred under ice-cooling and then at room temperature for 24 hours. The reaction mixture was concentrated under reduced pressure, and the residue was dissolved in water and adsorbed on an ion exchange resin [OH type, IRA 400 (trade name)] (400 ml.). The resin was washed with water, eluted with 2% formic acid and the eluate was concentrated under reduced pressure to give crystals. These crystals were recrystallized from ethanol to give 4-(6-hydroxypurin-9-yl)-4-deoxy-D-erythronic acid. This substance was sintered at about 85° C., expanded at 100 to 105° C. and then melted around 185° C.

(F) A mixture of 4-(6-chloropurin-9-yl)-4-deoxy-D-erythronic acid (300 mg.) and 5% hydrochloric acid (6 ml.) was refluxed for an hour and the solvent was distilled off. The residue was dissolved in water and an aqueous solution was evaporated. The remaining oil was dissolved in a small amount of methanol and acetone was added thereto. The mixture was allowed to stand and precipitated crystals were collected by filtration and dried to give 4-(6-hydroxypurin-9-yl) - 4-deoxy-D-erythronic acid (100 mg.). This substance was sintered at about 85° C., expanded at 100 to 105° C. and then melted around 185° C.

(G) Sodium nitrite (1.00 g.) was added to a solution of 4-(2-amino-6-hydroxypurin-9-yl) - 4 - deoxy-D-erythronic acid (1.00 g.) in 20% acetic acid solution (60 ml.). The mixture was stirred at room temperature for 24 hours and concentrated under reduced pressure. The residue was dissolved in a small amount of water and adsorbed on an ion exchange resin [OH type, IRA–400 (trade name)] (100 ml.). The resin was washed with water (500 ml.) and eluted with 10% formic acid. The first eluate (100 ml.) was removed, and the following eluate (500 mg.) was condensed. A small amount of water was added to the residue, and the aqueous solution was allowed to stand. Precipitated crystals were collected by filtration and washed to give 4-(2,6-dihydroxypurin-9-yl)-4-deoxy-D-erythronic acid (0.73 g.). M.P. 204 to 206° C. (decomp.) (recrystallized from water).

UV spectrum: $\lambda_{max.}^{H_2O}$ 235 mμ ($\epsilon$=7,900), 246 mμ ($\epsilon$=9,800); $\lambda_{max.}^{0.5 N\ HCl}$ 239 mμ ($\epsilon$=6,700), 262 mμ ($\epsilon$=9,400); $\lambda_{max.}^{0.5 N\ NaOH}$ 248 mμ ($\epsilon$=8,900), 278 mμ ($\epsilon$=9,300).

Example 20

(A) A solution of 4-amino-5-nitro-6-chloropyrimidine (875 mg.), 4-amino-4-deoxy-2,3-O-isopropylidene-D-erythronic acid (965 mg.) and triethylamine (1010 mg. in methanol (60 ml.) was stirred at room temperature for 13 hours. After removal of methanol from the reaction mixture under reduced pressure, the residue was dissolved in water. The aqueous solution was made acidic with hydrochloric acid. The precipitated crystals were collected by filtration and recrystallized from methanol to give 4-(6-amino-5-nitro-4-pyrimidinylamino)-4-deoxy - 2,3 - O-isopropylidene-D-erythronic acid (1400 mg.). M.P. 223 to 228° C. (decomp.). $[\alpha]_D^{25}$=+58° (c.=1.17, dimethylsulfoxide).

(B) To a solution of sodium ethoxide (prepared from 130 mg. of metallic sodium) and triethylamine (610 mg.) in ethanol (45 ml.), there were added 4,6-dichloro-5-aminopyrimidine (980 mg.) and 4-amino-4-deoxy-2,3-O-isopropylidene-D-erythronic acid (1160 mg.), and the resultant mixture was refluxed for 15 hours. After cooling the solvent was removed by distillation from the reaction mixture under reduced pressure. The residue was dissolved in a small amount of water, and ethyl acetate was added thereto to dissolve the insoluble material. The aqueous layer was separated, adjusted to pH 2 with hydrochloric acid and extracted with ethyl acetate. The extract was concentrated under reduced pressure to give 4-(5-amino-6-chloro-4-pyrimidinylamino)-4-deoxy-2,3 - O-isopropylidene-D-erythronic acid (600 mg.). Recrystallization from a mixture of ethyl acetate and ethanol gave white needles. M.P. 176.5 to 177° C. (decomp.).

$[\alpha]_D^{25}$=+1.2°
(c.=0.407, methanol).

(C) To a solution of 4-chloro-5-nitro-6-aminopyrimidine (1.84 g.) and ethyl 4-amino-4-deoxy-2,3-di-O-benzoyl-L-threonate hydrochloride (4.32 g.) in ethanol (50 ml.), there was added triethylamine (2.15 g.), and the resultant mixture was stirred at room temperature for 16 hours. After removal of the solvent from the reaction mixture by distillation under reduced pressure, the residue was dissolved in water and extracted with ethyl acetate. The extract was dried over magnesium sulfate and concentrated under reduced pressure to give ethyl 4-(5-nitro-6-amino-4-pyrimidinylamino)-4-deoxy-2,3 - O - benzoyl-L-threonate (5.3 g.). This compound was converted into the hydrochloride by a conventional procedure and recrystallized from ethanol to give the pure product. M.P. 198 to 200° C. (decomp.). $[\alpha]_D^{25}$=−116.9° (c.=2.01, water).

(D) To a solution of 4-amino-4-deoxy-D-erythronic acid (6.76 g.) and triethylamine (10.12 g.) in water (220 ml.), there was added 4,6-dichloro-5 - aminopyrimidine (8.20 g.), and the resultant mixture was refluxed for 24 hours. After cooling, the reaction mixture was shaken with ethyl acetate. The aqueous layer was separated, concentrated under reduced pressure, adjusted to pH 3 with formic acid and cooled with ice. The crystals precipitated by scratching the wall of the reaction vessel were collected by filtration and washed with water to give 4-(5-amino-6-chloro-4-pyrimidinylamino)-4-deoxy - D - erythronic acid (10.35 g.). Recrystallization from water gave the pure product. M.P. 201° C. (decomp.). $[\alpha]_D^{25}$=+19° (c.=0.502, dimethylsulfoxide).

(E) A solution of 2-amino-4-chloro-5-nitro-6-hydroxypyrimidine (277 g.), 4-amino-4-deoxy-2,3-O-isopropylidene-D-erythronic acid (2.8 g.) and triethylamine (2.93 g.) in methanol (525 ml. was stirred at room temperature for 24 hours. After removal of the solvent from the reaction mixture by distillation under reduced pressure, the residue was dissolved in a small amount of water. The solution was adjusted to pH 3 with 10% hydrochloric acid. The precipitated crystals were collected by filtration to give 4-(2-amino-5-nitro-6-hydroxy-4-pyrimidinylamino)-4-deoxy-2,3-O-isopropylidene-D-erythronic acid (3.6 g.). Recrystallization from methanol gave the pure product. M.P. 231 to 233° C. (decomp.).

(F) To a solution of 4-amino-4-deoxy-2,3-O-isopropylidene-D-erythronic acid (1.93 g.) and triethylamine (2.03 g.) in methanol (100 ml.), there was added 2,4-dichloro-5-nitro-6-aminopyrimidine (2.09 g.), and the resultant mixture was stirred at room temperature for 16 hours. After removal of the solvent from the reaction mixture by distillation, the residue was dissolved in water and made acidic with hydrochloric acid. The precipitate was collected by filtration, washed with water and then ethanol, and recrystallized from isopropanol to give 4-(2-chloro-5-nitro-6-amino-4 - pyrimidinylamino) - 4 - deoxy-2,3-O-isopropylidene-D-erythronic acid (2.94 g.). M.P. 170° C. (decomp.).

(G) A solution of 4-chloro-5-nitro-6-aminopyrimidine (1.75 g.), DL-4-amino-3-hydroxybutanoic acid (1.19 g.) and triethylamine (2.53 g. in 80% methanol (30 ml.) was stirred at room temperature for 16 hours. After removal of the solvent from the reaction mixture by distillation under reduced pressure, the residue was dissolved in water (20 ml.) and adjusted to pH 3 with 10% hydrochloric acid. The precipitated crystals were collected by filtration and dried to give 4-(5-nitro-6-amino-4-pyrimidinylamino)-3-hydroxy-DL-butanoic acid (2.40 g.). Recrystallization from 10% acetic acid gave the pure product. M.P. 257 to 258° C. (decomp.).

(H) To a solution of 4-amino-4-deoxy-D-erythronic acid (2.70 g.) and triethylamine (5.06 g.) in 70% methanol (95 ml.), there was added 4-chloro-5-nitro-6-methoxypyrimidine (3.80 g.), and the resultant mixture was stirred at room temperature for 20 hours. The reaction mixture was concentrated to about 10 ml. and washed with ethyl acetate. The aqueous layer was adjusted to pH 3 with hydrochloric acid and concentrated under reduced pressure. The residue was extracted with acetone, and the extract was concentrated under reduced pressure to give 4-(5-nitro-6-methoxy-4-pyrimidinylamino) - 4 - deoxy-D-erythronic acid (5.62 g.).

UV spectrum: $\lambda_{max.}^{H_2O}$ 228, 283, 358 mμ.

The above obtained 4-(5-nitro-6-methoxy-4-pyrimidinylamino)-4-deoxy-D-erythronic acid was dissolved in acetone, and dicyclohexylamine was added thereto to give the dicyclohexylamine salt of 4-(5-nitro-6-methoxy-4- pyrimidinylamino) - 4 - deoxy-D-erythronic acid. M.P. 157.5 to 158.5° C. (decomp.).

UV spectrum: $\lambda_{max}^{H_2O}$ 230, 285, 358 m$\mu$.

(I) A solution of 4-amino-4-deoxy-D-erythronic acid (3.1 g.), 4-chloro-5-nitro-6-hydroxypyrimidine (4.0 g.) and sodium hydrogen carbonate (3.85 g.) in water (60 ml.) was refluxed for 40 minutes. After concentration under reduced pressure, a small amount of water was added thereto, and the wall of the reaction vessel was scratched. The precipitated crystals were collected by filtration and recrystallized from aqueous ethanol to give sodium 4-(5-nitro-6-hydroxy-4-pyrimidinylamino)-4-deoxy - D - erythronate (2.8 g.). M.P. 205° C. (decomp.).

(J) To a solution of 4-amino-4-deoxy-2,3-O-isopropylidene-D-erythronic acid (4.0 g.) and triethylamine (4.2 g.) in methanol (200 ml.), there was added 2-methylthio-4-chloro-5-nitro-6-aminopyrimidine (4.54 g.), and the resultant mixture was stirred at room temperature for 7 hours. The reaction mixture was concentrated under reduced pressure. The residue was dissolved in a small amount of water and adjusted to pH 3 with 10% hydrochloric acid. The precipitated crystals were collected by filtration, washed with water and then ethanol, and recrystallized from ethanol to give 4-(2-methylthio-5-nitro-6-amino-4-pyrimidinylamino)-4-deoxy - 2,3 - O - isopropylidene-D-erythronic acid (6.78 g.). M.P. 211.5 to 212.5° C.

(K) 4-(6-amino - 5 - nitro-4-pyrimidinylamino)-4-deoxy-2,3-O-isopropylidene-D-erythronic acid (0.94 g.) was dissolved in a solution of sodium hydrogen carbonate (0.42 g.) in water (30 ml.). After the addition of a small amount of Raney nickel, catalytic reduction was carried out under atmospheric pressure. When the absorption of hydrogen gas ceased, the catalyst was separated by filtration and washed with water. The washing water and the filtrate were combined together and concentrated under reduced pressure to about 10 ml. The concentrated solution was adjusted to pH 3 with 5% hydrochloric acid. The precipitated crystals were washed with water and then methanol, and recrystallized from a mixture of water and methanol to give 4-(5,6-diamino-4-pyrimidinylamino)-4-deoxy-2,3-O-isopropylidene-D-erythronic acid (0.58 g.). M.P. 220° C. (decomp.).

(L) To a solution of methyl 4-(5-nitro-6-amino-4-pyrimidinylamino)-4-deoxy-D-erythronate (1.0 g.) in methanol (10 ml.), there was added a small amount of Raney nickel, and catalytic reduction was carried out under atmospheric pressure. When the absorption of hydrogen gas ceased, the catalyst was separated by filtration. The filtrate was concentrated under reduced pressure to give methyl 4-(5,6-diamino-4-pyrimidinylamino)-4-deoxy-D-erythronate (0.8 g.). M.P. 165 to 167° C.

(M) To a suspension of 4-(6-amino-5-nitro-4-pyrimidylamino)-4-deoxy-D-erythronic acid (5.85 g.), M.P. 236 to 237° C. (decomp.), prepared from 4-amino-5-nitro-6-chloropyrimidine and 4-amino-4-deoxy-D-erythronic acid, in water (60 ml.), N sodium hydroxide solution (24.6 ml.) was added. After addition of Raney nickel (0.5 ml.), the resulting mixture was subjected to catalytic reduction under atmospheric pressure. The absorption of a theoretical amount of hydrogen gas was completed in about 5 hours. After removal of nickel by filtration, the filtrate was concentrated under reduced pressure to give 4-(5,6-diamino-4-pyrimidylamino) - 4 - deoxy-D-erythronic acid, M.P. 244 to 245° C. (decomp.), which was reacted with diazomethane in a conventional manner to afford methyl 4-(5,6-diamino - 4 - pyrimidylamino)-4-deoxy-D-erythronate. M.P. 165 to 167° C.

(N) To a solution of 4-(6-amino-5-nitro-4-pyrimidinylamino)-4-deoxy - 2,3 - O - isopropylidene-D-erythronic acid (3.13 g.) in 90% formic acid (45 ml.), 10% palladium-carbon (0.4 g.) was added, and the mixture was subjected to the catalytic hydrogenation. After completion of the reaction, the catalyst was filtered off, and the formic acid was evaporated under reduced pressure. The residue was dissolved in water, and the solvent was evaporated under reduced pressure. To the residue was added a small amount of water, and precipitated crystals were collected by filtration. These crystals were washed with methanol to give pillars (2.37 g.) of 4-(6-amino-5-formamido-4-pyrimidinylamino)-4-deoxy - D - erythronic acid. M.P. 190° C. (decomp.).

(O) A solution of 4-(5,6-diamino - 4 - pyrimidinylamino)-4-deoxy - 2,3 - O - isopropylidene-D-erythronic acid (120 mg.) in 90% formic acid (3 ml.) was heated under reflux for an hour. After cooling, the formic acid was removed from the reaction mixture by evaporation under reduced pressure. To the residue was added water, and the solvent was again evaporated under reduced pressure. To the residue was added a small amount of water, and precipitated crystals were collected by filtration, washed with water and then methanol and recrystallized from water to give pillars (75 mg.) of 4-(6-amino-5-formamido-4-pyrimidinylamino)-4-deoxy - D - erythronic acid. M.P. 190° C. (decomp.).

(P) To a suspension of 4-(5,6-diamino-4-pyrimidinylamino)-4-deoxy - 2,3 - O - isopyropylidene-D-erythronic acid (300 mg.) in pyridine (3 ml.), acetic anhydride (1.5 ml.) was added, and the resultant mixture was stirred for 15 hours. The reaction mixture was concentrated under reduced pressure. The residue was dissolved in benzene, dried over anhydrous magnesium sulfate and concentrated. The residue (290 mg.) was chromatographed on silica gel (1.0 g.) and eluted with chloroform to give 4-(5-acetylamino-6-amino - 4 - pyrimidinylamino)-4-deoxy-2,3-O-isopropylidene-D-erythronic acid (150 mg.) as oil.

UV spectrum: $\lambda_{max}^{H_2O}$ 233, 284 m$\mu$. NMR: 7.93 $\tau$.

(Q) To a solution of 4-amino-4-deoxy-D-erythronic acid (0.68 g.) and triethylamine (1.26 g.) in 80% methanol (20 ml.), there was added 2,4-dichloro-5-nitro-6-aminopyrimidine (1.05 g.), and the resultant mixture was stirred at room temperature for 15 hours. After removal of the solvent from the reaction mixture by distillation, the residue was dissolved in water and adjusted to pH 3 with hydrochloric acid. The precipitate was collected by filtration and recrystallized from water to give 4-(2-chloro-5-nitro-6-amino-4-pyrimidinylamino) - 4 - deoxy-D-erythronic acid (700 mg.). M.P. 214 to 216° C. (decomp).

(R) A solution of 4-amino-5-nitro-6-chloropyrimidine (7.70 g.), 4-amino-4-deoxy-D-erythronic acid (5.95 g.) and triethylamine (11.15 g.) in 80% methanol (175 ml.) was stirred at room temperature for 17 hours. After removal of methanol from the reaction mixture under reduced pressure, the residue was dissolved in water (100 ml.). The aqueous solution was made acidic with hydrochloric acid. The precipitated crystals were collected by filtration, washed with water and then methanol and recrystallized from water to give 4-(6-amino - 5 - nitro-4-pyrimidinylamino)-4-deoxy-D-erythronic acid. M.P. 236 to 237° (decomp.).

(S) To a solution of 4-(2-methylthio-5-nitro-6-amino-4-pyrimidinylamino)-4-deoxy-2,3 - O - isopropylidene-D-erythronic acid (3.0 g.) in 90% formic (60 ml.), zinc powder (2.1 g.) was added, and the mixture was stirred at room temperature for 30 minutes and heated with reflux for 2.5 hours. After cooling, the precipitate was filtered off and the solvent was removed by distillation. The residue was dissolved in water and then hydrogen sulfide was introduced into the aqueous solution. The precipitated substance was filtered off and the filtrate was evaporated to dryness to give a faint brown solid (3.01 g.). The solid was recrystallized from water to give 4-(2-methylthio-5-formamido-6-amino - 4 - pyrimidinylamino)-4-deoxy-D-erythronic acid as crystals. M.P. 215 to 215.5° C. (decomp.).

(T) To a solution of 4-(6-hydroxy-5-nitro-4-pyrimidinylamino)-4-deoxy-D-erythronic acid (1.47 g.) in 1% hydrochloric acid (30 ml.), there was added 5% palladium carbon (500 mg.), and catalytic reduction was carried out. When the absorption of hydrogen gas ceased, the catalyst was separated by filtration. The filtrate was concentrated under reduced pressure, and the residue was dissolved in ethanol. The mixture was heated for a few minutes and then the solvent was removed by distillation under reduced pressure. The residual solid was recrystallized from ethanol to give ethyl 4-(6-hydroxy - 5 - amino-4-pyrimidinylamino)-4-deoxy-D-erythronate hydrochloride (1.22 g.). M.P. 166 to 167° C. (decomp.).

(U) A mixture of 4-(5-nitro-6-amino-4-pyrimidinylamino) - 4 - deoxy-D-erythronic acid (0.50 g.), absolute methanol (10.0 ml.) and conc. sulfuric acid (0.1 ml.) was refluxed for 2 hours. The reaction mixture was adjusted to pH 6 to 7 with an ion-exchange resin, IR–45 (OH-type) and filtered while hot. The solvent was removed by distillation to give methyl 4-(5-nitro-6-amino-4-pyrimidinylamino)-4-deoxy-D-erythronate (0.50 g.). M.P. 188 to 190° C.

(V) A mixture of 4-(6-amino-5-formamido-4-pyrimidinylamino)-4-deoxy-D-erythronic acid (0.20 g.), absolute methanol (10.0 ml.) and conc. sulfuric acid (0.1 ml.) was treated in the same manner as in Example 22 to give methyl 4 - (6-amino-5-formamido-4-pyrimidinylamino)-4-deoxy-D-erythronate (0.20 g.). M.P. 169 to 171° C. (decomp.).

Example 21

A suitable formulation of tablets consists of:

| | Grams |
|---|---|
| (1) 4-(6-aminopurin - 9 - yl) - 4 - deoxy-D-erythronic acid | 3 |
| (2) Lactose | 66 |
| (3) Starch | 7 |
| (4) Magnesium stearate | 2 |

The active ingredient, lactose and starch are thoroughly mixed and granulated. For tableting, the magnesium stearate is added, mixed with the granules, and the mixture tableted on a rotary press. Use of the procedure produces 100 tablets each containing 30 mg. of the active ingredient.

Example 22

Another suitable formulation of tablets consists of:

| | Grams |
|---|---|
| (1) 4-(6-aminopurin-9-yl) - 4 - deoxy - D - erythronic acid | 2 |
| (2) Mannitol | 86 |
| (3) Starch | 10 |
| (4) Magnesium stearate | 2 |

The active ingredients mannitol and starch are thoroughly mixed and granulated. For tableting, the magnesium stearate is added, mixed with granules, and the mixture tableted on a rotary press. Use of the procedure produces 100 tablets each containing 20 mg. of the active ingredient.

Example 23

A suitable formulation of dragees consists of:

| (1) 4 - (6-aminopurin-9-yl)-4-deoxy-D-erythronic acid | grams | 18,000 |
|---|---|---|
| (2) Aerosil | do | 4,500 |
| (3) Maize starch | do | 4,500 |
| (4) Stearic acid | do | 700 |
| (5) Ethanol | liters | 6.1 |
| (6) Gelatin | grams | 1,800 |
| (7) Purified water | liters | 20.0 |
| (8) Talc | grams | 600 |
| (9) Magnesium stearate | do | 375 |

From the above materials, there are prepared 600,000 cores each containing 30 mg. of the active ingredient in a conventional manner.

What is claimed is:

1. A purine compound of the formula:

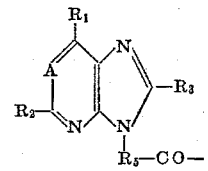

wherein A is N or N→O, $R_1$ is hydrogen, halogen, hydroxyl, mercapto, lower alkoxy, phenyl-lower alkoxy, lower alkylthio, amino, lower alkylamino, di(loweralkyl)-amino, phenyl-lower alkylamino, lower alkanoylamino, benzoylamino, hydroxyamino, lower alkoxyamino, phenyl-lower alkoxyamino, phenoxyamino, $R_2$ and $R_3$ are each hydrogen, halogen, hydroxyl, mercapto, amino, lower alkyl, phenyl, lower alkoxy, phenyl-lower alkoxy, or lower alkylthio, $R_4$ is lower alkylene substituted with one or more hydroxyls (with the proviso that no hydroxyl be present at the carbon atom adjacent to the ring nitrogen atom) which may be protected with lower alkanoyl, benzoyl, lower alkyl or phenyl-lower alkyl, or, when a pair of hydroxyls are present on the alkylene group, with lower alkylidene or phenyl-lower alkylidene, and $R_5$ is hydroxyl, lower or higher alkoxy, amino, lower alkyl amino or di(lower alkyl)amino, or its metal and amine salts selected from the group consisting of the sodium, potassium, calcium, ammonium, dimethylammonium, and trimethylammonium salts, or its acid addition salts selected from the group consisting of hydrochloride, hydrobromide, sulfate, nitrate, phosphate, tartrate and citrate.

2. The purine compound according to claim 1, i.e. 4-(6-aminopurin-9-yl)-4-deoxy-D-erythronic acid.

3. The purine compound according to claim 1, i.e. lower alkyl 4-(6-aminopurin-9-yl)-4-deoxy-D-erythronate.

4. The purine compound according to claim 1, i.e. methyl 4-(6-aminopurin-9-yl)-4-deoxy-D-erythronate.

5. The purine compound according to claim 1, i.e. ethyl 4-(6-aminopurin-9-yl)-4-deoxy-D-erythronate.

6. The purine compound according to claim 1, i.e. 4-(6-aminopurin-9-yl)-4-deoxy-D-erythronamide.

7. The purine compound according to claim 1, i.e. 4-(6-hydroxyaminopurin-9-yl)-4-deoxy-D-erythronic acid.

8. The purine compound according to claim 1, i.e. lower alkyl 4-(6-hydroxyaminopurin-9-yl) - 4 - deoxy-D-erythronate.

9. The purine compound according to claim 1, i.e. methyl 4-(6-hydroxyaminopurin - 9 - yl) - 4 - deoxy-D-erythronate.

10. The purine compound according to claim 1, i.e. ethyl 4-(6-hydroxyaminopurin-9-yl)-4-deoxy-D-erythronate.

11. The purine compound according to claim 1, i.e. 4-(6-hydroxyaminopurin-9-yl)-4-deoxy-D-erythronamide.

12. The purine compound according to claim 1, i.e. 6-amino - 9 - (3 - carboxy - 2,3 - dihydroxypropyl)-9H-purin-1-oxide.

13. The purine compound according to claim 1, i.e. 6-amino - 9 - (3 - lower alkoxycarbonyl-2,3-dihydroxy)-9H-purin-1-oxide.

14. The purine compound according to claim 1, i.e. 6-amino-9-(3-methoxycarbonyl - 2,3 - dihydroxypropyl)-9H-purin-1-oxide.

15. The purine compound according to claim 1, i.e. 6-amino-9-(3 - ethoxycarbonyl - 2,3 - dihydroxypropyl)-9H-purin-1-oxide.

16. The purine compound according to claim 1, i.e. 6-amino-9-(3 - carbamoyl-2,3-dihydroxypropyl)-9H-purin-1-oxide.

References Cited

UNITED STATES PATENTS 3,114,751  12/1963  Whetstone _____ 260—252

ALEX MAZEL, Primary Examiner

A. M. T. TIGHE, Assistant Examiner

U.S. Cl. X.R.

260—253, 256.4 N, 256.4 C, 256.5 R, 309, 453 R, 488 R, 488 B, 488 F, 488 CD, 566 R; 424—253

UNITED STATES PATENT OFFICE
CERTIFICATE OF CORRECTION

Patent No. 3,813,394    Dated May 28, 1974

Inventor(s) Akira Tensho et al.

It is certified that error appears in the above-identified patent and that said Letters Patent are hereby corrected as shown below:

Column 1, lines 8-10, "Ser. No. 851,057, Aug. 18, 1969, which is a continuation-in-part of Ser. No. 861,808, Sept. 29, 1969," should read -- Ser. No. 861,808, Sept. 29, 1969, which is a continuation-in-part of Ser. No. 851,057, Aug. 18, 1969, --. Column 3, line 21, "4-6-amino-8-lower alkylpurin-9-yl)" should read -- 4-(6-amino-8-lower alkylpurin-9-yl) --. Column 4, line 29, "3-(6-aminopurin-9-yl-" should read -- 3-(6-aminopurin-9-yl) --. Column 8, formula "[II']" should read

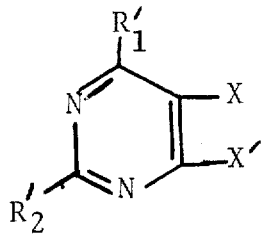

Column 9, cancel line 31; line 50, "applicaitons" should read -- applications --; Column 47, line 56, "ingredients" should read -- ingredient --. Column 48, line 10, the formula

UNITED STATES PATENT OFFICE
CERTIFICATE OF CORRECTION

Patent No. 3,813,394     Dated May 28, 1974

Inventor(s) Akira Tensho et al.     Page - 2

It is certified that error appears in the above-identified patent and that said Letters Patent are hereby corrected as shown below:

should appear as shown below:

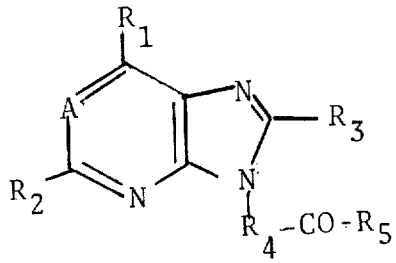

Column 9, line 19, after "$H_2N-R_4-CO-R_5$" change "[II']" to -- [II"] --. Column 10, line 12, delete "sodium sulfide" Column 30, line 40, "erthronolactone" should read -- erythronolactone -- Column 47, line 26, after "Example" change "22" to -- 20U --. Column 48, lines 68-69, "6-amino-9-(3-lower alkoxycarbonyl-2,3-dihydroxy)-9H-purin-1-oxide" should read -- 6-amino-9-(3-lower alkoxycarbonyl-2,3-dihydroxypropyl)-9H-purin-1-oxide --.

Signed and sealed this 10th day of December 1974.

(SEAL)
Attest:

McCOY M. GIBSON JR.
Attesting Officer

C. MARSHALL DANN
Commissioner of Patents